United States Patent
Jiang et al.

(10) Patent No.: US 12,258,470 B2
(45) Date of Patent: Mar. 25, 2025

(54) CHROMOGENIC MATERIALS, METHODS OF MAKING CHROMOGENIC MATERIALS, AND METHODS OF USE

(71) Applicant: University of Florida Research Foundation, Inc., Gainesville, FL (US)

(72) Inventors: Peng Jiang, Gainesville, FL (US); Ruochen Liu, Bryan, TX (US); Rao Fei, Boulder, CO (US); Wei Zhang, Gainesville, FL (US); Sin-Yen Leo, Gainesville, FL (US); Calen Leverant, Gainesville, FL (US); Helena Jiang, Gainesville, FL (US); Curtis Taylor, Gainesville, FL (US); Yifan Zhang, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 1260 days.

(21) Appl. No.: 16/969,655

(22) PCT Filed: Feb. 13, 2019

(86) PCT No.: PCT/US2019/017862
§ 371 (c)(1),
(2) Date: Aug. 13, 2020

(87) PCT Pub. No.: WO2020/027871
PCT Pub. Date: Feb. 6, 2020

(65) Prior Publication Data
US 2020/0400581 A1    Dec. 24, 2020

Related U.S. Application Data

(60) Provisional application No. 62/775,493, filed on Dec. 5, 2018, provisional application No. 62/629,739, filed on Feb. 13, 2018.

(51) Int. Cl.
*G01N 21/75* (2006.01)
*C08J 9/00* (2006.01)
(Continued)

(52) U.S. Cl.
CPC .............. *C08L 71/02* (2013.01); *C08J 9/0061* (2013.01); *C08J 9/008* (2013.01); *C08J 9/26* (2013.01);
(Continued)

(58) Field of Classification Search
None
See application file for complete search history.

(56) References Cited

U.S. PATENT DOCUMENTS

| 3,422,535 A | 1/1969 | Johnson |
| 3,671,105 A | 6/1972 | Williams et al. |

(Continued)

FOREIGN PATENT DOCUMENTS

| CN | 103935057 A | 7/2014 |
| CN | 105036068 A | 11/2015 |

(Continued)

OTHER PUBLICATIONS

Yoon, B.; Lee, J.; Park, I. S.; Jeon, S.; Lee, J.; Kim, J. M., Recent Functional Material Based Approaches to Prevent and Detect Counterfeiting. J. Mater. Chem. C 2013, 1, 2388-2403.

(Continued)

*Primary Examiner* — Anthony J Frost
(74) *Attorney, Agent, or Firm* — Thomas | Horstemeyer LLP.

(57) ABSTRACT

The present disclosure provides for porous polymer materials that include an ordered array of voids separated by a polymer framework. The porous polymer material can have a recovery state where the voids are in an uncollapsed state and iridescent color, and a deformed state having voids in a (Continued)

collapsed state that is non-iridescent or substantially transparent. The materials can have regions of both states simultaneously. Also described are methods for fabricating a polymer material as above, as well as chromogenic sensors including the polymer material. The sensors can have hidden anti-counterfeiting patterns, hydrophobic/oleophobic properties, and chromogenic transformation can be triggered by various stimuli such as solid target compounds, light energy, and more.

24 Claims, 44 Drawing Sheets

(51) Int. Cl.
*C08J 9/26* (2006.01)
*C08L 71/02* (2006.01)
*C08L 75/16* (2006.01)

(52) U.S. Cl.
CPC ......... *C08L 75/16* (2013.01); *C08J 2205/042* (2013.01); *C08J 2335/02* (2013.01); *C08J 2375/16* (2013.01); *C08J 2483/04* (2013.01)

(56) References Cited

U.S. PATENT DOCUMENTS

| | | | |
|---|---|---|---|
| 4,125,319 A | 11/1978 | Frank et al. | |
| 4,340,479 A | 7/1982 | Pall | |
| 4,664,748 A | 5/1987 | Ueno et al. | |
| 4,781,441 A | 11/1988 | Kanbe et al. | |
| 4,810,633 A | 3/1989 | Bauer et al. | |
| 5,147,716 A | 9/1992 | Bellus | |
| 5,337,018 A | 8/1994 | Yamagishi | |
| 5,429,743 A | 7/1995 | Geus et al. | |
| 5,529,524 A | 6/1996 | Jones | |
| 5,641,332 A | 6/1997 | Faber et al. | |
| 5,753,014 A | 5/1998 | Van Rijn | |
| 5,939,189 A | 8/1999 | Phillips et al. | |
| 5,948,470 A | 9/1999 | Harrison et al. | |
| 5,993,661 A | 11/1999 | Ruckenstein et al. | |
| 6,044,981 A | 4/2000 | Chu et al. | |
| 6,531,304 B1 | 3/2003 | Boennemann et al. | |
| 6,565,763 B1 | 5/2003 | Asakawa et al. | |
| 6,649,255 B1 | 11/2003 | Fain et al. | |
| 6,881,582 B2 | 4/2005 | Ratogi et al. | |
| 6,929,764 B2 | 8/2005 | Jiang et al. | |
| 6,958,137 B2 | 10/2005 | Lee et al. | |
| 7,351,470 B2 | 4/2008 | Draheim et al. | |
| 7,630,589 B2 | 12/2009 | Kilic et al. | |
| 7,691,325 B2 | 4/2010 | Chopra et al. | |
| 7,889,954 B2 | 2/2011 | Sailor et al. | |
| 9,233,883 B1 | 1/2016 | Rauscher et al. | |
| 9,272,947 B2 | 3/2016 | Baca et al. | |
| 10,189,967 B2 | 1/2019 | Jiang et al. | |
| 10,700,225 B2 | 6/2020 | Wang et al. | |
| 2003/0031438 A1 | 2/2003 | Kambe et al. | |
| 2004/0131779 A1 | 7/2004 | Haubrich et al. | |
| 2004/0131799 A1 | 7/2004 | Arsenault et al. | |
| 2004/0184948 A1 | 9/2004 | Rakow et al. | |
| 2005/0147807 A1 | 7/2005 | Haas et al. | |
| 2006/0137462 A1 | 6/2006 | Divigalpitiya et al. | |
| 2007/0036653 A1 | 2/2007 | Bak et al. | |
| 2007/0156079 A1 | 7/2007 | Brown | |
| 2007/0206270 A1 | 9/2007 | Iwamatsu et al. | |
| 2008/0006574 A1 | 1/2008 | Ramaswamy et al. | |
| 2008/0027199 A1 | 1/2008 | Mazurek et al. | |
| 2008/0108142 A1 | 5/2008 | Hall et al. | |
| 2008/0185498 A1 | 8/2008 | Purdy et al. | |
| 2008/0233418 A1 | 9/2008 | Krueger | |
| 2008/0309923 A1 | 12/2008 | Falk | |
| 2009/0034051 A1 | 2/2009 | Arsenault et al. | |
| 2009/0274873 A1 | 11/2009 | Shinotsuka | |
| 2010/0051561 A1 | 3/2010 | Lee | |
| 2010/0058844 A1 | 3/2010 | Lin et al. | |
| 2010/0068168 A1 | 3/2010 | Song et al. | |
| 2010/0069726 A1 | 3/2010 | Levinson | |
| 2010/0125113 A1 | 5/2010 | Xiao et al. | |
| 2010/0150511 A1 | 6/2010 | Arsenault et al. | |
| 2010/0155325 A1 | 6/2010 | Zhang et al. | |
| 2010/0188732 A1 | 7/2010 | Akashi et al. | |
| 2010/0216310 A1 | 8/2010 | Metz et al. | |
| 2010/0218716 A1 | 9/2010 | Havens et al. | |
| 2010/0235107 A1 | 9/2010 | Fukumura et al. | |
| 2010/0244169 A1 | 9/2010 | Maeda et al. | |
| 2010/0315703 A1* | 12/2010 | Purdy | G02B 1/005 359/566 |
| 2011/0019277 A1 | 1/2011 | Sager et al. | |
| 2011/0097814 A1 | 4/2011 | Bommarito et al. | |
| 2011/0111173 A1 | 5/2011 | Ogawa et al. | |
| 2011/0140106 A1 | 6/2011 | Forbes | |
| 2011/0194261 A1 | 8/2011 | Tanaka et al. | |
| 2011/0233476 A1 | 9/2011 | Arsenault | |
| 2011/0255035 A1 | 10/2011 | Wu | |
| 2012/0051489 A1 | 3/2012 | Varanasi et al. | |
| 2012/0073388 A1 | 3/2012 | Chibante | |
| 2012/0074612 A1 | 3/2012 | Scrivens et al. | |
| 2012/0152338 A1 | 6/2012 | Ha et al. | |
| 2012/0225517 A1 | 9/2012 | Zhang et al. | |
| 2012/0262789 A1 | 10/2012 | Xie et al. | |
| 2012/0281292 A1 | 11/2012 | Baca et al. | |
| 2012/0293802 A1 | 11/2012 | Ozin et al. | |
| 2012/0313205 A1 | 12/2012 | Haddad et al. | |
| 2012/0321810 A1 | 12/2012 | Tebby et al. | |
| 2013/0029128 A1* | 1/2013 | Nair | B32B 3/26 521/146 |
| 2013/0078750 A1 | 3/2013 | Yeo et al. | |
| 2013/0199995 A1 | 8/2013 | Jiang et al. | |
| 2013/0215513 A1 | 8/2013 | Liang et al. | |
| 2013/0222881 A1 | 8/2013 | Aizenberg et al. | |
| 2013/0258483 A1 | 10/2013 | Pett et al. | |
| 2013/0320467 A1 | 12/2013 | Buchanan et al. | |
| 2013/0340824 A1 | 12/2013 | Oh et al. | |
| 2014/0017145 A1* | 1/2014 | Aizenberg | C08G 59/502 422/425 |
| 2014/0106468 A1 | 4/2014 | Boersma | |
| 2014/0166100 A1 | 6/2014 | Watanabe et al. | |
| 2014/0319524 A1 | 10/2014 | Phillips et al. | |
| 2015/0035269 A1 | 2/2015 | Hooper et al. | |
| 2015/0157453 A1 | 6/2015 | Nazirizadeh et al. | |
| 2015/0276989 A1 | 10/2015 | Han et al. | |
| 2016/0032141 A1 | 2/2016 | Maghsoodi et al. | |
| 2016/0254395 A1 | 9/2016 | Jiang et al. | |
| 2016/0257036 A1* | 9/2016 | Fang | C08F 222/10 |
| 2016/0326334 A1 | 11/2016 | Jiang et al. | |
| 2017/0044340 A1* | 2/2017 | Farah | H01L 31/049 |
| 2017/0209045 A1 | 7/2017 | Choo et al. | |
| 2017/0215790 A1 | 8/2017 | Levinson et al. | |
| 2017/0225395 A1 | 8/2017 | Boydston et al. | |
| 2017/0271259 A1 | 9/2017 | Hotta et al. | |

FOREIGN PATENT DOCUMENTS

| | | |
|---|---|---|
| EP | 0341675 A2 | 11/1989 |
| EP | 2220520 A2 | 8/2010 |
| WO | 9820388 A1 | 5/1998 |
| WO | 2000010934 A1 | 3/2000 |
| WO | 02073699 A3 | 11/2002 |
| WO | 2007070486 A2 | 6/2007 |
| WO | 2008060322 A2 | 5/2008 |
| WO | 2010007853 A1 | 1/2010 |
| WO | 2015066337 A1 | 5/2015 |
| WO | 2018213570 A2 | 11/2018 |

OTHER PUBLICATIONS

Gourevich, I.; Pham, H.; Jonkman, J. E. N.; Kumacheva, E., Multidye Nanostructured Material for Optical Data Storage and Security Labeling. Chem. Mater. 2004, 16, 1471-1479.

Pham, H. H.; Gourevich, I.; Oh, J. K.; Jonkman, J. E. N.; Kumacheva, E., A Multidye Nanostructured Material for Optical Data Storage

(56) References Cited

OTHER PUBLICATIONS and Security Data Encryption. Adv. Mater. 2004, 16, 516-520.

Zhao, Y.; Xie, Z.; Gu, H.; Zhu, C.; Gu, Z., Bio-Inspired Variable Structural Color Materials. Chem. Soc. Rev. 2012, 41, 3297-3317.

Potyrailo, R. A.; Ghiradella, H.; Vertiatchikh, A.; Dovidenko, K.; Cournoyer, J. R.; Olson, E., Morpho Butterfly Wing Scales Demonstrate Highly Selective Vapour Response. Nat. Photonics 2007, 1, 123-128.

Burgess, I. B.; Loncar, M.; Aizenberg, J., Structural Colour in Colourimetric Sensors and Indicators. J. Mater. Chem. C 2013, 1, 6075-6086.

Fu, Q. Q.; Zhu, B. T.; Ge, J. P., Hierarchically Structured Photonic Crystals for Integrated Chemical Separation and Colorimetric Detection. Nanoscale 2017, 9, 2457-2463.

Lv, T.; Cheng, Z.; Zhang, D.; Zhang, E.; Zhao, Q.; Liu, Y.; Jiang, L., Superhydrophobic Surface with Shape Memory Micro/Nanostructure and Its Application in Rewritable Chip for Droplet Storage. ACS Nano 2016, 10, 9379-9386.

Aguirre, C. I.; Reguera, E.; Stein, A., Tunable Colors in Opals and Inverse Opal Photonic Crystals. Adv. Funct. Mater. 2010, 20, 2565-2578.

Boyle, B. M.; French, T. A.; Pearson, R. M.; Mccarthy, B. G.; Miyake, G. M., Structural Color for Additive Manufacturing: 3d-Printed Photonic Crystals from Block Copolymers. ACS Nano 2017, 11, 3052-3058.

Velev, O. D.; Gupta, S., Materials Fabricated by Micro- and Nanoparticle Assembly—the Challenging Path from Science to Engineering. Adv. Mater. 2009, 21, 1897-1905.

Cai, Z. Y.; Kwak, D. H.; Punihaole, D.; Hong, Z. M.; Velankar, S. S.; Liu, X. Y.; Asher, S. A., A Photonic Crystal Protein Hydrogel Sensor for Candida Albicans. Angew. Chem. Int. Ed. 2015, 54, 13036-13040.

Kuznetsov, A. I.; Miroshnichenko, A. E.; Brongersma, M. L.; Kivshar, Y. S.; Luk'yanchuk, B., Optically Resonant Dielectric Nanostructures. Science 2016, 354, 2472.

Vlasov, Y. A.; Bo, X. Z.; Sturm, J. C.; Norris, D. J., On-Chip Natural Assembly of Silicon Photonic Bandgap Crystals. Nature 2001, 414, 289-293.

Mao, D.; Qiao, X.; Dong, L., Design of Nano-Opto-Mechanical Reconfigurable Photonic Integrated Circuit. J. Lightwave Technol. 2013, 31, 1660-1669.

Park, H. G.; Kim, S. H.; Kwon, S. H.; Ju, Y. G.; Yang, J. K.; Baek, J. H.; Kim, S. B.; Lee, Y. H., Electrically Driven Single-Cell Photonic Crystal Laser. Science 2004, 305, 1444-1447.

Hu, H.; Chen, Q.-W.; Tang, J.; Hu, X. Y.; Zhou, X.-H., Photonic Anti-Counterfeiting Using Structural Colors Derived from Magnetic-Responsive Photonic Crystals with Double Photonic Bandgap Heterostructures. J. Mater. Chem. 2012, 22, 11048-11053.

Cho, Y.; Lee, S. Y.; Ellerthorpe, L.; Feng, G.; Lin, G. J.; Wu, G. X.; Yin, J.; Yang, S., Elastoplastic Inverse Opals as Power-Free Mechanochromic Sensors for Force Recording. Adv. Funct. Mater. 2015, 25, 6041-6049.

Heo, Y.; Lee, S. Y.; Kim, J. W.; Jeon, T. Y.; Kim, S. H., Controlled Insertion of Planar Defect in Inverse Opals for Anticounterfeiting Applications. ACS Appl. Mater. Interfaces 2017, 9, 43098-43104.

Hou, J.; Zhang, H.; Su, B.; Li, M.; Yang, Q.; Jiang, L.; Song, Y., Four-Dimensional Screening Anti-Counterfeiting Pattern by Inkjet Printed Photonic Crystals. Chem.—An Asian J. 2016, 11, 2680-2685.

Yang, D. P.; Qin, Y. H.; Ye, S. Y.; Ge, J. P., Polymerization-Induced Colloidal Assembly and Photonic Crystal Multilayer for Coding and Decoding. Adv. Funct. Mater. 2014, 24, 817-825.

Lee, H. S.; Shim, T. S.; Hwang, H.; Yang, S. M.; Kim, S. H., Colloidal Photonic Crystals toward Structural Color Palettes for Security Materials. Chem. Mater. 2013, 25, 2684-2690.

Shang, S. L.; Zhang, Q. H.; Wang, H. Z.; Li, Y. G., Fabrication of Magnetic Field Induced Structural Colored Films with Tunable Colors and Its Application on Security Materials. J. Colloid Interface Sci. 2017, 485, 18-24.

Peng, C. Y.; Hsu, C. W.; Li, C. W.; Wang, P. L.; Jeng, C. C.; Chang, C. C.; Wang, G. J., Flexible Photonic Crystal Material for Multiple Anticounterfeiting Applications. ACS Appl. Mater. Interfaces 2018, 10, 9858-9864.

Keller, K.; Yakovlev, A. V.; Grachova, E. V.; Vinogradov, A. V., Inkjet Printing of Multicolor Daylight Visible Opal Holography. Adv. Funct. Mater. 2018, 28, 1706903.

Wu, S. L.; Liu, B. Q.; Su, X.; Zhang, S. F., Structural Color Patterns on Paper Fabricated by Inkjet Printer and Their Application in Anticounterfeiting. J. Phys. Chem. Lett. 2017, 8, 2835-2841.

Meng, Y.; Liu, F. F.; Umair, M. M.; Ju, B. Z.; Zhang, S. F.; Tang, B. T., Patterned and Iridescent Plastics with 3d Inverse Opal Structure for Anticounterfeiting of the Banknotes. Adv. Opt. Mater. 2018, 6, 1701351.

Lee, E.; Yang, S., Bio-Inspired Responsive Polymer Pillar Arrays. MRS Commun. 2015, 5, 97-114.

Meng, Z. P.; Wu, S. L.; Tang, B. T.; Ma, W.; Zhang, S. F., Structurally Colored Polymer Films with Narrow Stop Band, High Angle-Dependence and Good Mechanical Robustness for Trademark Anti-Counterfeiting. Nanoscale 2018, 10, 14755-14762.

Wang, M. S.; Yin, Y. D., Magnetically Responsive Nanostructures with Tunable Optical Properties. J. Am. Chem. Soc. 2016, 138, 6315-6323.

Han, M. G.; Shin, C. G.; Jeon, S.-J.; Shim, H.; Heo, C.-J.; Jin, H.; Kim, J. W.; Lee, S., Full Color Tunable Photonic Crystal from Crystalline Colloidal Arrays with an Engineered Photonic Stop-Band. Adv. Mater. 2012, 24, 6438-6444.

Ge, J. P.; Yin, Y. D., Responsive Photonic Crystals. Angew. Chem. Int. Ed. 2011, 50, 1492-1522.

Heo, Y.; Kang, H.; Lee, J. S.; Oh, Y. K.; Kim, S. H., Lithographically Encrypted Inverse Opals for Anti-Counterfeiting Applications. Small 2016, 12, 3819-3826.

Zhong, K.; Li, J. Q.; Liu, L. W.; Van Cleuvenbergen, S.; Song, K.; Clays, K., Instantaneous, Simple, and Reversible Revealing of Invisible Patterns Encrypted in Robust Hollow Sphere Colloidal Photonic Crystals. Adv. Mater. 2018, 30, 1707246.

Burgess, I. B.; Mishchenko, L.; Hatton, B. D.; Kolle, M.; Loncar, M.; Aizenberg, J., Encoding Complex Wettability Patterns in Chemically Functionalized 3d Photonic Crystals. J. Am. Chem. Soc. 2011, 133, 12430-12432.

Hu, H. B.; Zhong, H.; Chen, C. L.; Chen, Q. W., Magnetically Responsive Photonic Watermarks on Banknotes. J. Mater. Chem. C 2014, 2, 3695-3702.

Ding, T.; Cao, G. S.; Schaefer, C. G.; Zhao, Q. B.; Gallei, M.; Smoukov, S. K.; Baumberg, J. J., Revealing Invisible Photonic Inscriptions: Images from Strain. ACS Appl. Mater. Interfaces 2015, 7, 13497-13502.

Ye, S. Y.; Fu, Q. Q.; Ge, J. P., Invisible Photonic Prints Shown by Deformation. Adv. Funct. Mater. 2014, 24, 6430-6438.

Nam, H.; Song, K.; Ha, D.; Kim, T., Inkjet Printing Based Mono-Layered Photonic Crystal Patterning for Anti-Counterfeiting Structural Colors. Sci. Rep. 2016, 6, 30885.

Lendlein, A.; Kelch, S., Shape-Memory Polymers. Angew. Chem. Int. Ed. 2002, 41, 2034-2057.

Zhao, Q.; Zou, W. K.; Luo, Y. W.; Xie, T., Shape Memory Polymer Network with Thermally Distinct Elasticity and Plasticity. Sci. Adv. 2016, 2, e1501297.

Zhao, Q.; Qi, H. J.; Xie, T., Recent Progress in Shape Memory Polymer: New Behavior, Enabling Materials, and Mechanistic Understanding. Prog. Polym. Sci. 2015, 49-50, 79-120.

Zhang, G. G.; Zhao, Q.; Zou, W. K.; Luo, Y. W.; Xie, T., Unusual Aspects of Supramolecular Networks: Plasticity to Elasticity, Ultrasoft Shape Memory, and Dynamic Mechanical Properties. Adv. Funct. Mater. 2016, 26, 931-937.

Mather, P. T.; Luo, X.; Rousseau, I. A., Shape Memory Polymer Research. Annu. Rev. Mater. Res. 2009, 39, 445-471.

Schauer, S.; Meier, T.; Reinhard, M.; Rohrig, M.; Schneider, M.; Heilig, M.; Kolew, A.; Worgull, M.; Holscher, H., Tunable Diffractive Optical Elements Based on Shape-Memory Polymers Fabricated Via Hot Embossing. ACS Appl. Mater. Interfaces 2016, 8, 9423-9430.

(56) References Cited

OTHER PUBLICATIONS

Li, P.; Han, Y.; Wang, W. X.; Liu, Y. J.; Jin, P.; Leng, J. S., Novel Programmable Shape Memory Polystyrene Film: A Thermally Induced Beam-Power Splitter. Sci. Rep. 2017, 7, 44333.
Moirangthem, M.; Engels, T. A. P.; Murphy, J.; Bastiaansen, C. W. M.; Schenning, A., Photonic Shape Memory Polymer with Stable Multiple Colors. ACS Appl. Mater. Interface 2017, 9, 32161-32167.
Moirangthem, M.; Arts, R.; Merkx, M.; Schenning, A., An Optical Sensor Based on a Photonic Polymer Film to Detect Calcium in Serum. Adv. Funct. Mater. 2016, 26, 1154-1160.
Fang, Y.; Ni, Y. L.; Leo, S. Y.; Taylor, C.; Basile, V.; Jiang, P., Reconfigurable Photonic Crystals Enabled by Pressure-Responsive Shape-Memory Polymers. Nat. Commun. 2015, 6, 7416.
Fang, Y.; Ni, Y. L.; Choi, B.; Leo, S. Y.; Gao, J.; Ge, B.; Taylor, C.; Basile, V.; Jiang, P., Chromogenic Photonic Crystals Enabled by Novel Vapor-Responsive Shape Memory Polymers. Adv. Mater. 2015, 27, 3696-3704.
Fang, Y.; Leo, S. Y.; Ni, Y. L.; Wang, J. Y.; Wang, B. C.; Yu, L.; Dong, Z.; Dai, Y. Q.; Basile, V.; Taylor, C.; Jiang, P., Reconfigurable Photonic Crystals Enabled by Multistimuli-Responsive Shape Memory Polymers Possessing Room Temperature Shape Processability. ACS Appl. Mater. Interfaces 2017, 9, 5457-5467.
Leo, S. Y.; Zhang, W.; Zhang, Y. F.; Ni, Y. L.; Jiang, H.; Jones, C.; Jiang, P.; Basile, V.; Taylor, C., Chromogenic Photonic Crystal Sensors Enabled by Multistimuli-Responsive Shape Memory Polymers. Small 2018, 14, 1703515.
Stöber, W.; Fink, A.; Bohn, E., Controlled Growth of Monodisperse Silica Spheres in Micron Size Range. J. Colloid Interface Sci. 1968, 26, 62-69.
Jiang, P.; Bertone, J. F.; Hwang, K. S.; Colvin, V. L., Single-Crystal Colloidal Multilayers of Controlled Thickness. Chem. Mater. 1999, 11, 2132-2140.
Mittleman, D. M.; Bertone, J. F.; Jiang, P.; Hwang, K. S.; Colvin, V. L., Optical Properties of Planar Colloidal Crystals: Dynamical Diffraction and the Scalar Wave Approximation. J. Chem. Phys. 1999, 111, 345-354.
Velev, O. D.; Jede, T. A.; Lobo, R. F.; Lenhoff, A. M., Porous Silica Via Colloidal Crystallization. Nature 1997, 389, 447-448.
Yunus, S.; de Looringhe, C. D.; Poleunis, C.; Delcorte, A., Diffusion of Oligomers from Polydimethylsiloxane Stamps in Microcontact Printing: Surface Analysis and Possible Application. Surf. Interface Anal. 2007, 39, 922-925.
McDonald, J. C.; Whitesides, G. M., Poly(Dimethylsiloxane) as a Material for Fabricating Microfluidic Devices, Acc. Chem. Res. 2002, 35, 491-499.
Dangla, R.; Gallaire, F.; Baroud, C. N., Microchannel Deformations Due to Solvent-Induced Pdms Swelling. Lab Chip 2010, 10, 2972-2978.
Lee, J. N.; Park, C.; Whitesides, G. M., Solvent Compatibility of Poly(Dimethylsiloxane)-Based Microfluidic Devices. Anal. Chem. 2003, 75, 6544-6554.
Mata, A.; Fleischman, A. J.; Roy, S., Characterization of Polydimethylsiloxane (Pdms) Properties for Biomedical Micro/Nanosystems. Biomed. Microdevices 2005, 7, 281-293.
Stojilovic, N., Why Can't We See Hydrogen in X-Ray Photoelectron Spectroscopy? J. Chem. Edu. 2012, 89, 1331-1332.
Louette, P.; Bodino, F.; Pireaux, J. J., Poly(Dimethyl Siloxane) (Pdms) Xps Reference Core Level and Energy Loss Spectra Surf. Sci. Spectra 2006, 12, 38-43.
Li, H. L.; Wang, J. X., Yang, L. M.; Song, Y. L., Superoleophilic and Superhydrophobic Inverse Opals for Oil Sensors. Adv. Funct. Mater. 2008, 18, 3258-3264.
Gregg, S. J.; Sing, K. S. W., Adsorption, Surface Area and Porosity, 2nd ed.; Academic Press Inc.: London, 1982.
Joannopoulos, J. D.; Meade, R. D.; Winn, J. N., Photonic Crystals: Molding the Flow of Light. Princeton University Press: Princeton, 1995.
Fudouzi et al., "Colloidal Crystals with Tunable Colors and Their Use as Photonic Papers", Langmuir 2003, 19: 9653-9660.

G. Zhou, J. He, J. "Antireflective coatings on Fresnel lenses by spin-coating of solid silica nanoparticles", Nanosci. Nanotechnol. 13 (2013) Abstract.
G.M. Nogueira, D. Banerjee, R.E. Cohen, M.F. Rubner, "Spray-Layer-by-Layer Assembly Can More Rapidly Produce Optical-Quality Multistack Heterostructures", Langmuir 27 (2011) 7860-7867.
Ge et al., "Highly Tunable Superparamagnetic Colloidal Photonic Crystals", Angew. Chem. Int. Ed. 2007, 46: 7428-7431.
Ge et al., "Rewritable Photonic Paper with Hygroscopic Salt Solution as Ink", Advanced Materials 2009, 21: 4259-4264.
Gemici et al., "Targeted Functionalization of Nanoparticle Thin Films via Capillary Condensation", Nano Letters 2009, 9, 3: 1064-1070.
Gourevich, Ilya, et al. "Multidye nanostructured material for optical data storage and security labeling." Chemistry of materials 16.8 (2004): 1472-1479.
Grigoras et al., Fabrication of porous membrane filter from p-type silicon, Physica Status Solidi (a) 202(8): 1624-1628.
Gu et al., "Water-triggered shape memory of multiblock thermoplastic polyurethanes (TPUs)", RSC Adv. 2013, 3: 15783-15791.
Gugliuzza et al., "A review on membrane engineering for innovation in wearable fabrics and protective textiles", Journal of Membrane Science 446(2013): 350-375.
H. Fudouzi, M. Kobayashi, N. Shinya, "Assembly of Microsized Colloidal Particles on Electrostatic Regions Patterned through Ion Beam Irradiation", Langmuir 18 (2002) 7648-7652.
H. Jiang, K. Yu, Y.C. Wang, "Antireflective structures via spin casting of polymer latex", Opt. Lett. 32 (2007) 575-577.
H. Nagel, A. Metz, R. Hezel, "Porous SiO2 films prepared by remote plasma-enhanced chemical vapour deposition—a novel antireflection coating technology for photovoltaic modules", Sol. Energ. Mater. Sol. C. 65 (2001) 71-77.
H. Shimomura, Z. Gemici, R.E. Cohen, M.F. Rubner, "Layer-by-Layer-Assembled High-Performance Broadband Antireflection Coatings", ACS Appl. Mater. Interface 2 (2010) 813-820.
Yue et al., "Mechano-actuated ultrafast full-colour switching in layered photonic hydrogels", nature communications 2014: 1-8.
H.Y. Koo, D.K. Yi, S.J. Yoo, D.Y. Kim, "A Snowman-like Array of Colloidal Dimers for Antireflecting Surfaces** ", Adv. Mater. 16 (2004) 274-277.
Habault et al., "Light-triggered self-healing and shape-memory polymers", Chem. Soc. Rev. 2013, 42: 7244-7256.
Han et al., "Full Color Tunable Photonic Crystal from Crystalline Colloidal Arrays with an Engineered Photonic Stop-Band", Adv. Mater. 2012, 24,: 6438-6444.
Han, H; et al. "Metal-assisted chemical etching of silicon and nanotechnology applications" ScienceDirect 2014, 9, 271-304.
Yue et al., "Lamellar Hydrogels with High Toughness and Ternary Tunable Photonic Stop-Band", Advanced Materials 2013, 25: 3106-3110.
Hatton et al., "Assembly of large-area, highly ordered, crack-free inverse opal films", PNAS 2010, vol. 107, 23: 10354-10359.
Heintze, Siegward D; et al. "Survival of zirconia-and metal-supported fixed dental prostheses: a systematic review." International Journal of Prosthodontics 23.6 (2010).
Herrmann, M. "Corrosion of silicon nitride materials in aqueous solutions." Journal of the American Ceramic Society 96.10 (2013): 3009-3022.
Herrmann, M., et al. "Corrosion of silicon nitride materials in acidic and basic solutions and under hydrothermal conditions." Journal of the European Ceramic Society 23.4 (2003): 585-594.
Heuwers et al., "Shape-Memory Natural Rubber: An Exceptional Material for Strain and Energy Storage", Macromolecular Chemistry and Physics 2013, 214: 912-923.
Heuwers et al., "Stress-Induced Stabilization of Crystals in Shape Memory Natural Rubber", Macromolecular Rapid Communications 2013, 34: 180-184.
Holtz et al., "Polymerized colloidal crystal hydrogel films as intelligent chemical sensing materials", Nature 1997, 389: 829-832.
Huang et al., "Water-driven programmable polyurethane shape memory polymer: Demonstration and mechanism", Applied Physics Letters 2005, 86: 1-3.

(56) References Cited

OTHER PUBLICATIONS

Huang, Z; et al. "Metal-Assisted chemical etching of silicon: a review" Advanced Materials 2011, 23, 285-308.
International Preliminary Report on Patentability dated May 10, 2013 for PCT Patent Application No. PCT/US2011/057484.
International Search Report and Written Opinion for PCT/US2014/063163 mailed Jun. 25, 2015.
International Search Report and Written Opinion issued in PCT/US2017/046886 on Oct. 20, 2017.
International Search Report and Written Opinion mailed on Jun. 26, 2012 for PCT Patent Application No. PCT/US2011/057484.
International Search Report for International Application No. PCT/US2018/033173, dated Nov. 21, 2018.
International Search Report for PCT/US19/38193 of Sep. 5, 2019.
International Search Report for PCT/US2018/066234 mailed Mar. 25, 2019.
International Search Report for PCT/US2018/066349 of Mar. 15, 2019.
International Search Report for PCT/US2018/066353 of Mar. 15, 2019.
Ionov, Leonid. "Soft microorigami: self-folding polymer films." Soft Matter 7.15 (2011): 6786-6791.
J. Aizenberg, P.V. Braun, P. Wiltzius, "Patterned Colloidal Deposition Controlled by Electrostatic and Capillary Forces", Phys. Rev. Lett. 84 (2000) 2997-3000.
J. Tien, A. Terfort, G.M. Whitesides, "Microfabrication through Electrostatic Self-Assembly", Langmuir 13 (1997) 5349-5355.
J.-H. Kim, S. Fujita, S. Shiratori, "Design of a thin film for optical applications, consisting of high and low refractive Index multilayers, fabricated by a layer-by-layer self-assembly method", Colloid Surf. Aspects 284-285 (2006) 290-294.
J.A. Hiller, J.D. Mendelsohn, M.F. Rubner, "Reversibly erasable nanoporous anti-reflection coatings from polyelectrolyte multilayers", Nat. Mater. 1 (2002) 59-63.
J.Q. Xi, M.F. Schubert, J.K. Kim, E.F. Schubert, M. Chen, S.-Y. Lin, LiuW, J.A. Smart, "Optical thin-film materials with low refractive index for broadband elimination of Fresnel reflection", Nat. Photon. 1 (2007) 176-179.
Jang et al., "Combining Pattern Instability and Shape-Memory Hysteresis for Phononic Switching", Nano Lett. 2009, 9, 5: 2113-2119.
Jiang et al., "Template-Directed Preparation of Macroporous Polymers with Oriented and Crystalline Arrays of Voids", J. Am. Chem. Soc. 1999, 121: 11630-11637.
Jiang et al., Template-Directed Preparation of Macroporous Polymers with Oriented and Crystalline Arrays of Voids, Journal of the American Chemical Society 1999, 121(50): 11630-11637.
Joannopoulos, J. D.; et al. Photonic Crystals: Molding the Flow of Light. Princeton University Press: Princeton, 1995.
K. Askar, B.M. Phillips, X. Dou, J. Lopez, C. Smith, B. Jiang, P. Jiang, "Self-assembled nanoparticle antiglare coatings", Opt. Lett. 37 (2012) 4380-4382.
K.M. Yeung, W.C. Luk, K.C. Tam, C.Y. Kwong, M.A. Tsai, H.C. Kuo, A.M.C. Ng, A.B. Djurisic, "2-Step self-assembly method to fabricate broadband omnidirectional antireflection coating in large scale", Sol Energ Mater Sol C 95 (2011) 699-703.
S. Degand, G. Lamblin, C.C. Dupont-Gillain, "Colloidal lithography using silica particles: Improved particle distribution and tunable wetting properties", J. Colloid Interf. Sci. 392 (2013) 219-225.
S. Lu,; et al. "Receptor-Ligand-Based Specific Cell Adhesion on Solid Surfaces: Hippocampal Neuronal Cells on Bilinker Functionalized Glass" Nano Lett. 6 (2006) 1977-1981.
S. Walheim, E. Schäffer, J. Mlynek, U. Steiner, "Nanophase-Separated Polymer Films as High-Performance Antireflection Coatings", Science 283 (1999) 520-522.
S.P. Pack, N.K. Kamisetty, M. Nonogawa, K.C. Devarayapalli, K. Ohtani, K. Yamada, Y. Yoshida, T. Kodaki, K. Makino, "Direct immobilization of DNA oligomers onto the amine-functionalized glass surface for DNA microarray fabrication through the activation-free reaction of oxanine", Nucleic Acids Res. 35 (2007), 10 pages.

Sailer, Irena, et al. "A systematic review of the survival and complication rates of all-ceramic and metal-ceramic reconstructions after an observation period of at least 3 years. Part II: fixed dental prostheses." Clinical oral implants research 18 (2007): 86-96.
Salido, María P., et al. "Prospective clinical study of zirconia-based posterior four-unit fixed dental prostheses: four-year follow-up." International Journal of Prosthodontics 25.4 (2012).
Schäfer et al., "Fully Reversible Shape Transition of Soft Spheres in Elastomeric Polymer Opal Films", Langmuir 2013, 29: 11275-11283.
Schäfer et al., "Reversible Light-, Thermo-, and Mechano-Responsive Elastomeric Polymer Opal Films", Chemistry of Materials 2013, 25: 2309-2318.
Schneider, Friedrich. "The financial flows of transnational crime and tax fraud in OECD countries: What do we (not) know?." Public Finance Review 41.5 (2013): 677-707.
Scurria, Mark S.; et al. "Meta-analysis of fixed partial denture survival: prostheses and abutments." The Journal of prosthetic dentistry 79.4 (1998): 459-464.
Small IV, et al., "Laser-activated shape memory polymer intravascular thrombectomy device", Optics Express 2005, 13: 8204-8213.
Stuart et al., "Emerging applications of stimuli-responsive polymer materials", Nature Materials 2010, 9: 101-113.
Sun; et al. "Broadband moth-eye antireflection coatings on silicon" Applied Physics Letters; Feb. 14, 2008, vol. 92, pp. 061112 (1)-(3).
T. Lohmueller, M. Helgert, M. Sundermann, R. Brunner, J.P. Spatz, "Biomimetic Interfaces for High-Performance Optics in the Deep-UV Light Range", Nano Lett. 8 (2008) 1429-1433.
T. Xie, "Recent advances in polymer shape memory", Polymer 2011, 52: 4985-5000.
Takeoka et al., "Polymer Gels that Memorize Structures of Mesoscopically Sized Templates. Dynamic and Optical Nature of Periodic Ordered Mesoporous Chemical Gels", Langmuir 2002, 18: 5977-5980.
Tobushi et al., "Thermomechanical properties in a thin film of shape memory polymer of polyurethane series", Smart Mater. Struct. (1996) 5: 483-491.
Toor, F; et al. "Nanostructured silicon via metal assisted catalyzed etch (MACE): chemistry fundamentals and pattern engineering" Nanotechnology 2016, 27, 412003.
Tsai et al., "Retainment of pore connectivity in membranes prepared with vapor-induced phase separation", Journal of Membrane Science 2010, 362: 360-373.
J. Schulz, "Review of modern techniques to generate antireflective propoerties on thermoplastic polymers", Appl. Opt. 45 (2006) 1608-1618.
Yang et al., "From Metastable Colloidal Crystalline Arrays to Fast Responsive Mechanochromic Photonic Gels: An Organic Gel for Deformation-Based Display Panels", Adv. Funct. Mater. 2014, 24: 3197-3205.
Yakacki, Christopher M., et al. "Impact of shape-memory programming on mechanically-driven recovery in polymers." Polymer 52.21 (2011): 4947-4954.
Velev et al., "Porous silica via colloidal crystallization", Nature 1997, 389: 447-448.
W.L. Min, B. Jiang, P. Jiang, "Bioinspired Self-Cleaning Antireflection Coatings", Adv. Mater. 20 (2008) 3914-3918.
Wang, Zhen, et al. "Programmable, pattern-memorizing polymer surface." Advanced Materials 23.32 (2011): 3669-3673.
Weissman et al., "Thermally Switchable Periodicities and Diffraction from Mesoscopically Ordered Materials", Science 1996, 274: 959-960.
Witt, Kendhl Kate. "Optical Sensors for the Analysis of Alcohols in Fuels." (2016).
Woo et al., Preparation and characterization of three dimensionally ordered macroporous Li4Ti5O12 anode for lithium batteries, Electrochimica Acta 2007, 53(1): 79-82.
Yakacki et al., "Unconstrained recovery characterization of shape-memory polymer networks for cardiovascular applications", ScienceDirect, Biomaterials 2007, 28: 2255-2263.
X. Li, O. Niitsoo, A. Couzis, "Electrostatically driven adsorption of silica nanoparticles on functionalized surfaces", J. Colloid Interf. Sci. 394 (2013) 26-35.

(56) References Cited

OTHER PUBLICATIONS

X. Li, O. Niitsoo, A. Couzis, "Experimental studies on irreversibility of electrostatic adsorption of silica nanoparticles at solid-liquid interface", J. Colloid Interf. Sci. 420 (2014) 50-56.

X.T. Zhang, O. Sato, M. Taguchi, Y. Einaga, T. Murakami, A. Fujishima, "Self-Cleaning Particle Coating with Antireflection Properties", Chem. Mater. 17 (2005) 696-700.

Xie et al., "Encoding Localized Strain History Through Wrinkle Based Structural Colors", Advanced Materials 2010, 22: 4390-4394.

Xu et al., "Deformable, Programmable, and Shape-Memorizing Micro-Optics", Advanced Functional Materials 2013, 23: 3299-3306.

Xue et al., "Synthesis and characterization of elastic star shape-memory polymers as self-expandable drug-eluting stents", Journal of Materials Chemistry 2012, 22: 7403-7411.

Y. Masuda, M. Itoh, T. Yonezawa, K. Koumoto, "Low-Dimensional Arrangement of SiO2 Particles", Langmuir 18 (2002) 4155-4159.

Y. Zhao, U.S. Wang, G.Z. Mao, "Colloidal subwavelength nanostructures for antireflection optical coatings", Opt. Lett. 30 (2005) 1885-1887.

Yakacki et al., "Shape-Memory Polymers for Biomedical Applications", Adv. Polym. Sci. 2010, 226: 147-175.

H.A. Macleod, Thin-Film Optical Filters. Third ed., Institute of Physics Publishing, Bristol, 2001, 666 pages.

A. Luque, S. Hegedus, Handbook of Photovoltaic Science and Engineering. John Wiley & Sons, West Sussex, 2003, 115 pages.

A. Lendlein, "Shape-Memory Polymers", Advances in Polymer Science 226, Springer, New York, NY 2010, 1-209.

Chen, Chi-Mon and Shu Yang, "Directed Water Shedding on High-Aspect-Ratio Shape Memory Polymer Micropillar Arrays," Advanced Materials, 2014, pp. 1283-1288, vol. 26, doi: 10.1002/adma.201304030.

International Search Report for International Application No. PCT/US2019/017862, mailed Jan. 21, 2020.

"Light" Wikipedia https://en.wikipedia.orgiwiindex.php?title=Light&oldid=797818857 (accessed Feb. 22, 2019).

"Using polyimide tape to mask against reactive-ion etching" Tech Briefs, 2002 (accessed Feb. 22, 2019).

A. Deak, B. Bancsi, A.L. Toth, A.L. Kovacs, Z. Horvolgyi, "Complex Langmuir-Blodgett films from silica nanoparticles: An optical spectroscopy study", Colloid Surf. A 278 (2006) 10-16.

A. Deak, I. Szekely, E. Kalman, Z. Keresztes, A.L. Kovacs, Z. Horvolgyi, "Nanostructured silica Langmuir-Blodgett films with antireflective properties prepared on glass substrates", Thin Solid Films 484 (2005) 310-317.

A. Gombert, B. Blasi, C. Buhler, P. Nitz, J. Mick, W. Hossfeld, M. Niggemann, "Some application cases and related manufacturing techniques for optically functional microstructures on large areas", Opt. Eng. 43 (2004) 2525-2533.

A. Gombert, W. Glaubitt, K. Rose, J. Dreibholz, B. Bläsi, A. Heinzel, D. Sporn, W. Doll, V. Wittwer, "Subwavelength- structured antireflective surfaces on glass", Thin Solid Films 351 (1999) 73-78.

Zhang, Haixia, et al. "Application of PECVD SiC in glass micromachining." Journal of Micromechanics and Microengineering 17.4 (2007): 775.

Zhang et al., Fabrication and bioseparation studies of adsorptive membranes/felts made from electrospun cellulose acetate nanofibers, Journal of Membrane Science 2008, 319(1-2):176-184.

Aksoy, Gökhan, et al. "Effect of various treatment and glazing (coating) techniques on the roughness and wettability of ceramic dental restorative surfaces." Colloids and surfaces B: Biointerfaces 53.2 (2006): 254-259.

Al-Marzok, Maan; et al. "The effect of the surface roughness of porcelain on the adhesion of oral *Streptococcus* mutans." J Contemp Dent Pract 10.6 (2009): E017-24.

Arsenault et al., "From colour fingerprinting to the control of photoluminescence in elastic photonic crystals", nature materials 2006, 5: 179-184.

Asher et al., "Photonic Crystal Carbohydrate Sensors: Low Ionic Strength Sugar Sensing", J. Am. Chem. Soc. 2003, 125: 3322-3329.

B.-T. Liu, Y.-T. Teng, R.-H. Lee, W.-C. Liaw, C.-H. Hsieh, "Strength of the interactions between light-scattering particles and resins affects the haze of anti-glare films", Colloid Surf. A 389 (2011) 138-143.

B.E. Yoldas, D.P. Partlow, "Formation of Broad Band Antireflective Coatings on Fused Silica for High Power Laser Applications", Thin Solid Films 129 (1985) 1-14.

B.G. Prevo, E.W. Hon, O.D. Velev, "Assembly and characterization of colloid-based antireflective coatings on multicrystalline silicon solar cells", J. Mater. Chem. 17 (2007) 791-799.

B.G. Prevo, O.D. Velev, "Controlled, Rapid Deposition of Structured Coatings from Micro- and Nanoparticle Suspensions", Langmuir 20 (2004) 2099-2107.

B.T. Liu, W.D. Yeh, "Antireflective surface fabricated from colloidal silica nanoparticles", Colloid Surf. A 356 (2010) 145-149.

B.T. Liu, W.D. Yeh, "Reflective properties of nanoparticle-arrayed surfaces", Thin Solid Films 518 (2010) 6015-6021.

B.T. Liu; et al. "A novel method to control inner and outer haze of an anti-glare film by surface modification of light-scattering particles", J. Colloid Interf. Sci. 350 (2010) 421-426.

Bartlett, D. W., et al. "The association of tooth wear, diet and dietary habits in adults aged 18-30 years old." Journal of dentistry 39.12 (2011): 811-816.

Behl et al., "Multifunctional Shape-Memory Polymers", Adv. Mater. 2010, 22: 3388-3410.

Bertone et al., "Thickness Dependence of the Optical Properties of Ordered Silica-Air and Air-Polymer Photonic Crystals", Physical Review Letters 1999, 83, 2: 300-303.

Butler, Craig J., et al. "Effect of fluoride and 10% carbamide peroxide on the surface roughness of low-fusing and ultra low-fusing porcelain." The Journal of prosthetic dentistry 92.2 (2004): 179-183.

C. Heine, R.H. Morf, "Submicrometer gratings for solar energy applications", Appl. Opt. 34 (1995) 2476-2482.

C. Yakacki, "Shape-Memory and Shape-Changing Polymers", Polymer Reviews, 2013, 53: 1-5.

C.M. Kennemore Iii, U.J. Gibson, "Ion beam processing for coating MgF2 onto ambient temperature substrates", Appl. Opt. 23 (1984) 3608-3611.

C.S. Thompson, R.A. Fleming, M. Zou, "Solar Energy Materials & Solar Cells", Sol Energ Mater Sol C 115 (2013) 108-113.

Cansizoglu, H; et al. "Optical absorption properties of semiconducting nanostructures with different shapes" Advanced Optical Materials 2013, 1, 156-166. (Year: 2013).

Cao, Z; et al. "Study on the impact of silicon doping level on the trench profile using metal-assisted chemical etching" 2016, vol. 12,742-746.

Ccahuana, Vanessa ZS, et al. "Surface degradation of glass ceramics after exposure to acidulated phosphate fluoride." Journal of Applied Oral Science 18.2 (2010): 155-165.

Chan et al., "Mechanochromic Photonic Gels", Advanced Materials 2013, 25: 3934-3947.

Creugers, Nico HJ; et al. "A meta-analysis of durability data on conventional fixed bridges." Community Dentistry and Oral Epidemiology 22.6 (1994): 448-452.

Cui et al., "Inverse Opal Spheres Based on Polyionic Liquids as Functional Microspheres with Tunable Optical Properties and Molecular Recognition Capabilities", Angew. Chem. Int. Ed. 2014, 53: 3844-3848.

D. Chen, "Anti-reflection (AR) coatings made by sol-gel processes: A review", Sol. Energ. Mater. Sol. C. 68 (2001) 313-336.

D. Lee, M.F. Rubner, R.E. Cohen, "All-Nanoparticle Thin-Film Coatings", Nano Lett. 6 (2006) 2305-2312.

D. Lee, Z. Gemici, M.F. Rubner, R.E. Cohen, "Multilayers of Oppositely Charged SiO2 Nanoparticles: Effect of Surface Charge on Multi9layer Assembly", Langmuir 23 (2007) 8833-8837.

D.G. Stavenga; et al. "Light on the moth-eye corneal nipple array of butterflies", Proc. R. Soc. B 273 (2006) 661-667.

Ding et al., "Morphology and Water Vapor Permeability of Temperature-Sensitive Polyurethanes", Journal of Applied Polymer Science, (2008) vol. 107: 4061-4069.

Drummond, J. L., D; et al. "Physiological aging of an all-ceramic restorative material." Dental Materials 7.2 (1991): 133-137.

(56) References Cited

OTHER PUBLICATIONS

Du et al., "Solvent induced shape recovery of shape memory polymer based on chemically cross-linked poly(vinyl alcohol)", Soft Matter, 2010, 6: 3370-3376.

E. Metwalli, D.; et al. "Surface characterizations of mono-, di-, and tri-, aminosilane treated glass substrates", J. Colloid Interf. Sci. 298 (2006) 825-831.

Esquivel-Upshaw, J. F., et al. "Surface degradation of dental ceramics as a function of environmental pH." Journal of dental research 92.5 (2013): 467-471.

Esquivel-Upshaw, Josephine F., et al. "In Vivo Wear of Enamel by a Lithia Disilicate-Based Core Ceramic Used for Posterior Fixed Partial Dentures: First-Year Results." International Journal of Prosthodontics 19.4 (2006).

Esquivel-Upshaw, Josephine F., et al. "Resistance to staining, flexural strength, and chemical solubility of core porcelains for all-ceramic crowns." International Journal of Prosthodontics 14.3 (2001).

Esquivel-Upshaw, Josephine, et al. "Randomized, controlled clinical trial of bilayer ceramic and metal-ceramic crown performance." Journal of Prosthodontics: Implant, Esthetic and Reconstructive Dentistry 22.3 (2013): 166-173.

Fang et al., "Reconfigurable photonic crystals enabled by pressure-responsive shape-memory polymers", Nature Communications 2015: 1-8.

Felton et al., Soft Matter "Self-folding with shape memory composites", Soft Matter, 2013, 9, 7688-7694.

Fenzl et al., "Photonic Crystals for Chemical Sensing and Biosensing", Angewandte Chemie Ed. 2015, 53: 3318-3335.

Fischer, H.; et al. "Effect of surface roughness on flexural strength of veneer ceramics." Journal of Dental Research 82.12 (2003): 972-975.

Flannery, Anthony F., et al. "PECVD silicon carbide as a chemically resistant material for micromachined transducers." Sensors and Actuators A: Physical 70.1-2 (1998): 48-55.

Kang et al., "Broad-wavelength-range chemically tunable block-copolymer photonic gels", Nature Materials 2007, 6: 957-960.

Karrock, Torben; et al. "Pressure sensor based on flexible photonic crystal membrane." Biomedical optics express 6.12 (2015): 4901-4911.

Kloxin et al., "Covalent adaptable networks: smart, reconfigurable and responsive network systems", Chem. Soc. Rev. 2013, 42: 7161-7173.

Kluhr et al., Partially Oxidized Macroporous Silicon: A Three-Dimensional Photonic Matrix for Microarray Applications, Advanced Materials 2006, 18(23): 3135-3139.

Kobatake; et al. "Rapid and reversible shape changes of molecular crystals on photoirradiation" vol. 446, Apr. 12, 2007, doi: 10.1038/nature05669, pp. 1-4.

Koerner et al., "Remotely actuated polymer nanocomposites—stress-recovery of carbon-nanotube-filled thermoplastic elastomers", nature materials 2004, 3: 115-120.

Kukiattrakoon, Boonlert; et al. "Chemical durability and microhardness of dental ceramics immersed in acidic agents." Acta Odontologica Scandinavica 68.1 (2010): 1-10.

Kukiattrakoon, Boonlert; et al. "Degradability of fluorapatite-leucite ceramics in naturally acidic agents." Dental materials journal (2010): 1008310070-1008310070.

Kukiattrakoon, Boonlert; et al. "Effect of acidic agents on surface roughness of dental ceramics." Dental research journal 8.1 (2011): 6.

Kukiattrakoon, Boonlert; et al. "The effect of acidic agents on surface ion leaching and surface characteristics of dental porcelains." The journal of prosthetic dentistry 103.3 (2010): 148-162.

Kukiattrakoon, Boonlert; et al. "Vicker's microhardness and energy dispersive x-ray analysis of fluorapatite-leucite and fluorapatite ceramics cyclically immersed in acidic agents." Journal of oral science 51.3 (2009): 443-450.

Kunzelman et al., "Shape memory polymers with built-in threshold temperature sensors", Journal of Materials Chemistry 2008, 18: 1082-1086.

Kuswandi; et al., "A Simple Visual Ethanol Biosensor Based on Alcohol Oxidase Immobilized onto Polyaniline Film for Halal Verification of Fermented Beverage Samples", Feb. 2014, Sensors, 14(2):2135-2149. (Year: 2014).

L. Ionov, "3D Microfabrication using Stimuli-Responsive Self-Folding Polymer Films", Polymer Reviews, 2013, 53: 92-107.

Lendlein et al., "Biodegradable, Elastic Shape-Memory Polymers for Potential Biomedical Applications", Science 2002, vol. 296: 1673-1676.

Lendlein et al., "Shape-Memory Effect"—From temporary shape . . . T>46° C. . . . to permanent shape, Angew. Chem. Int. Ed. 2002, 41: 2034-2057.

Leng et al., "Shape-Memory Polymers-A Class of Novel Smart Materials", MRS Bulletin 2009, 34: 848-855, www.mrs.org/bulletin.

Leng et al., "Synergic effect of carbon black and short carbon fiber on shape memory polymer actuation by electricity", Journal of Applied Physics 2008, 104: 1-4.

Li, Y., et al. "Broadband near-infrared antireflection coatings fabricated by three-dimensional direct laser writing." Optics letters 43.2 (2018): 239-242.

Lishchuk, P; et al. "Photoacoustic characterization of nanowire arrays formed by metal-assisted chemical etching of crystalline silicon substrates with different doping level" ScienceDirect 2019, 131-136.

Liu et al., "Review of progress in shape-memory polymers", J. Mater. Chem., 2007, 17: 1543-1558.

Lv et al., "Shape-Memory Polymer in Response to Solution", Advanced Engineering Materials 2008, 10, No. 6: 592-595.

M. Ibn-Elhaj, M. Schadt, "Optical polymer thin films with isotropic and anisotropic nano-corrugated surface topologies", Nature 410 (2001) 796-799.

M. Kursawe, R. Anselmann, V. Hilarius, G. Pfaff, "Nano-Particles by Wet Chemical Processing in Commercial Applicaitons", J. Sol-Gel Sci. Technol. 33 (2005) 71-74.

M. Sakhuja, J. Son, L.K. Verma, H. Yang, C.S. Bhatia, A.J. Danner, "Omnidirectional study of nanostructured glass packaging for solar modules", Prog. Photovol. 22 (2014) 356-361.

M.F. Schubert, F.W. Mont, S. Chhajed, D.J. Poxson, J.K. Kim, E.F. Schubert, "Design of multilayer antireflection coatings made from co-sputtered and low-refractive-index materials by genetic algorithm", Opt. Exp. 16 (2008) 5290-5298.

M.G. Moharam, D.A. Pommet, E.B. Grann, T.K. Gaylord, "Stable implementation of the rigorous coupled-wave analysis for surface-relief gratings: enhanced transmittance matrix approach", J. Opt. Soc. Am. A 12 (1995) 1077-1086.

M.I. Dafinone, G. Feng, T. Brugarolas, K.E. Tettey, D. Lee, "Mechanical Reinforcement of Nanoparticle Thin Films Using Atomic Layer Deposition", ACS Nano 5 (2011) 5078-5087.

M.S. Park, J.K. Kim, "Porous Structures of Polymer Films Prepared by Spin Coating with Mixed Solvents under Humid Condition", Langmuir 22 (2006) 4594-4598.

Maitland et al., "Photothermal Properties of Shape Memory Polymer Micro-Actuators for Treating Stroke", Lasers in Surgery and Medicine (2002) 30:1-11.

Mason et al., "Correlation between bulk morphology and luminescence in porous silicon investigated by pore collapse resulting from drying", Thin Solid Films 2002, 406: 151-158.

Meng et al., "A Brief Review of Stimulus-active Polymers Responsive to Thermal, Light, Magnetic, Electric, and Water/Solvent Stimuli", Journal of Intelligent Material Systems and Structures, vol. 21—Jun. 2010: 859-885 -1130.

Meng et al., "Various shape memory effects of stimuli-responsive shape memory polymers", Smart Materials and Structures 2013, 22: 1-23.

Yang et al., "Macroporous photonic crystal-based vapor detectors created by doctor blade coating", Appl. Phys. Lett. 2011, 98: 1-3.

Metzger et al., "Mechanical Properties of Mechanical Actuator for Treating Ischemic Stroke", Biomedical Microdevices 2002, 4:2: 89-96.

(56) References Cited

OTHER PUBLICATIONS

Milleding, Percy, et al. "Surface energy of non-corroded and corroded dental ceramic materials before and after contact with salivary proteins." European journal of oral sciences 107.5 (1999): 384-392.

Miyazaki, Takashi, et al. "Current status of zirconia restoration." Journal of prosthodontic research 57.4 (2013): 236-261.

Mohr, Gerhard J., Daniel Citterio, and Ursula E. Spichiger-Keller. "Development of chromogenic reactands for optical sensing of alcohols." Sensors and Actuators B: Chemical 49.3 (1998): 226-234.

Munakata, et al., Three-dimensionally ordered macroporous polyimide composite membrane with controlled pore size for direct methanol fuel cells, Journal of Power Sources 2008, 178(2): 596-602.

Nguyen et al., "Modeling the Relaxation Mechanisms of Amorphous Shape Memory Polymers", M. L. Chambers, Adv. Mater. 2010, 22: 3411-3423.

Ogawa, Yudai, et al. "Organic transdermal iontophoresis patch with built-in biofuel cell." Advanced healthcare materials 4.4 (2015): 506-510.

Pan et al., "Response of inverse-opal hydrogels to alcohols", Journal of Materials Chemistry 2012, 22: 2018-2025.

Park, Wounjhang; et al. "Mechanically tunable photonic crystal structure." Applied Physics Letters 85.21 (2004): 4845-4847.

Pfeiffer, Kristin, et al. "Antireflection coatings for strongly curved glass lenses by atomic layer deposition." Coatings 7.8 (2017): 118.

Phillips; et al "Biomimetic broadband antireflection gratings on solar-grade multicrystalline silicon wafers" Applied Physics Letters; Nov. 9, 2011, vol. 99, pp. 191103 (1)-(3).

Pinto, Marcelo M., et al. "Influence of pH on slow crack growth of dental porcelains." dental materials 24.6 (2008): 814-823.

Preis, Verena, et al. "Wear performance of dental ceramics after grinding and polishing treatments." Journal of the mechanical behavior of biomedical materials 10 (2012): 13-22.

Quitmann et al., "Environmental Memory of Polymer Networks under Stress", Adv. Mater. 2014, 26: 3441-3444.

Raigrodski, Ariel J.; et al. "The safety and efficacy of anterior ceramic fixed partial dentures: a review of the literature." The journal of prosthetic dentistry 86.5 (2001): 520-525.

Rosenstiel, S. F., et al. "Strength of a dental glass-ceramic after surface coating." Dental Materials 9.4 (1993): 274-279.

\* cited by examiner

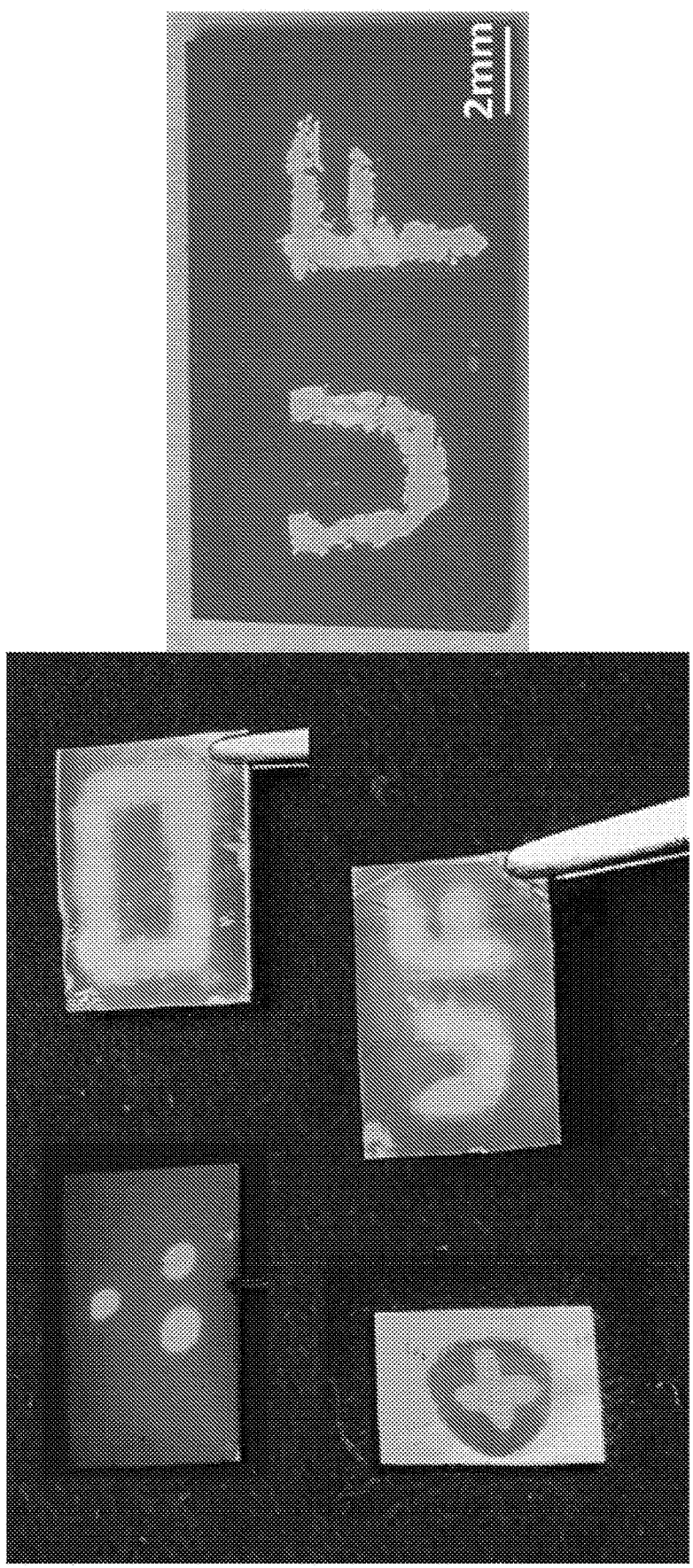

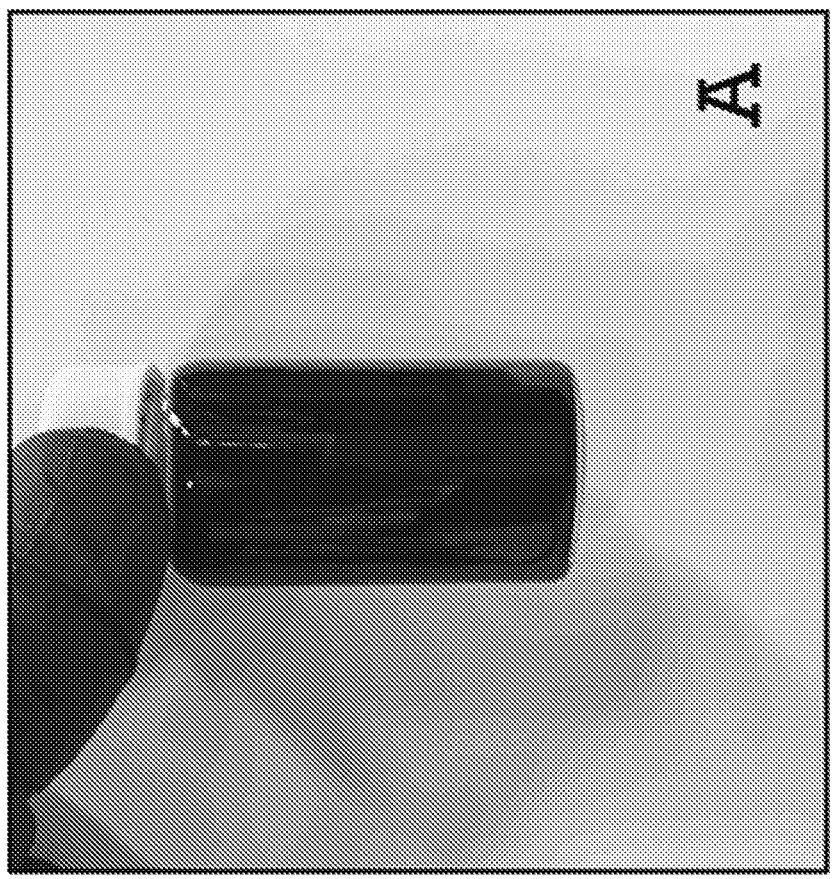
Fig. 1.2A
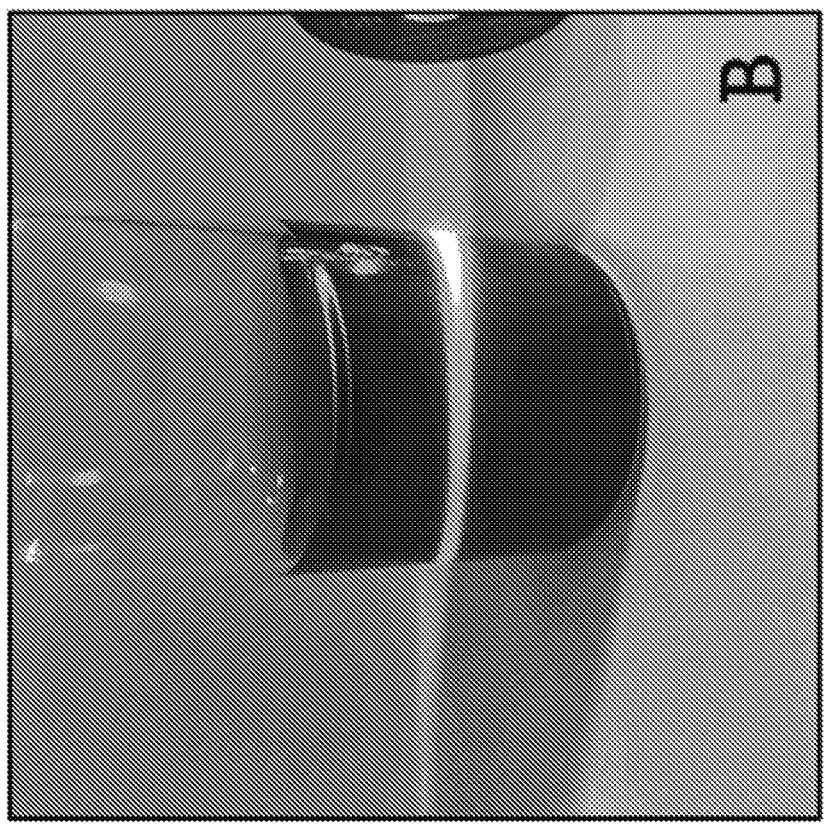
Fig. 1.2B

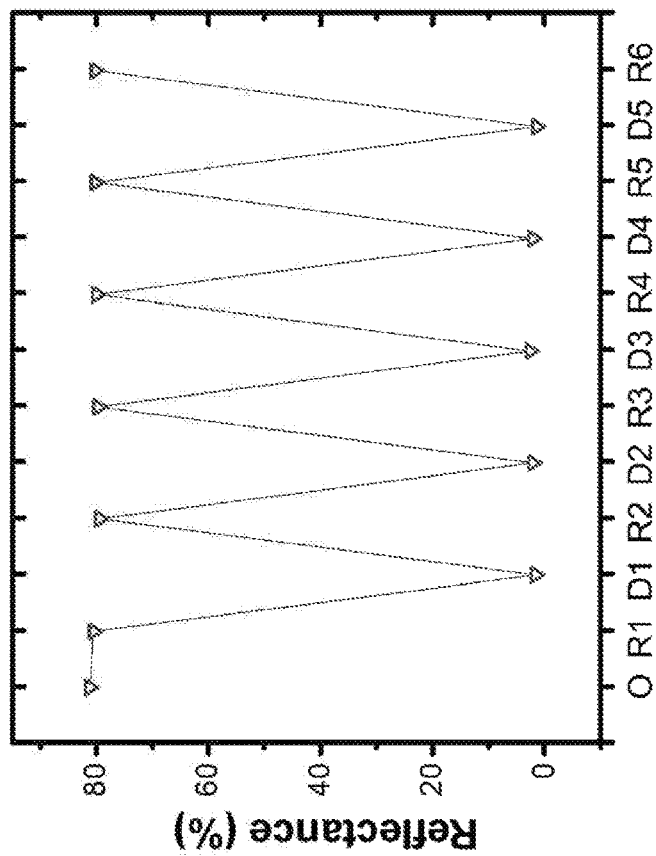
Fig. 1.4
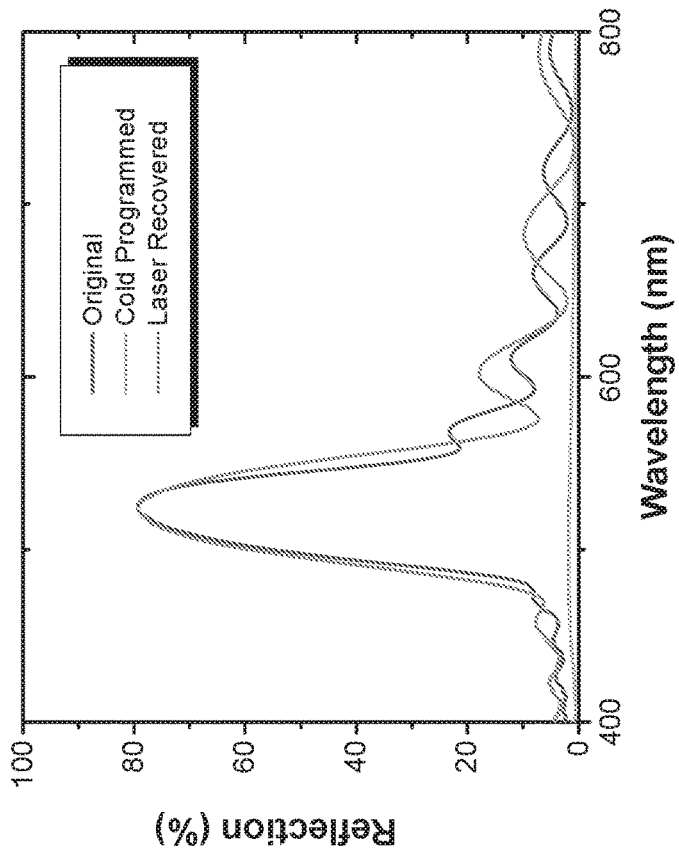
Fig. 1.3

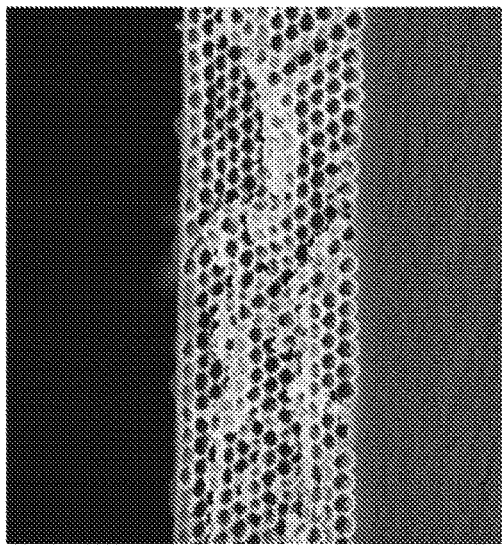
Fig. 1.5A
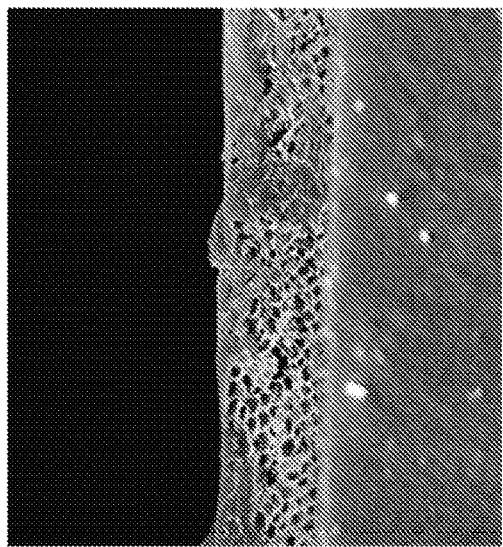
Fig. 1.5B
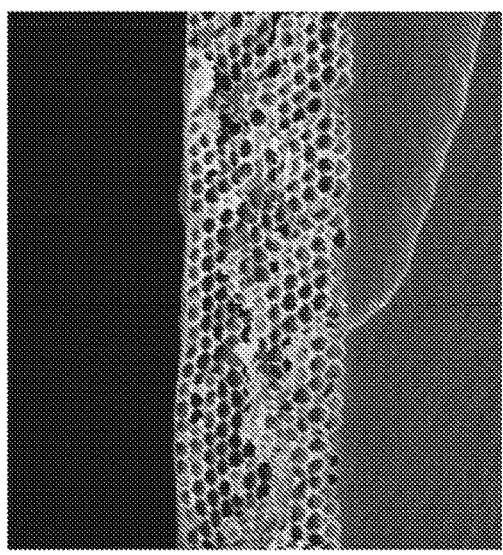
Fig. 1.5C

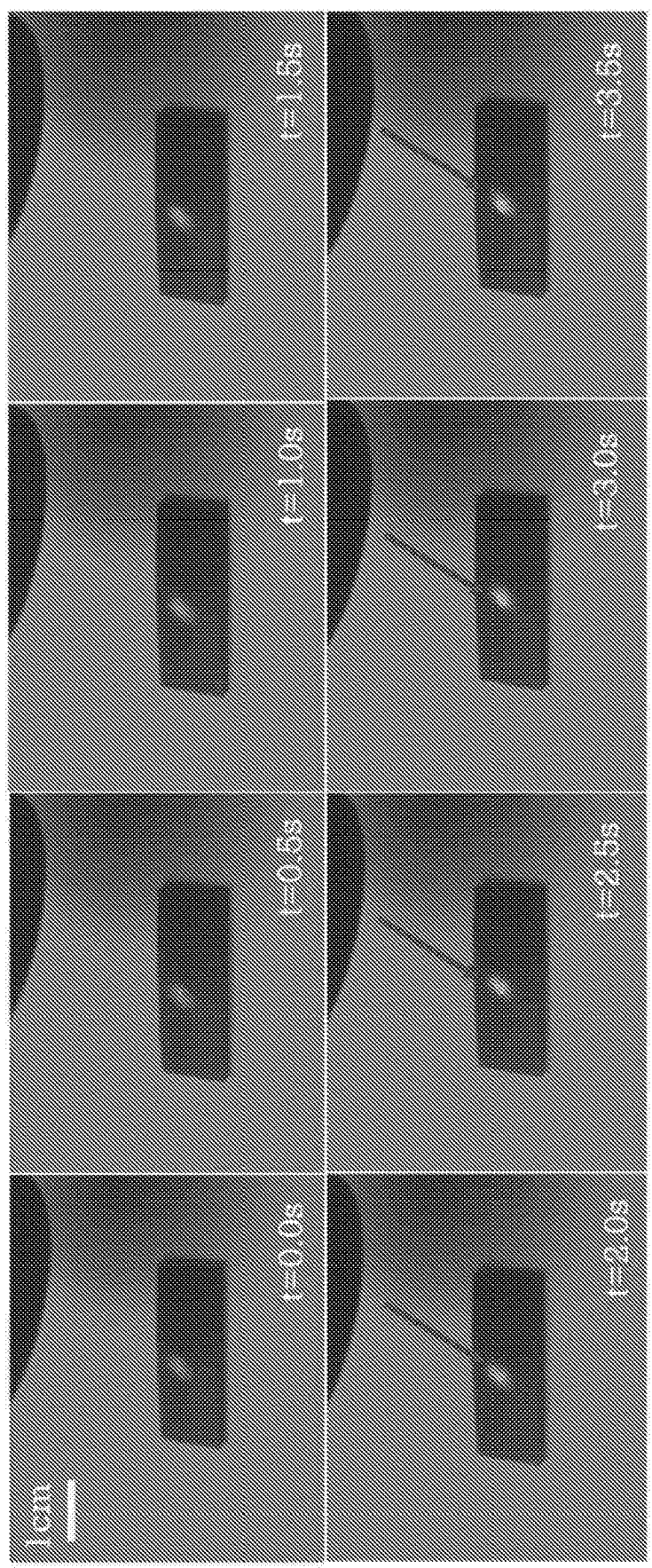
Fig. 1.6

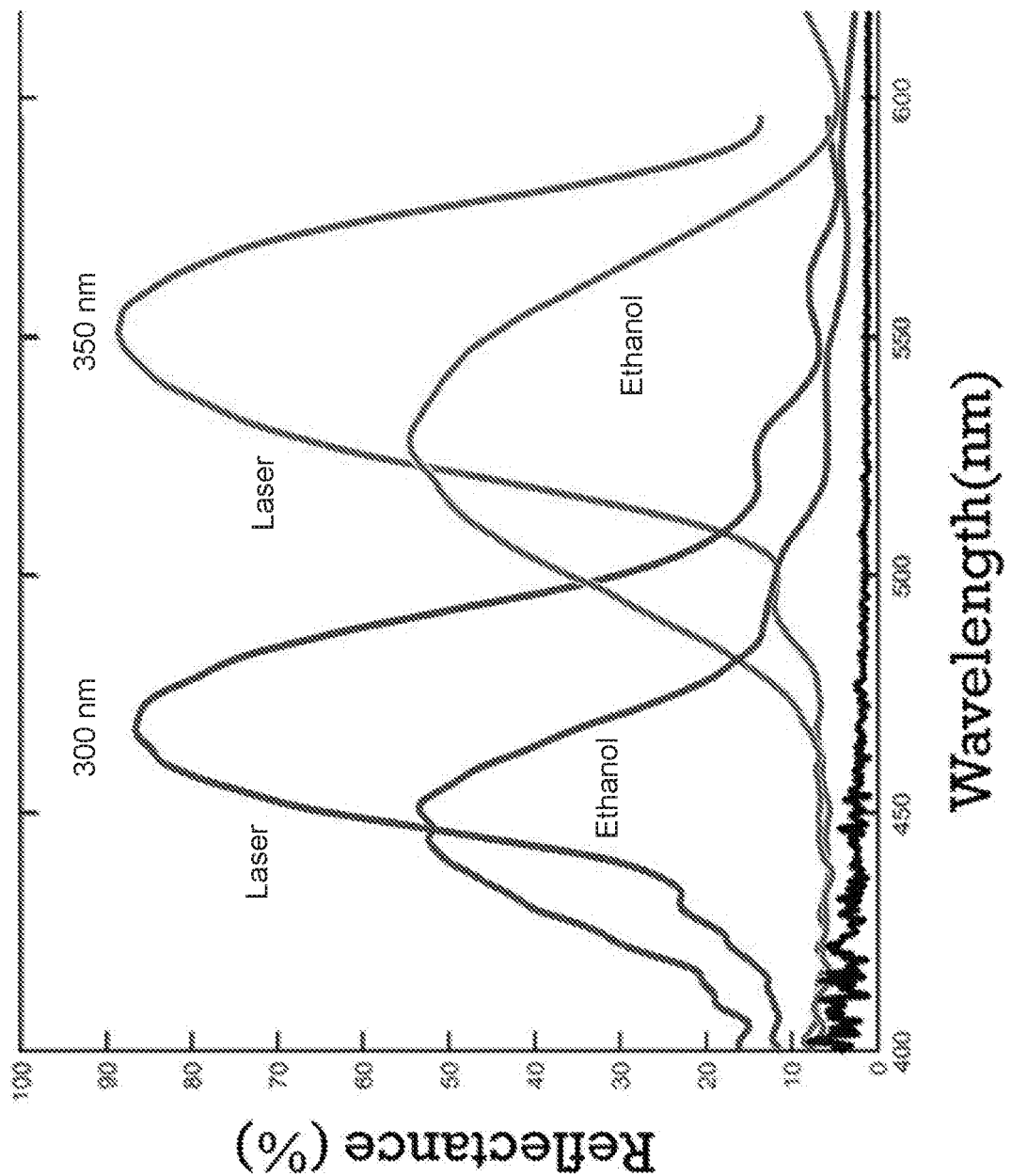
Fig. 1.7

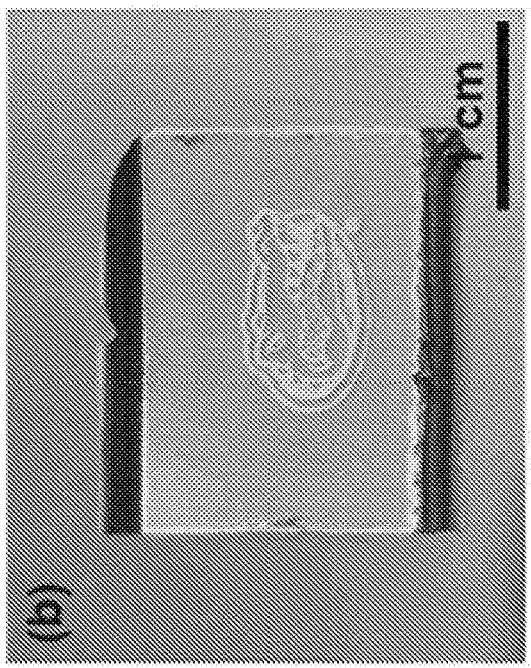
Fig. 2.1A
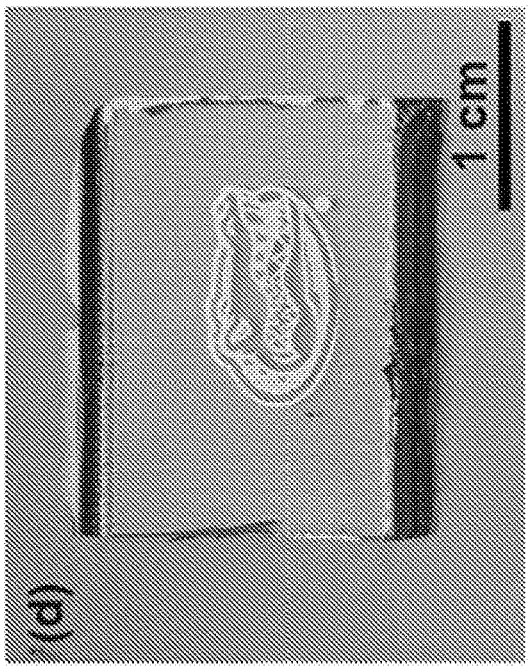
Fig. 2.1B
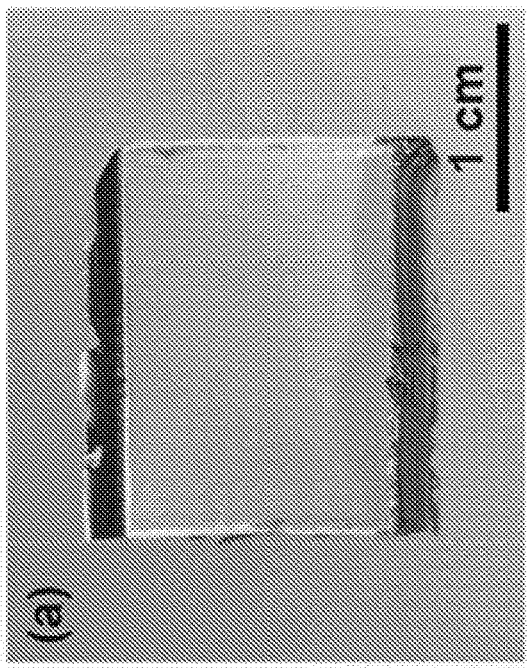
Fig. 2.1C
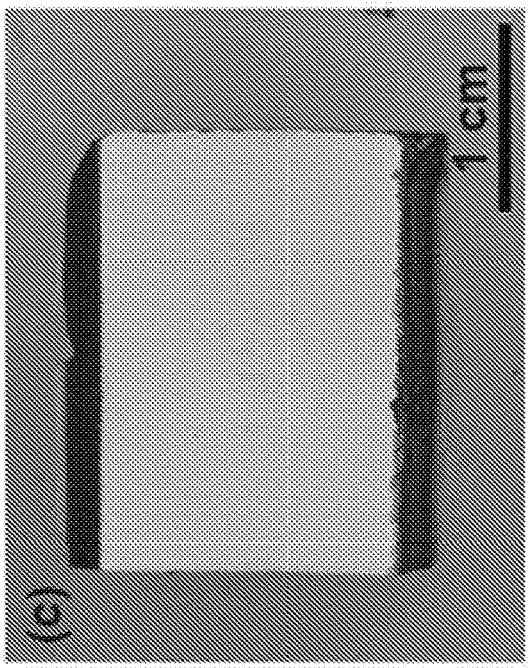
Fig. 2.1D

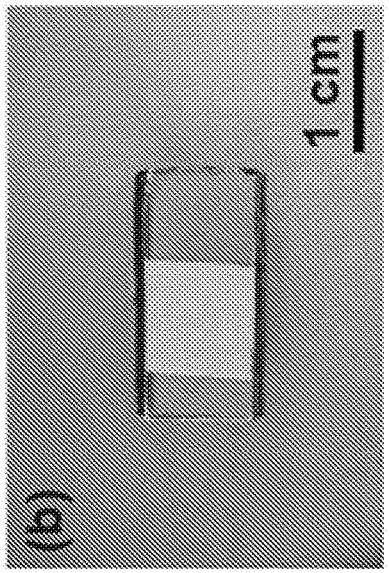
Fig. 2.2A
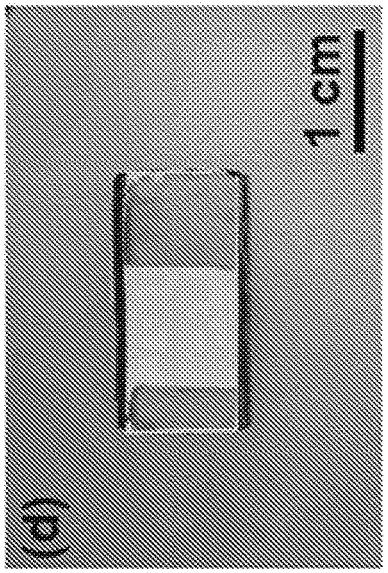
Fig. 2.2C
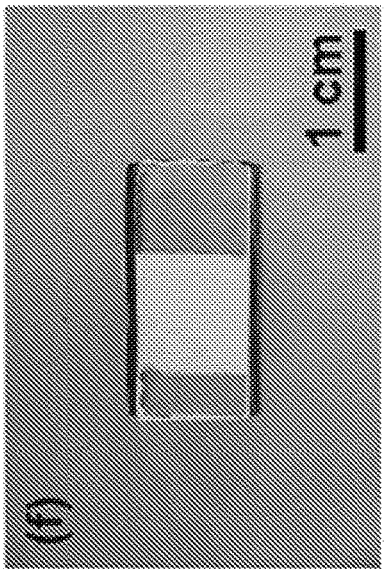
Fig. 2.2E
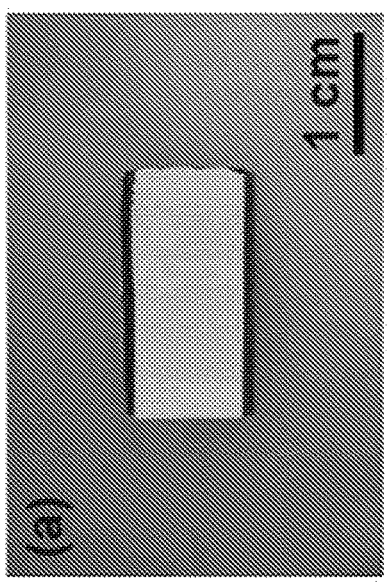
Fig. 2.2B
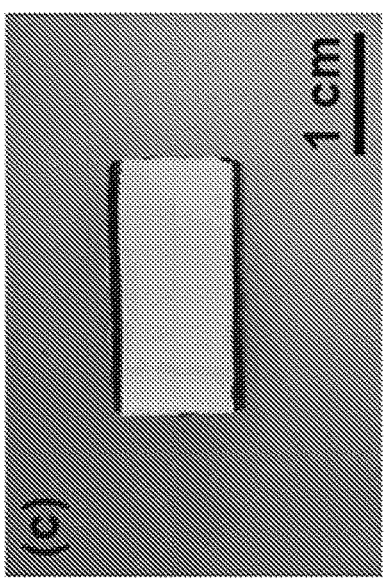
Fig. 2.2D
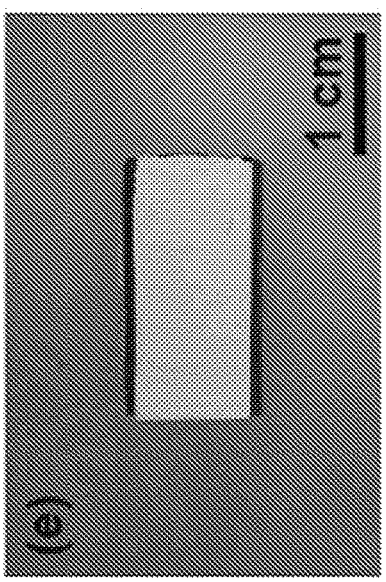
Fig. 2.2F

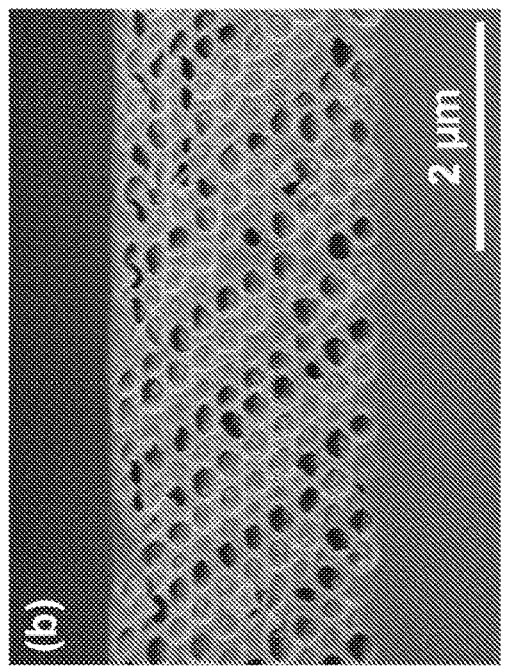
Fig. 2.3A
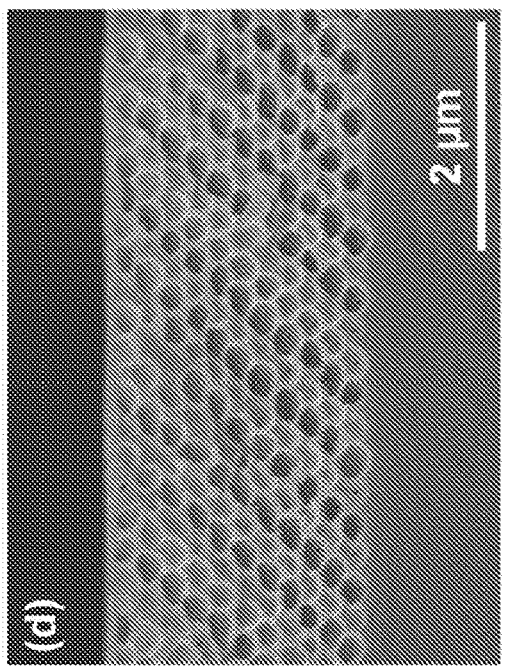
Fig. 2.3B
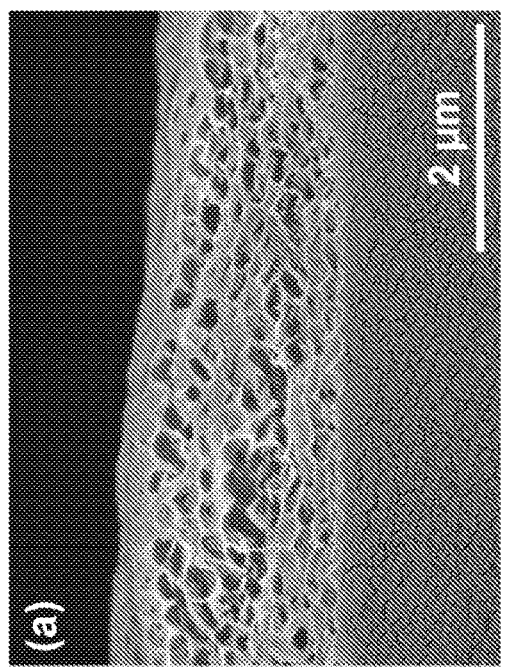
Fig. 2.3C
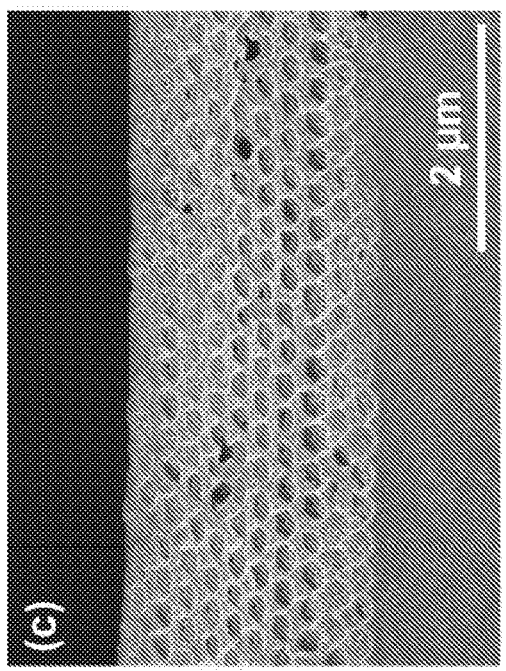
Fig. 2.3D

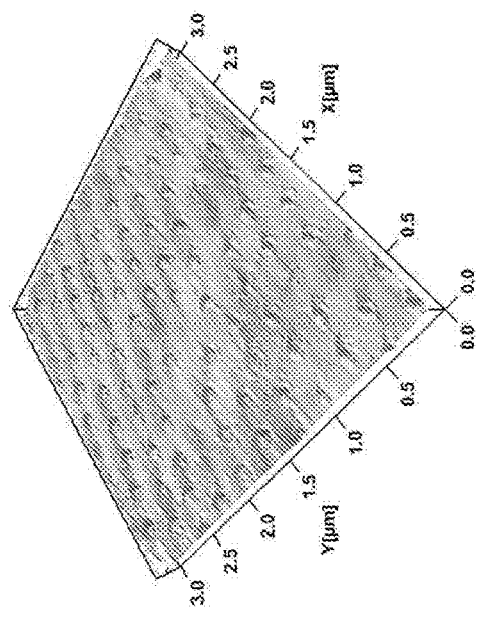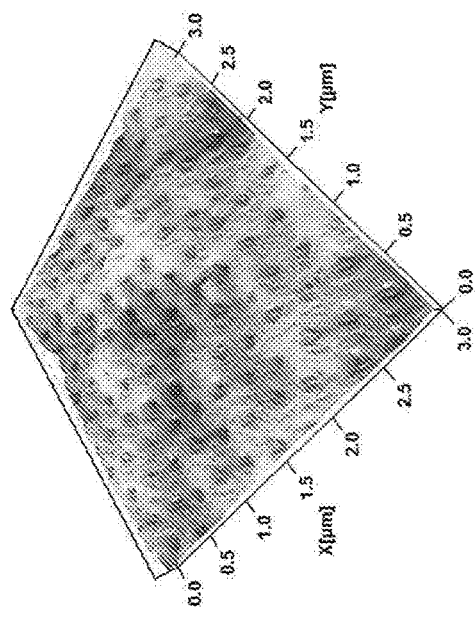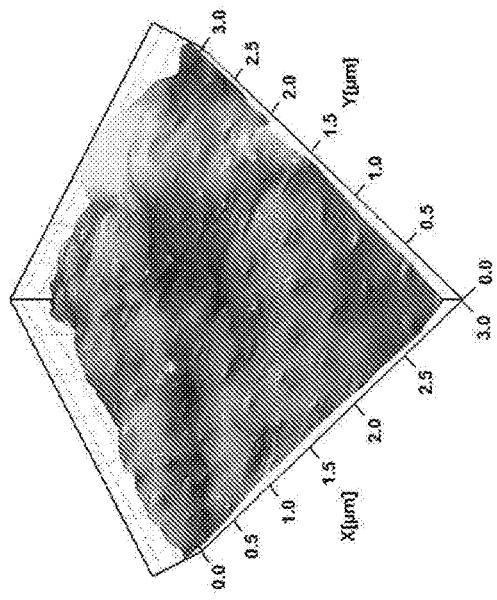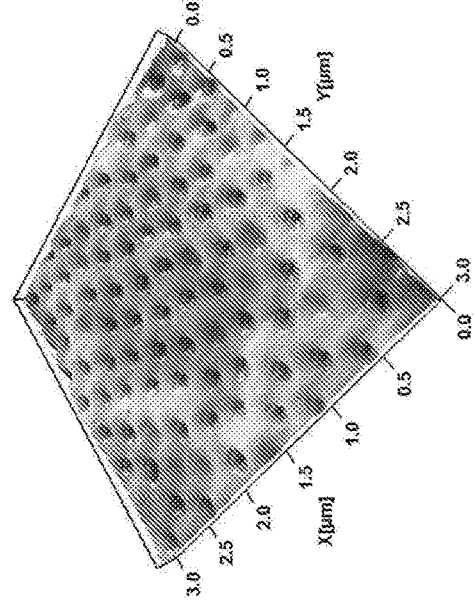
Fig. 2.4A  Fig. 2.4B  Fig. 2.4C  Fig. 2.4D

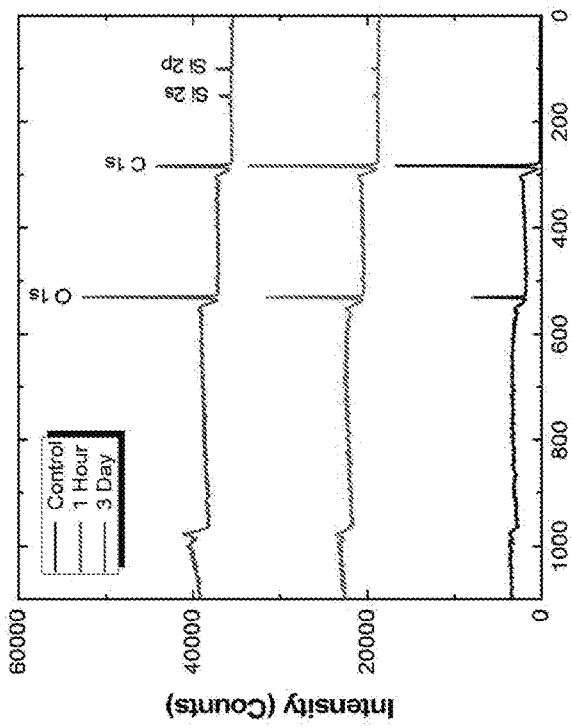
Fig. 2.6A
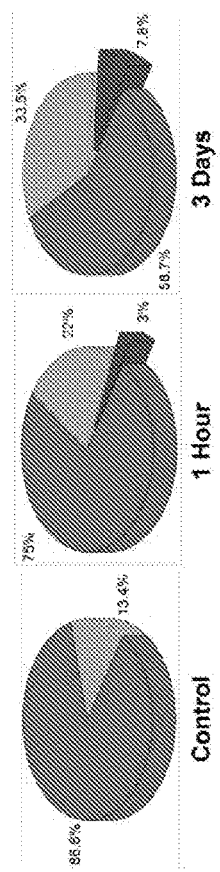
Fig. 2.6B
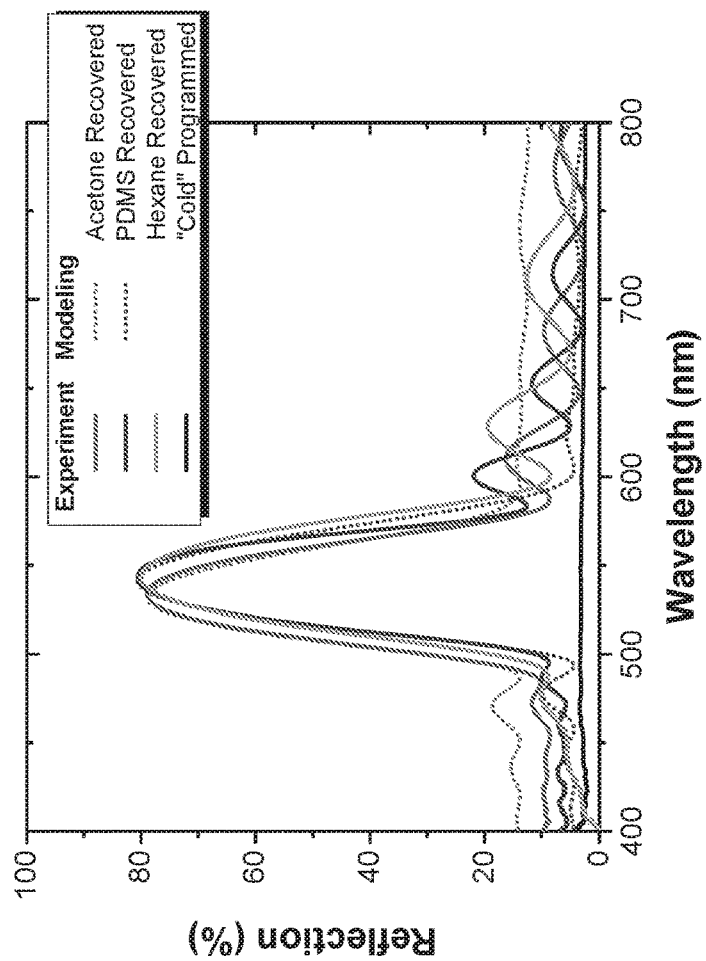
Fig. 2.5

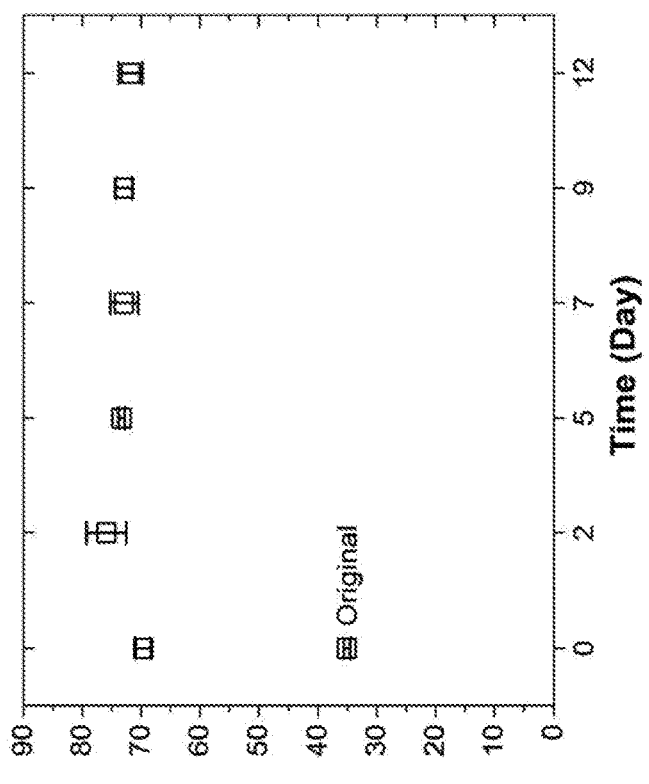
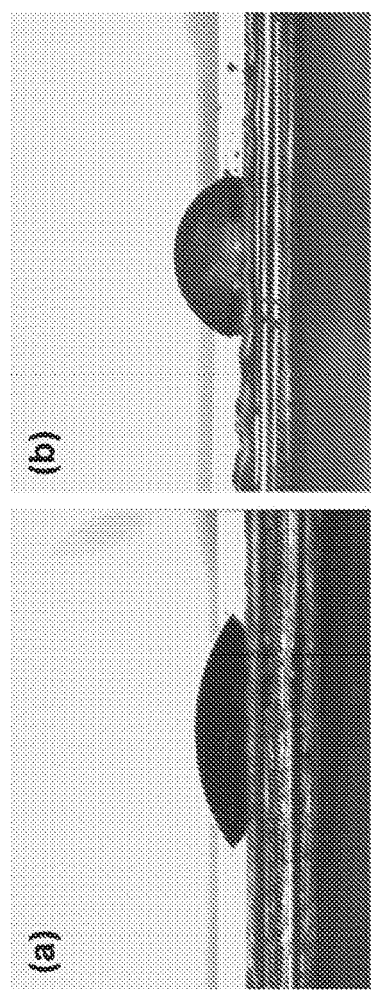
Fig. 2.7A  Fig. 2.7B  Fig. 2.7C

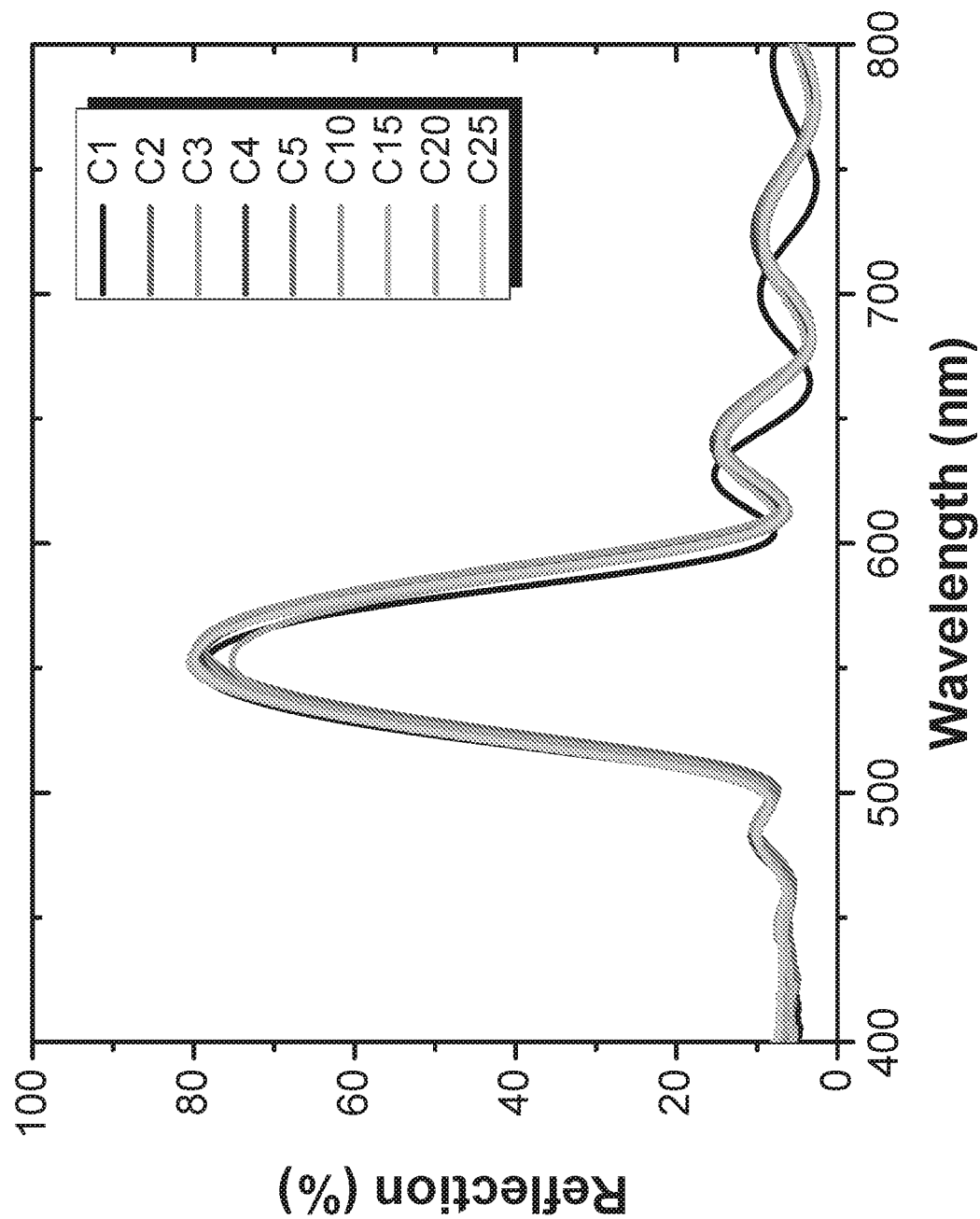
Fig. 2.8

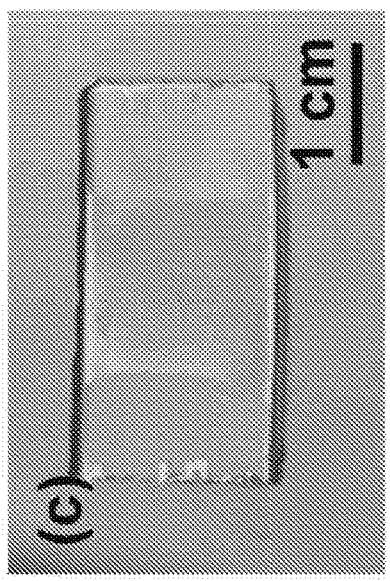
Fig. 2.9A
Fig. 2.9B
Fig. 2.9C
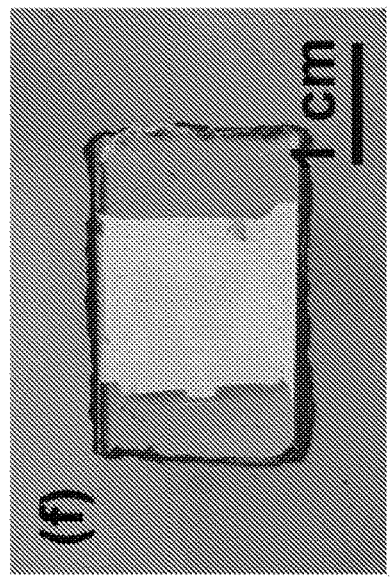
Fig. 2.9D
Fig. 2.9E
Fig. 2.9F

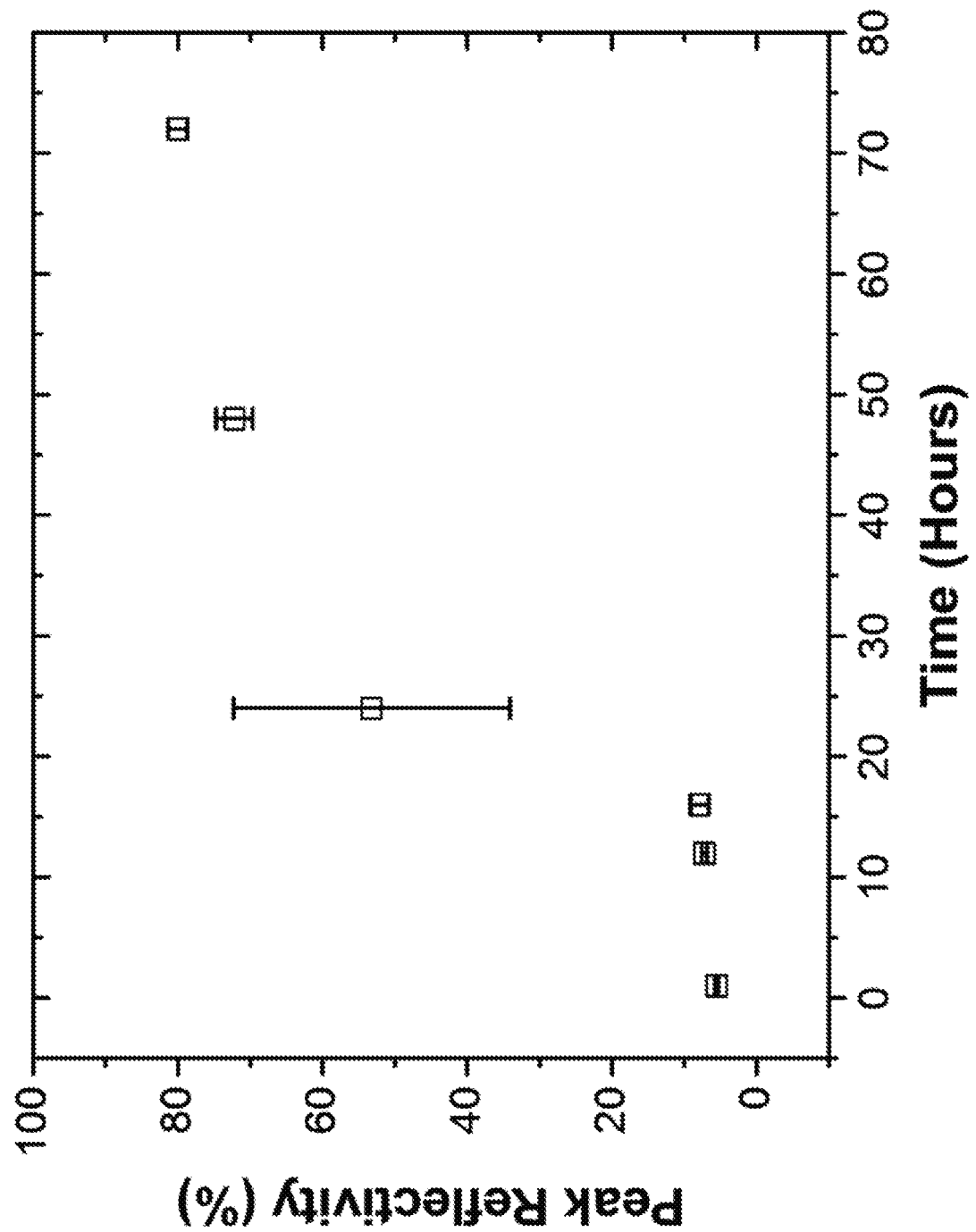
Fig. 2.9G

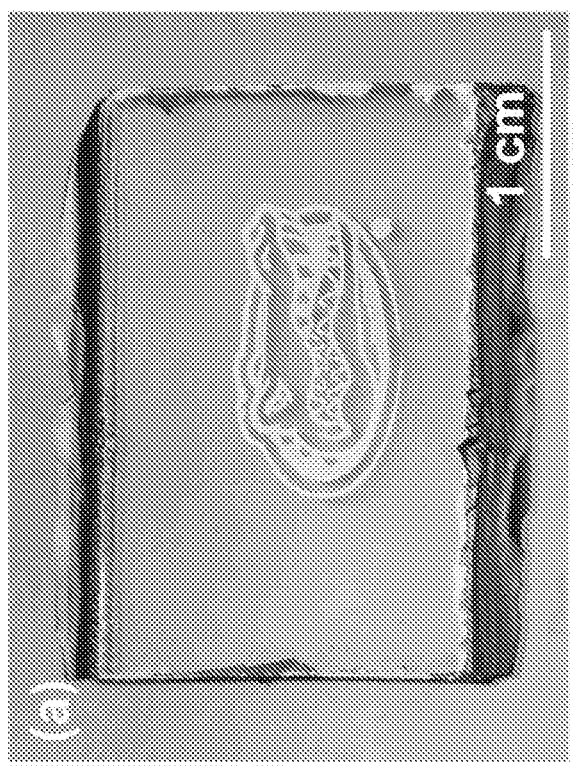
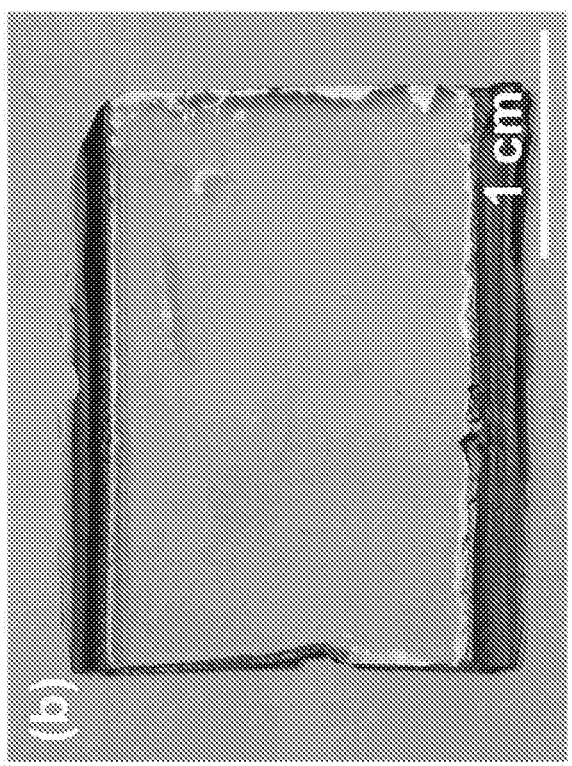
Fig. 2.10A
Fig. 2.10B

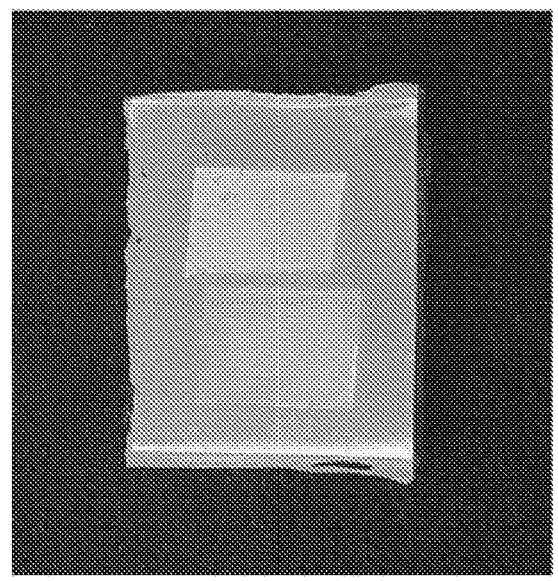
Fig. 3.1C
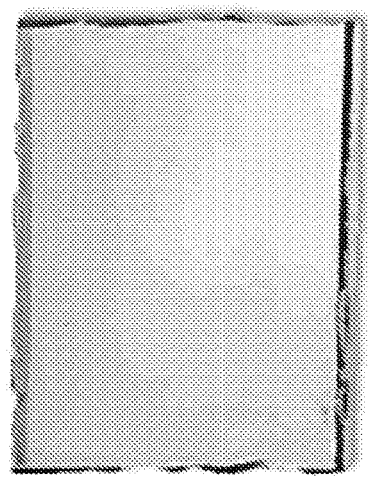
Fig. 3.1B
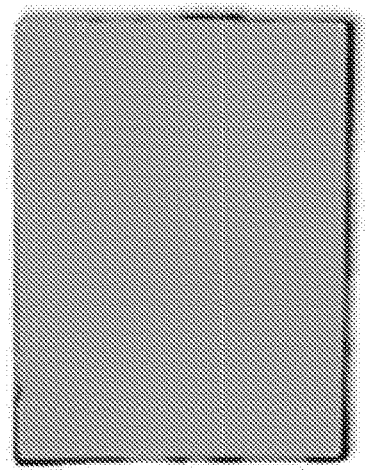
Fig. 3.1A

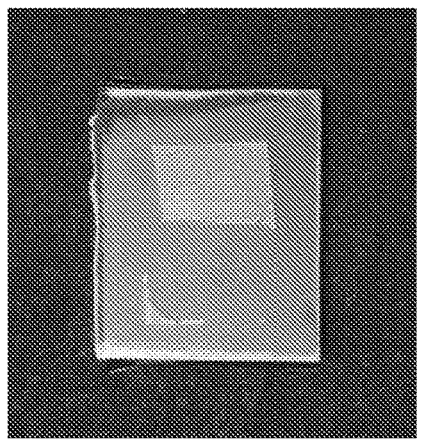
Fig. 3.1D
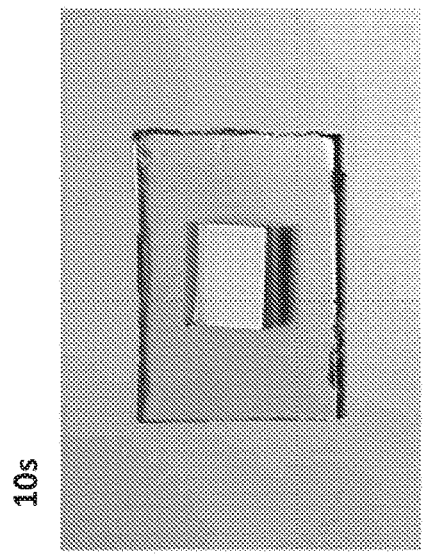
10s
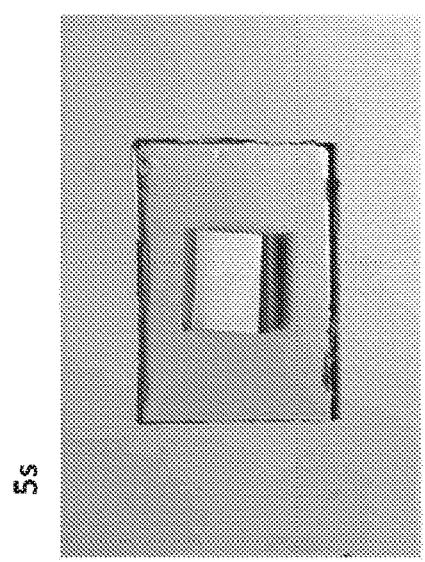
5s
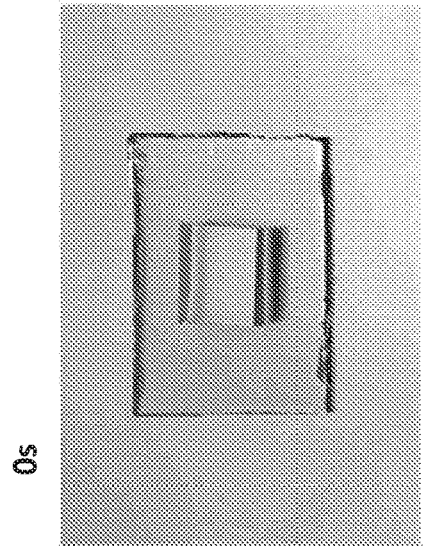
0s
Fig. 3.1E

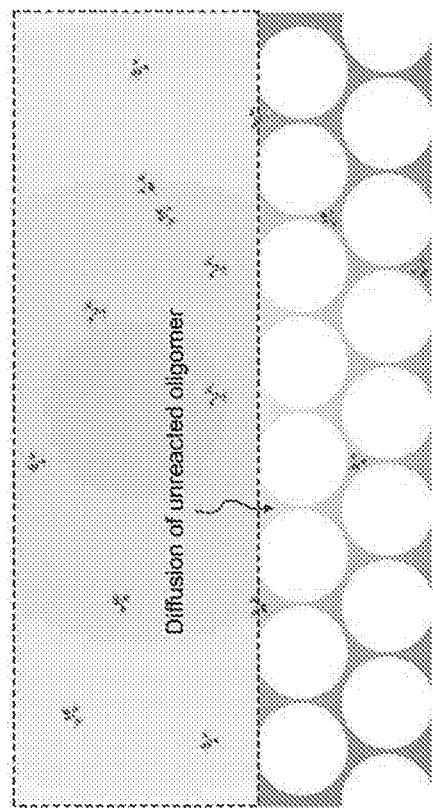
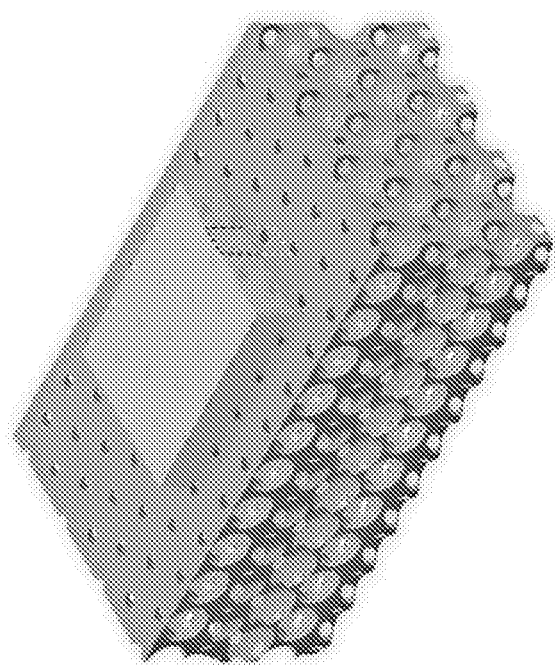
Fig. 3.1F

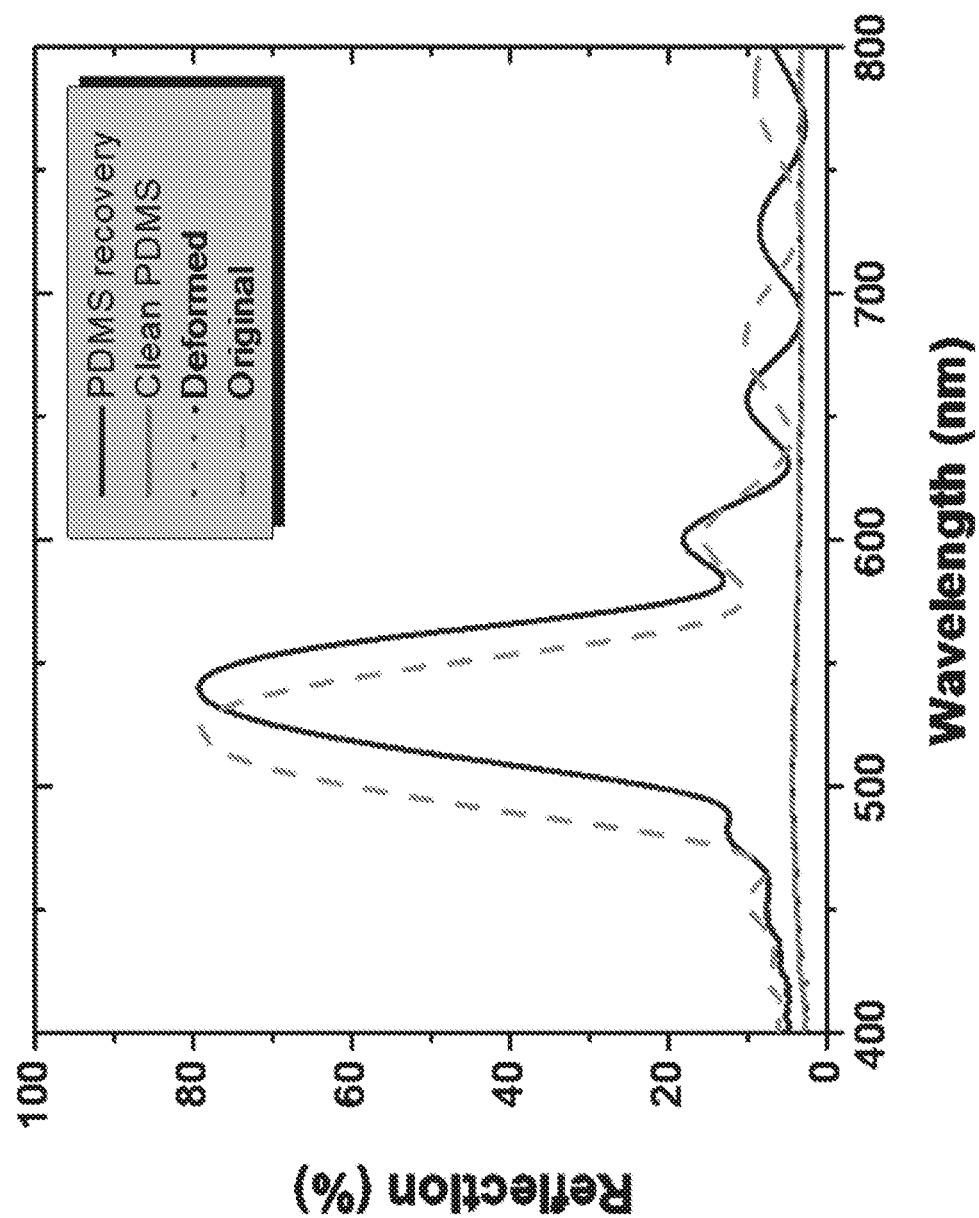
Fig. 3.2

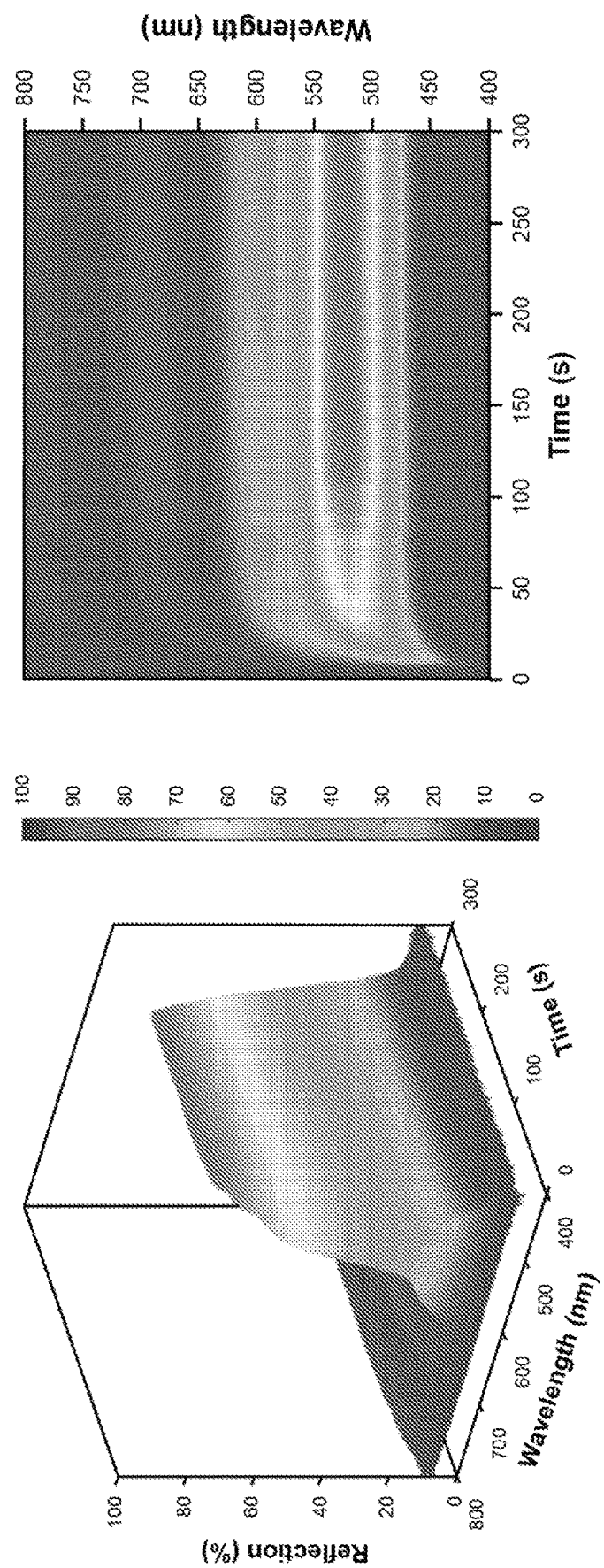
Fig. 3.3A

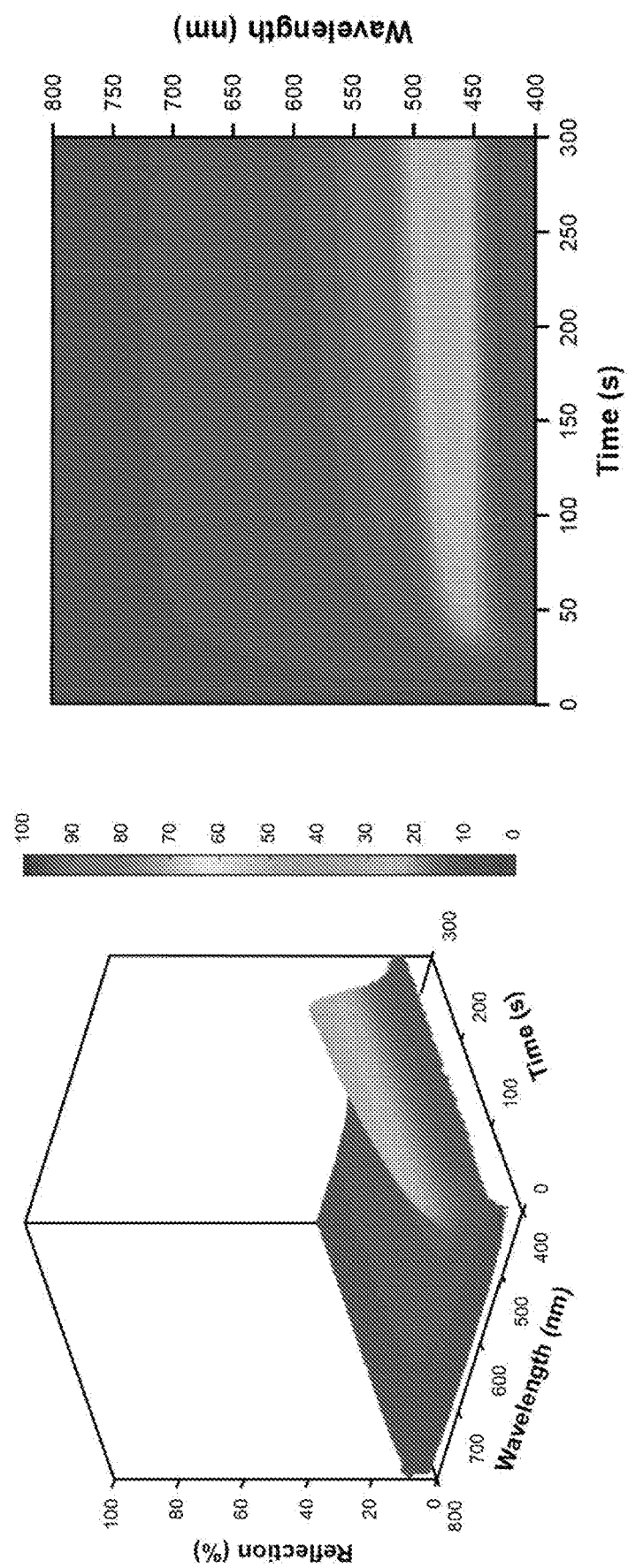
Fig. 3.3B

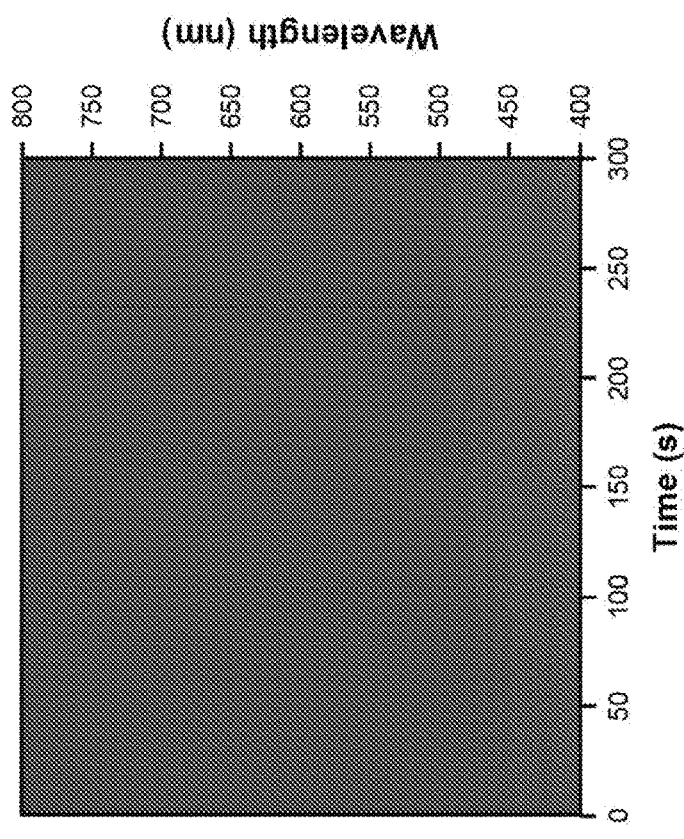
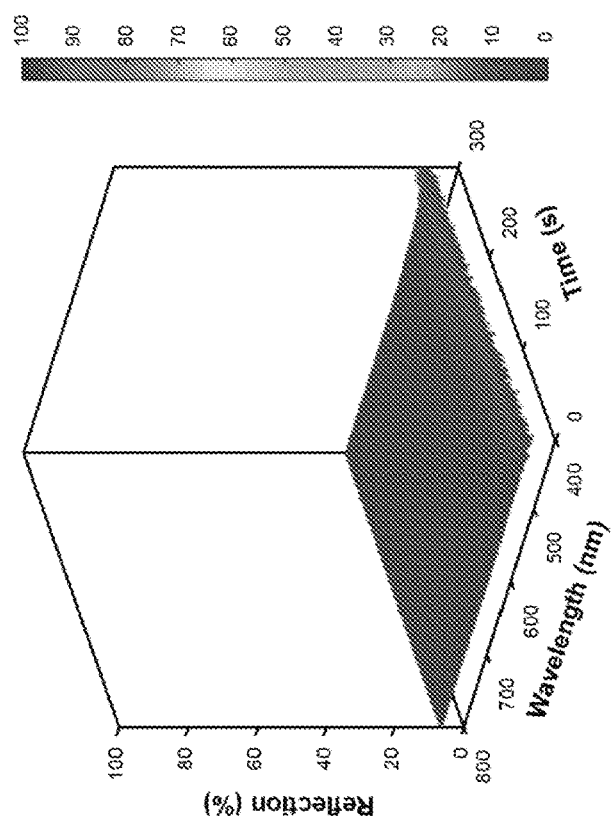
Fig. 3.3C

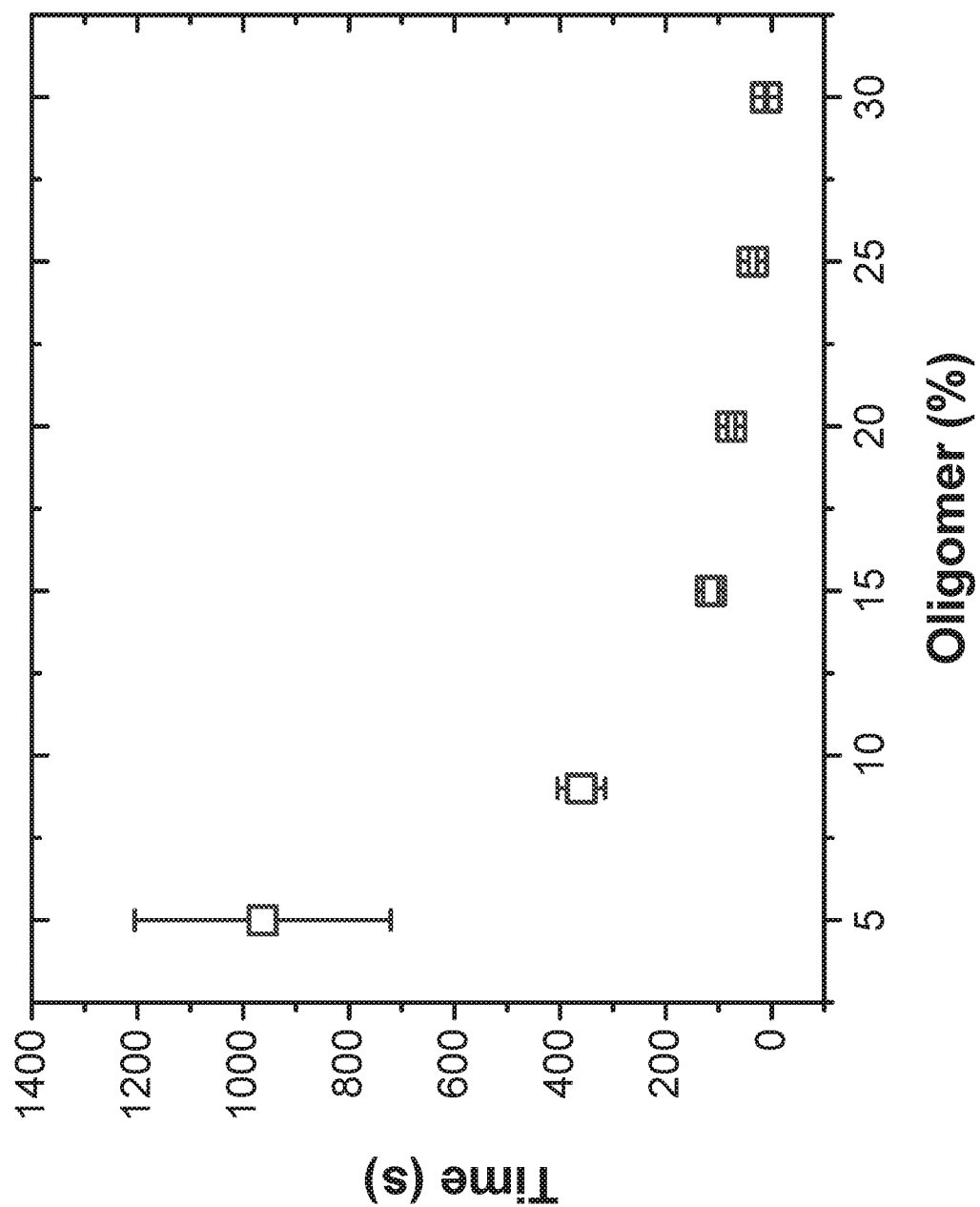
Fig. 3.4

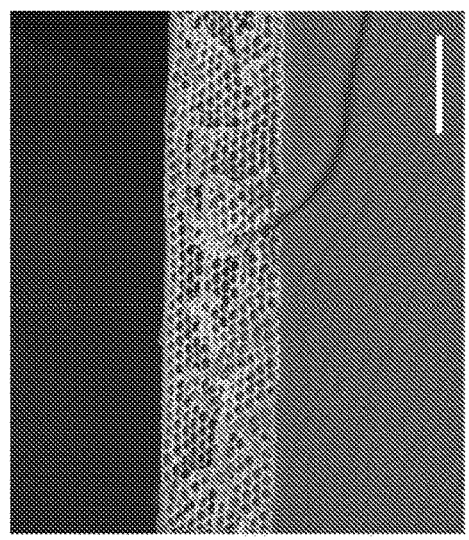
Fig. 3.5C
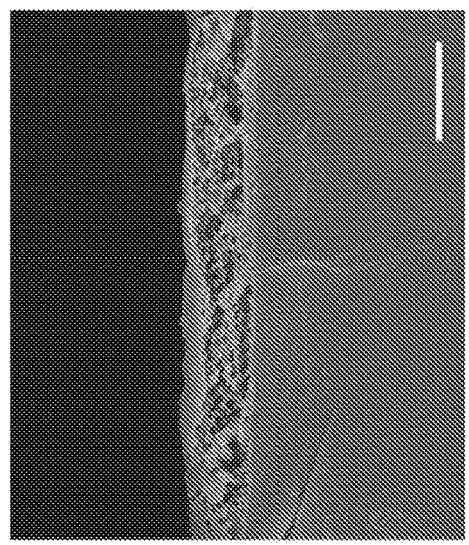
Fig. 3.5B
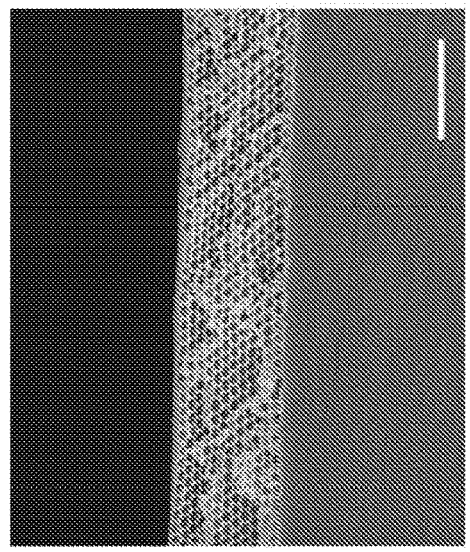
Fig. 3.5A

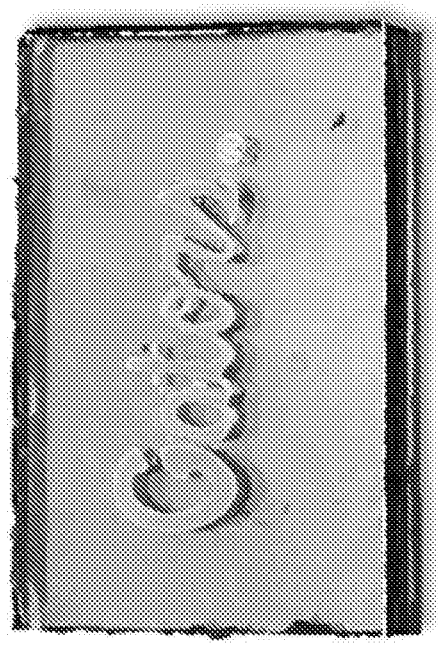
Fig. 3.6B
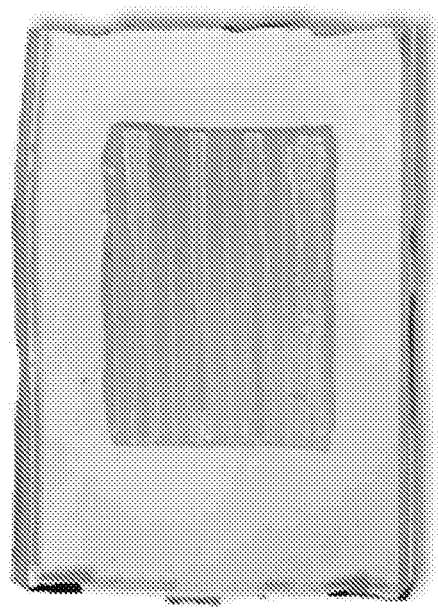
Fig. 3.6A

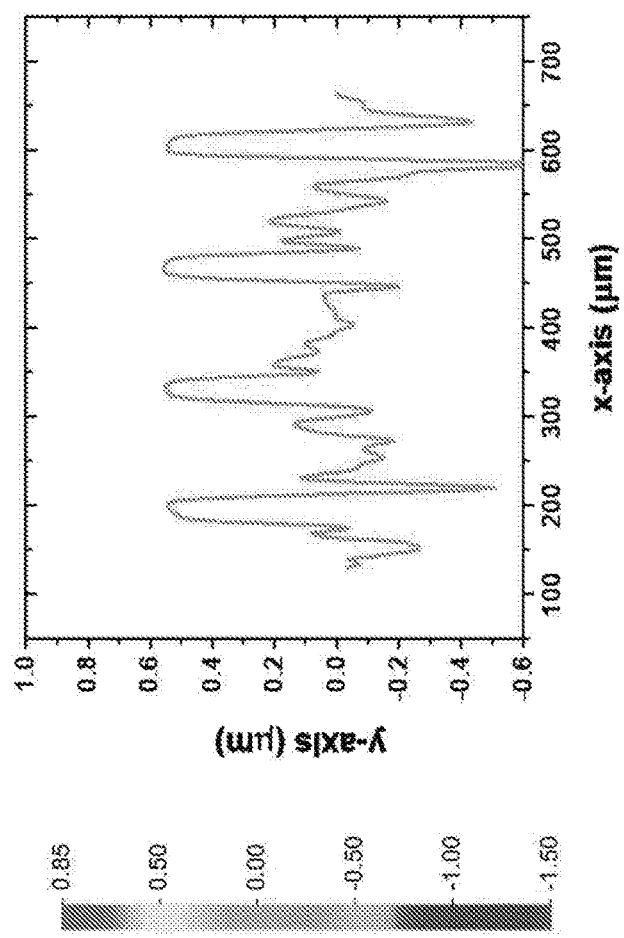
Fig. 3.7B
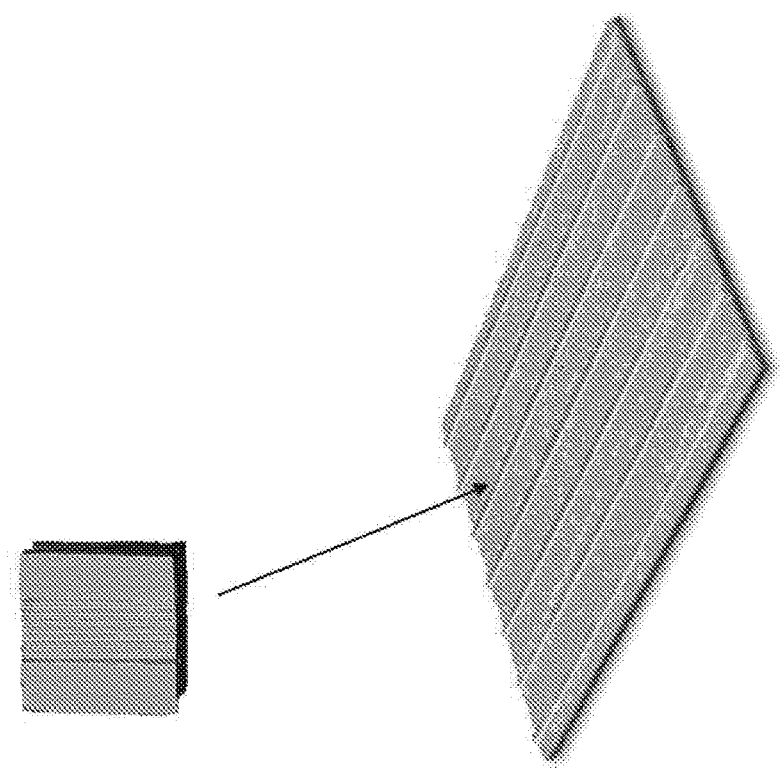
Fig. 3.7A

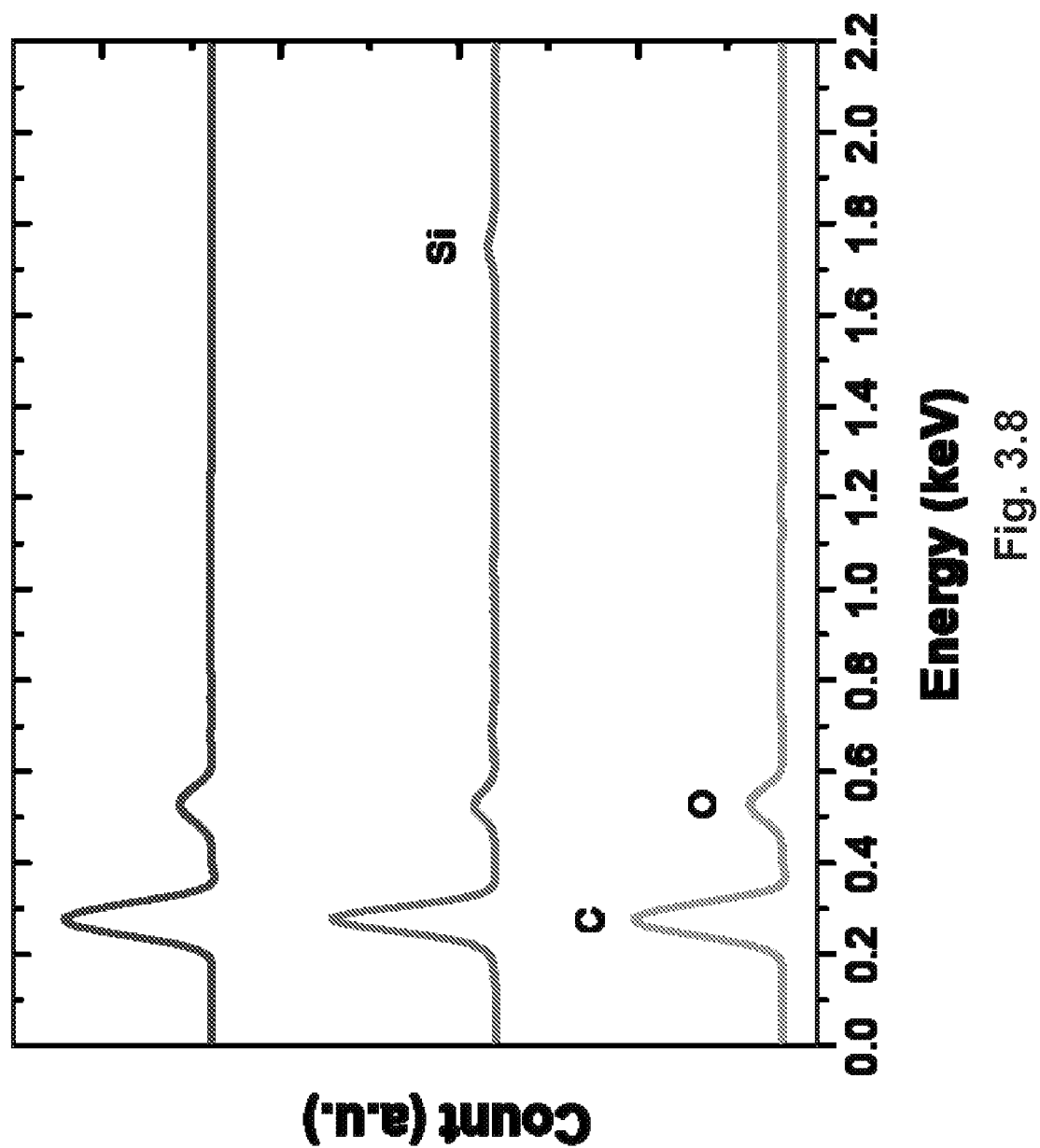
Fig. 3.8

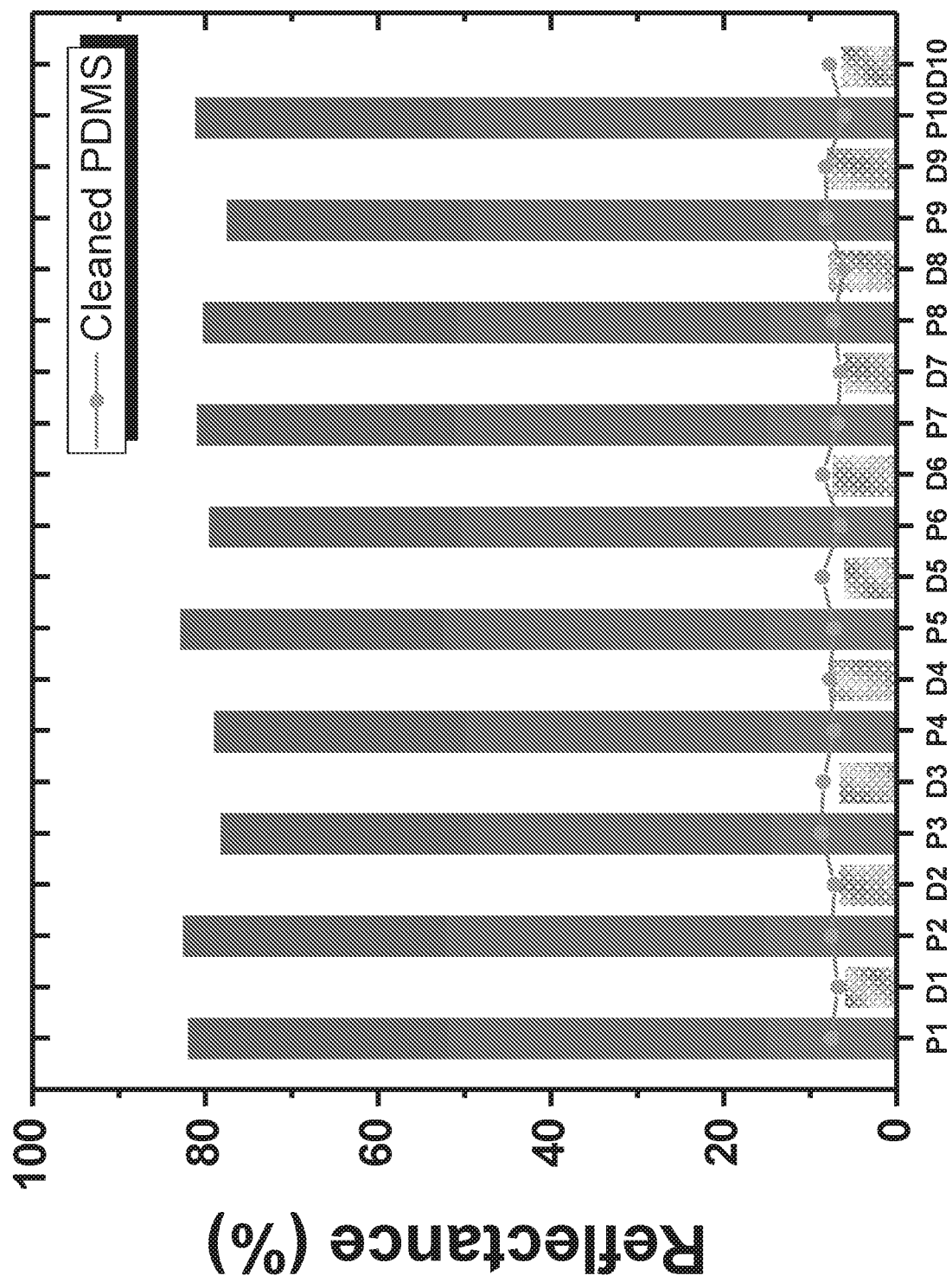
Fig. 3.9

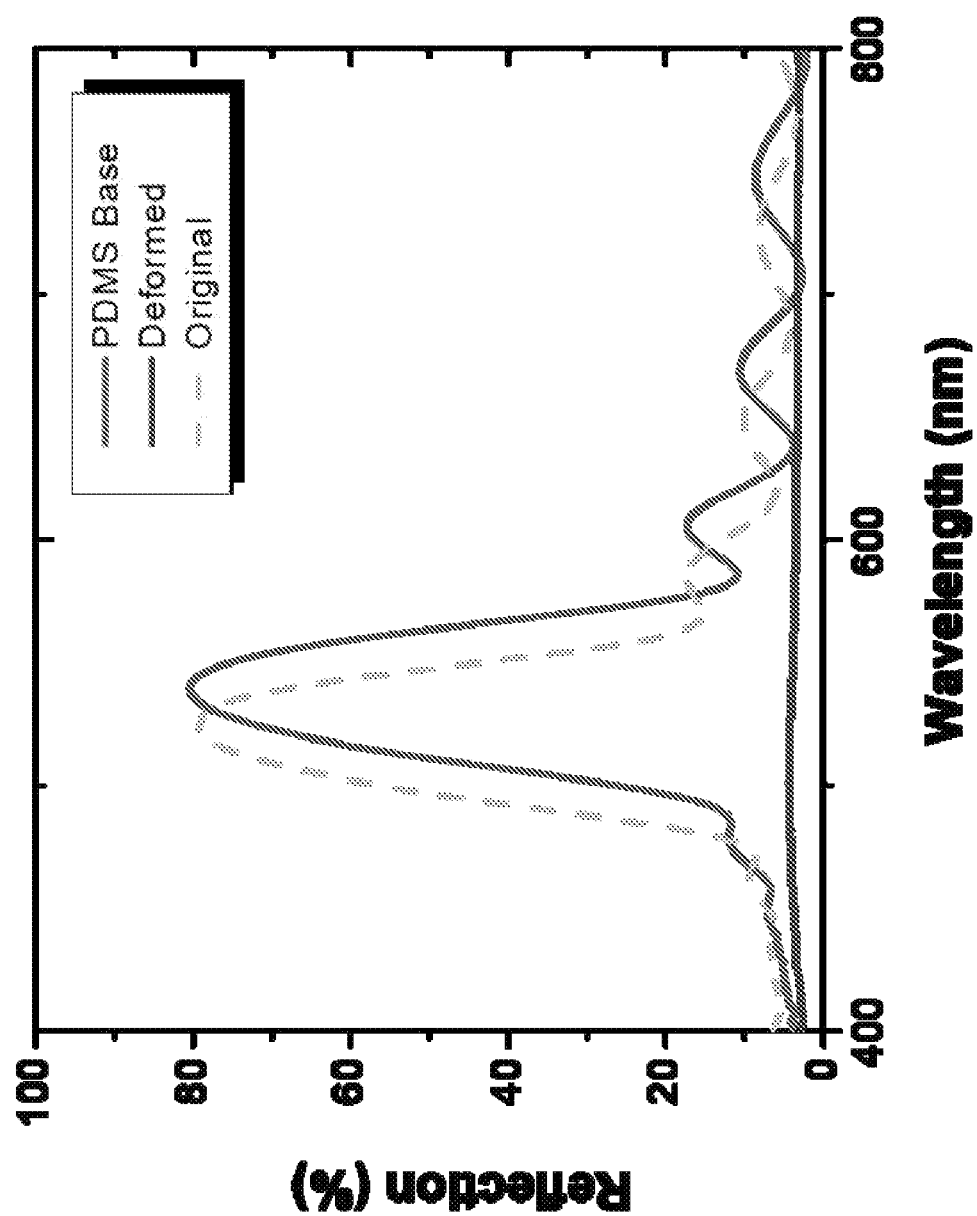
Fig. 3.10A

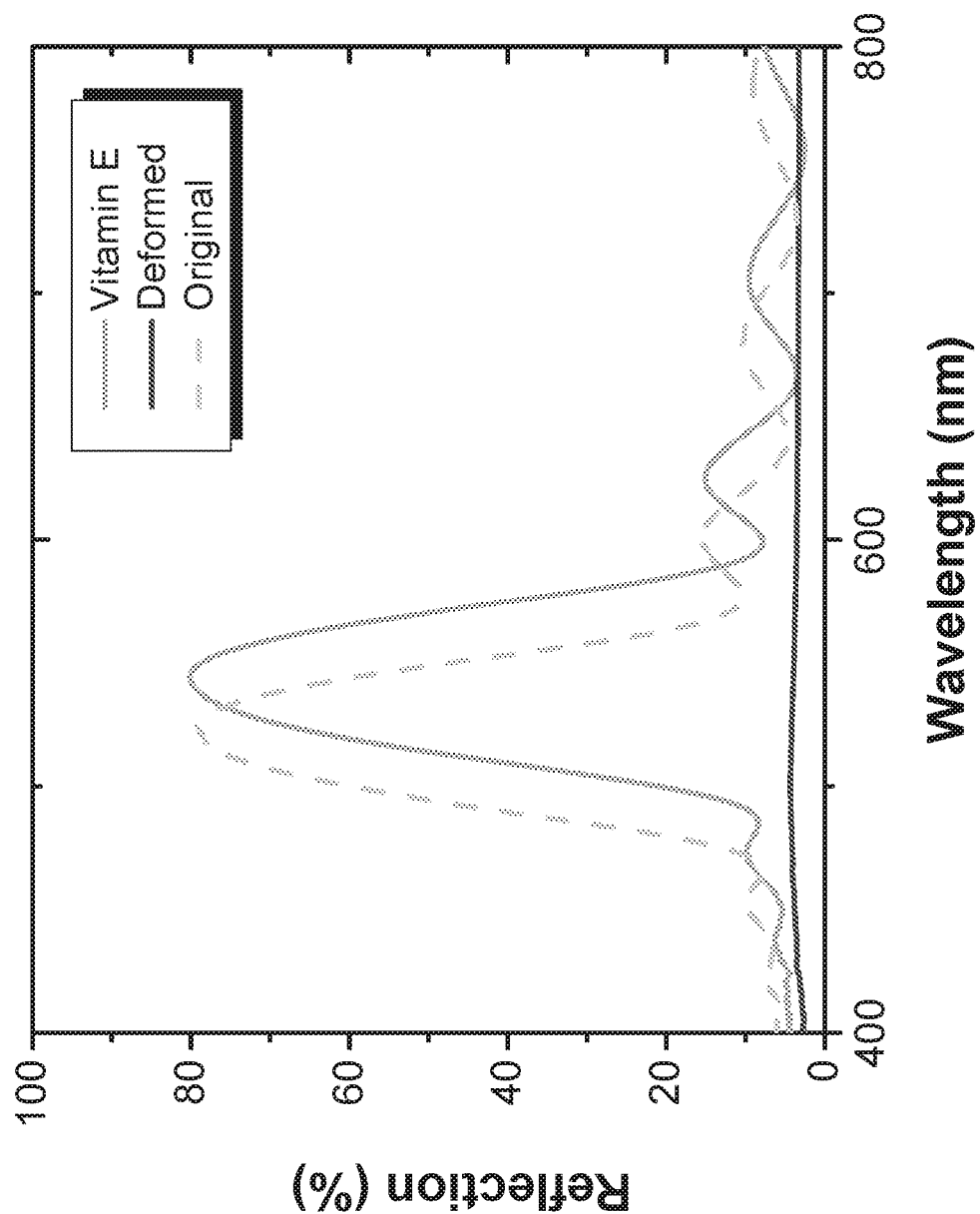
Fig. 3.10B

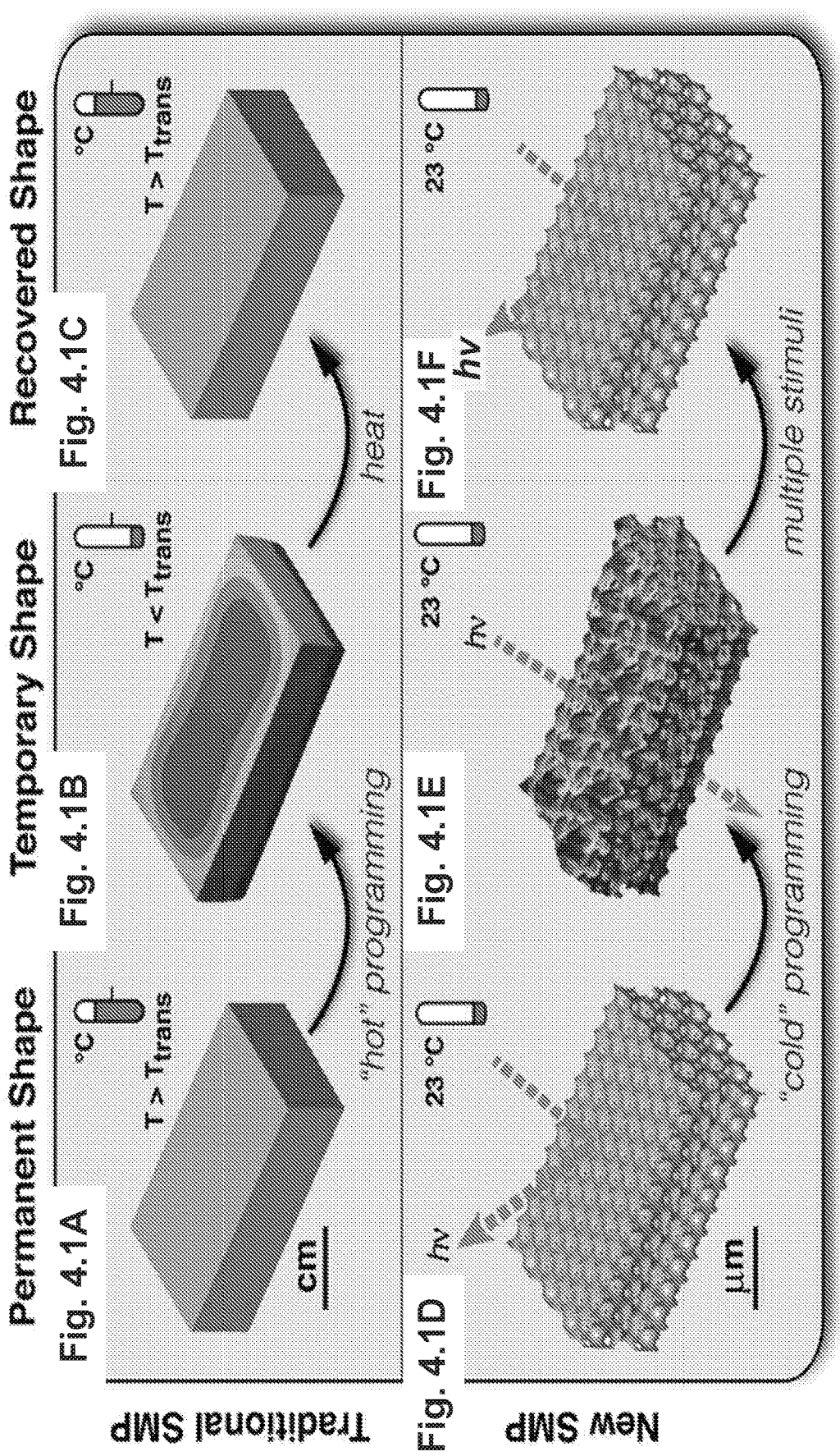

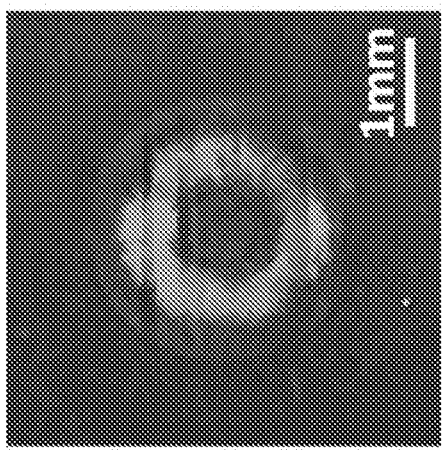
Fig. 4.2A V = 0.99 m/s
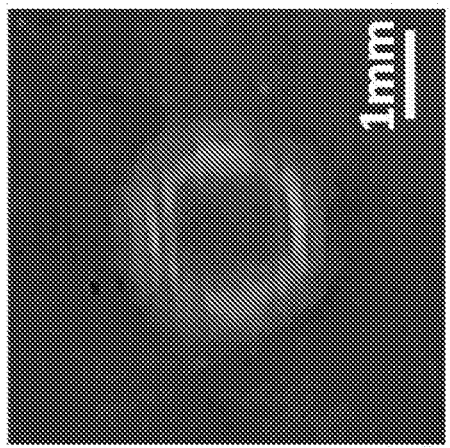
Fig. 4.2B V = 1.4 m/s
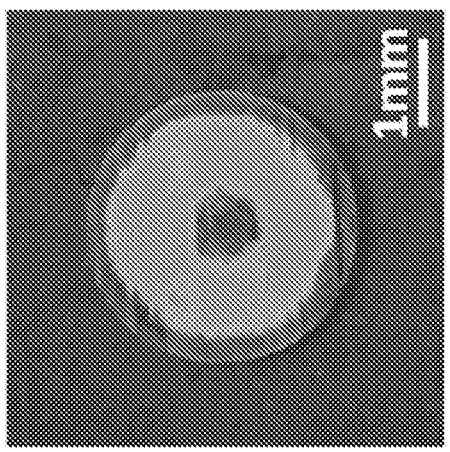
Fig. 4.2C V = 2.21 m/s
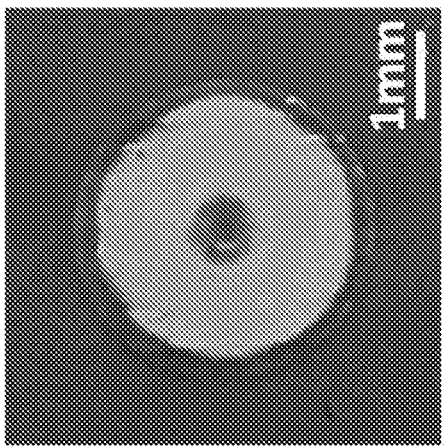
Fig. 4.2D V = 2.8 m/s
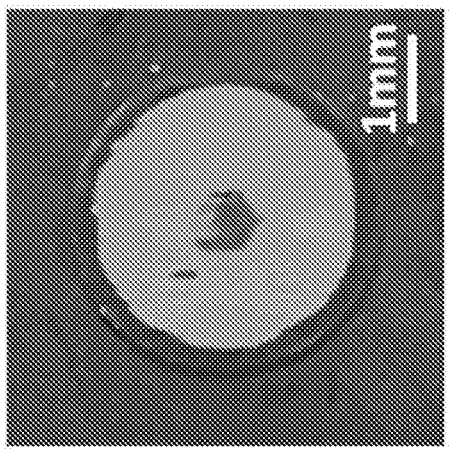
Fig. 4.2E V = 3.34 m/s

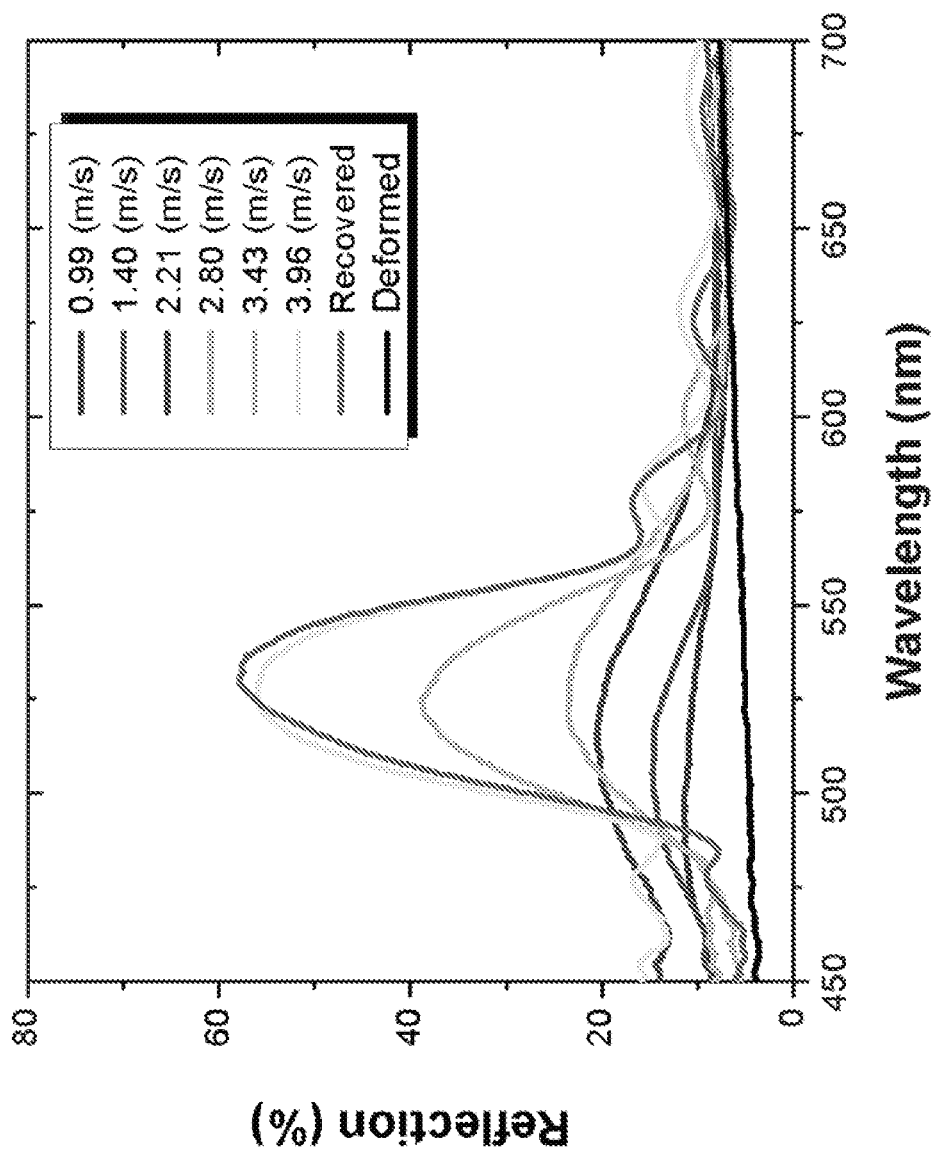
Fig. 4.3

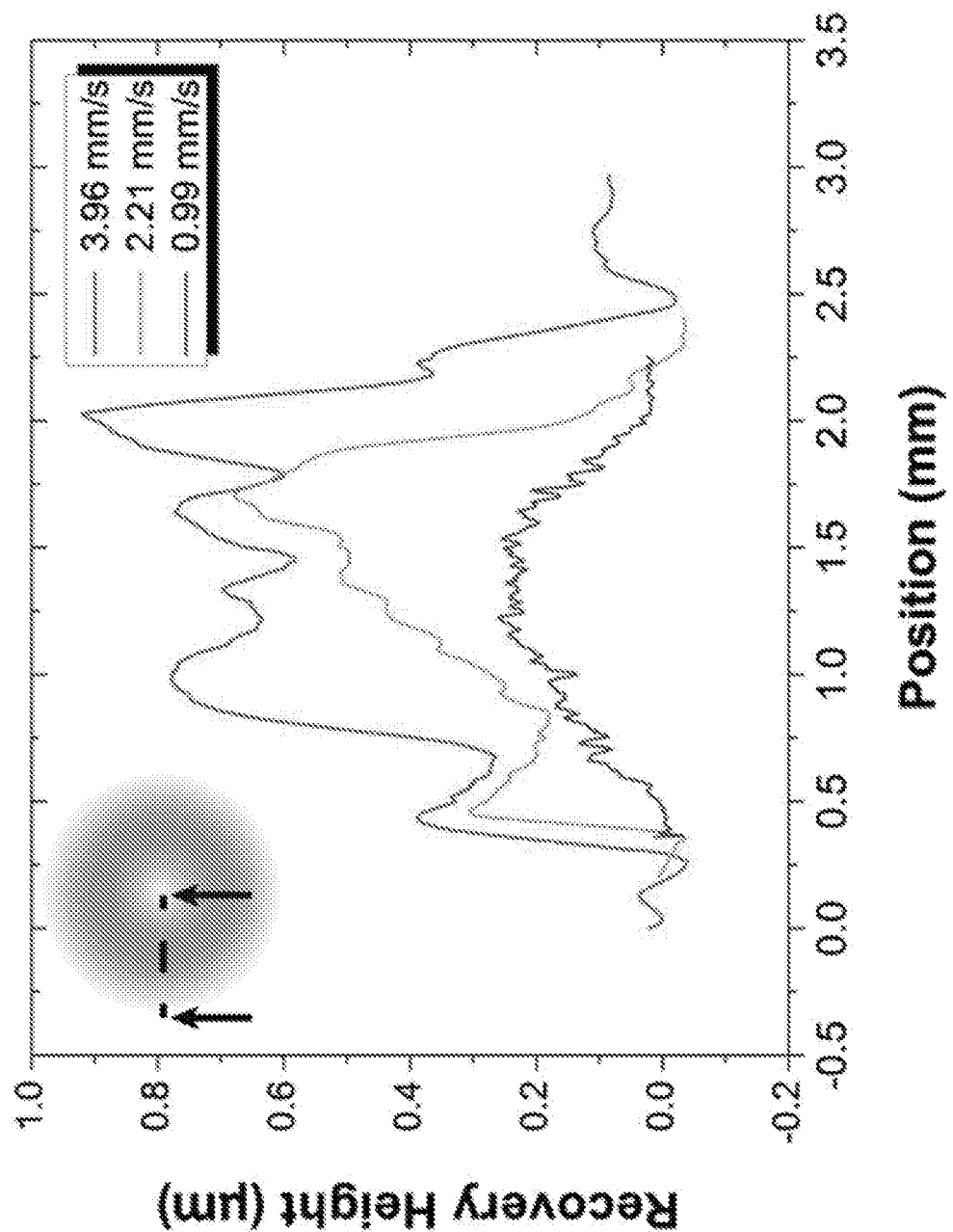
Fig. 4.4

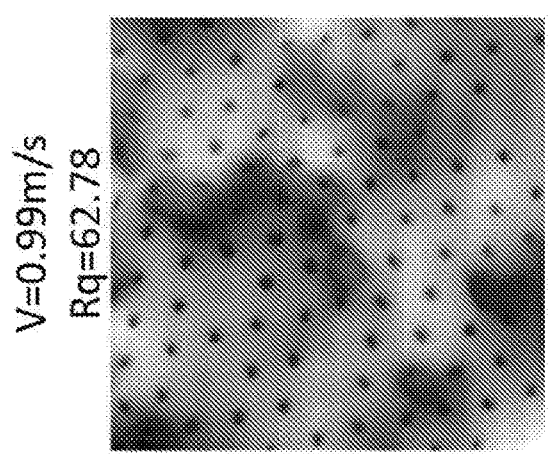
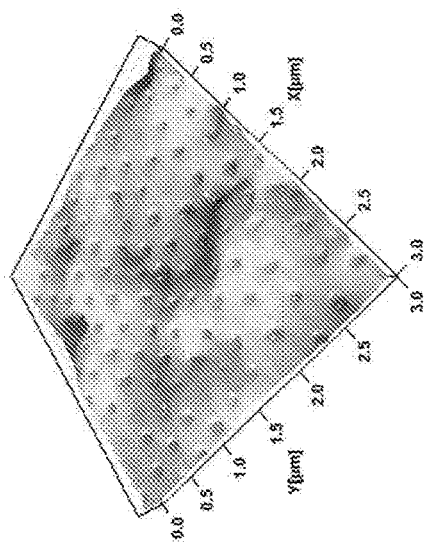
Fig. 4.5A
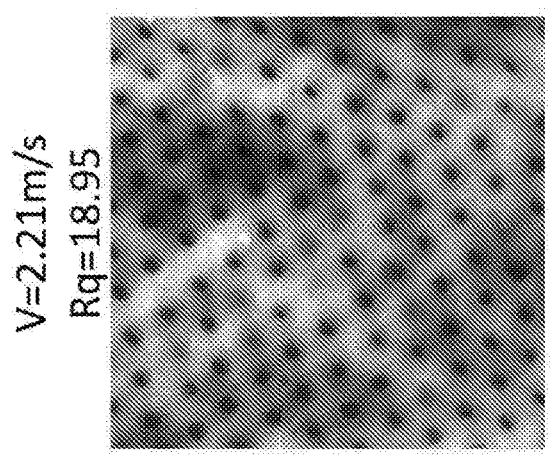
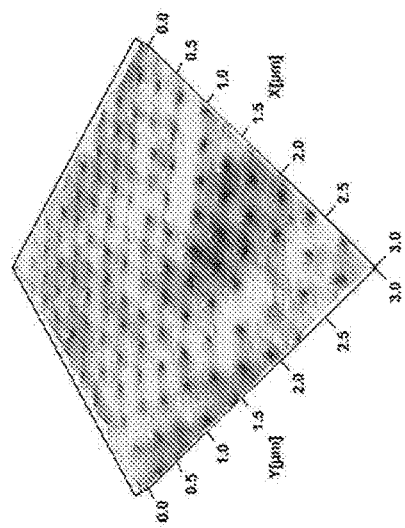
Fig. 4.5B
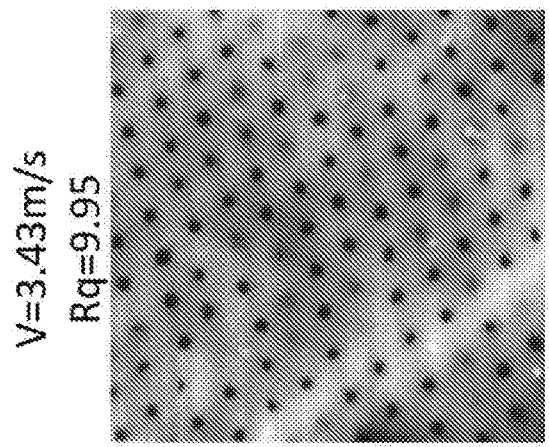
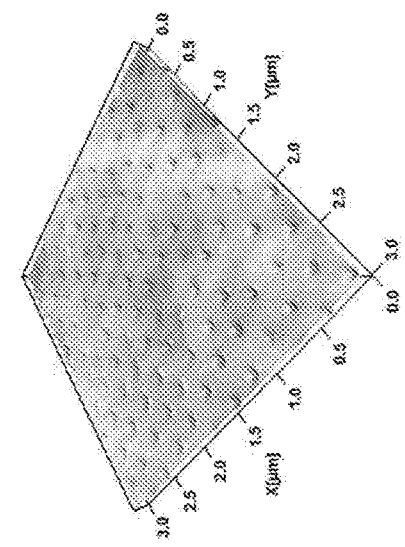
Fig. 4.5C

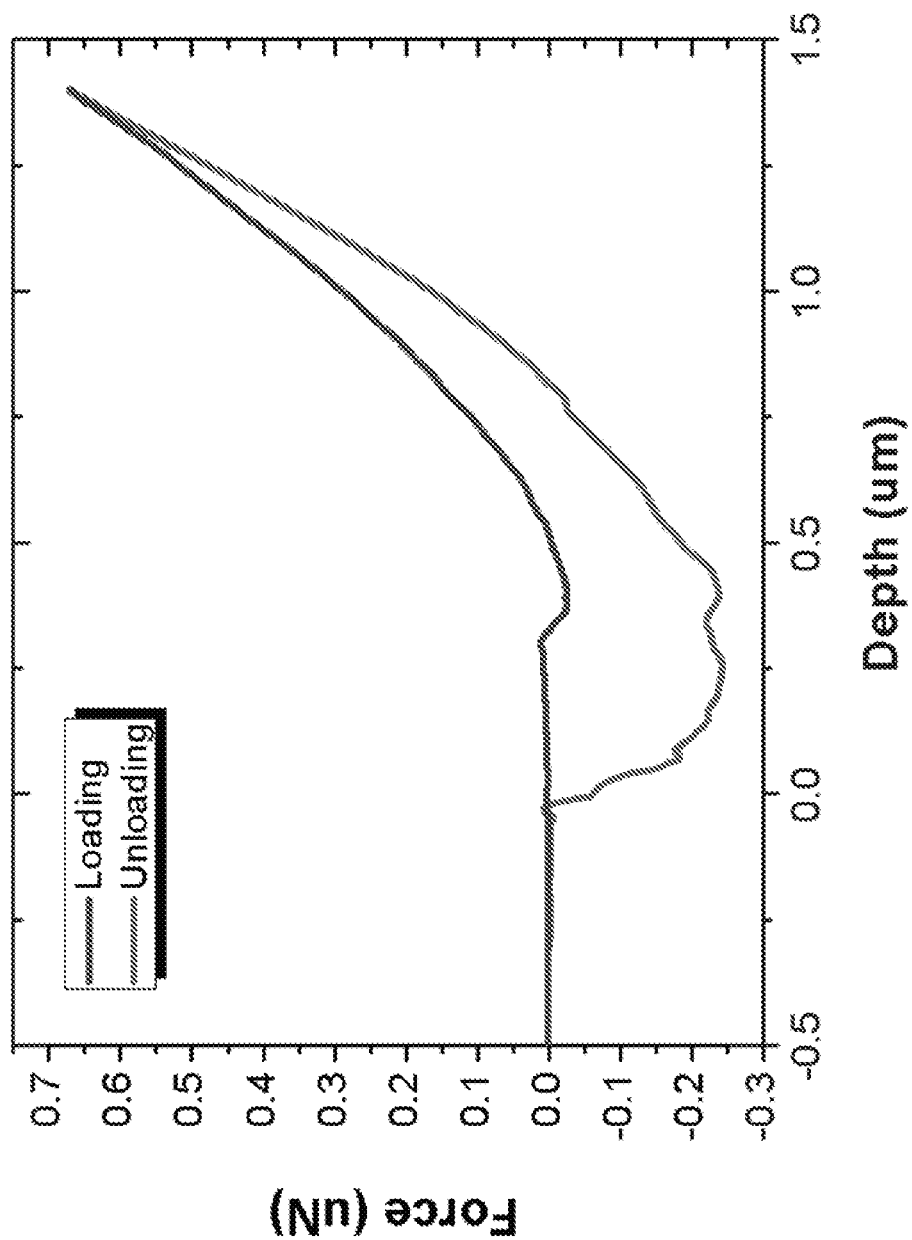
Fig. 4.6

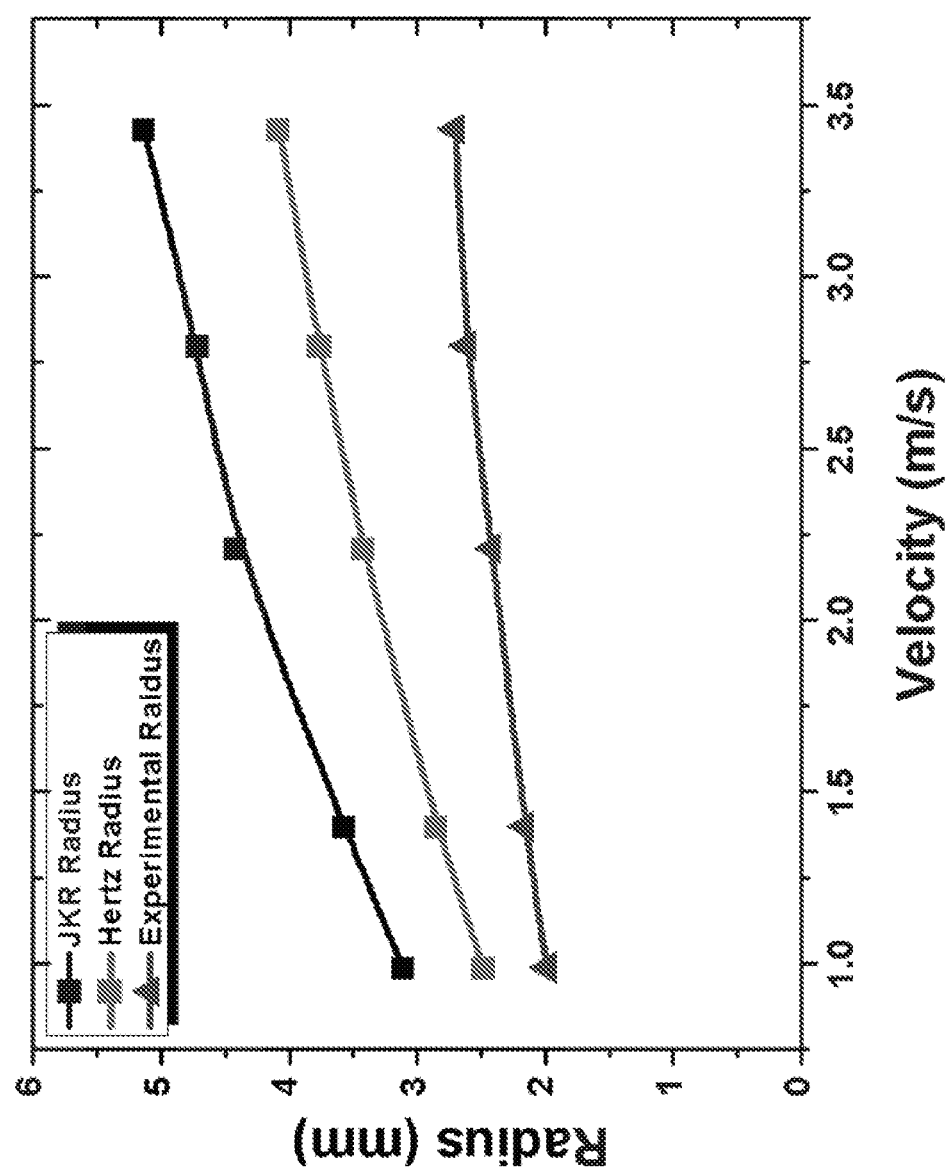
Fig. 4.7

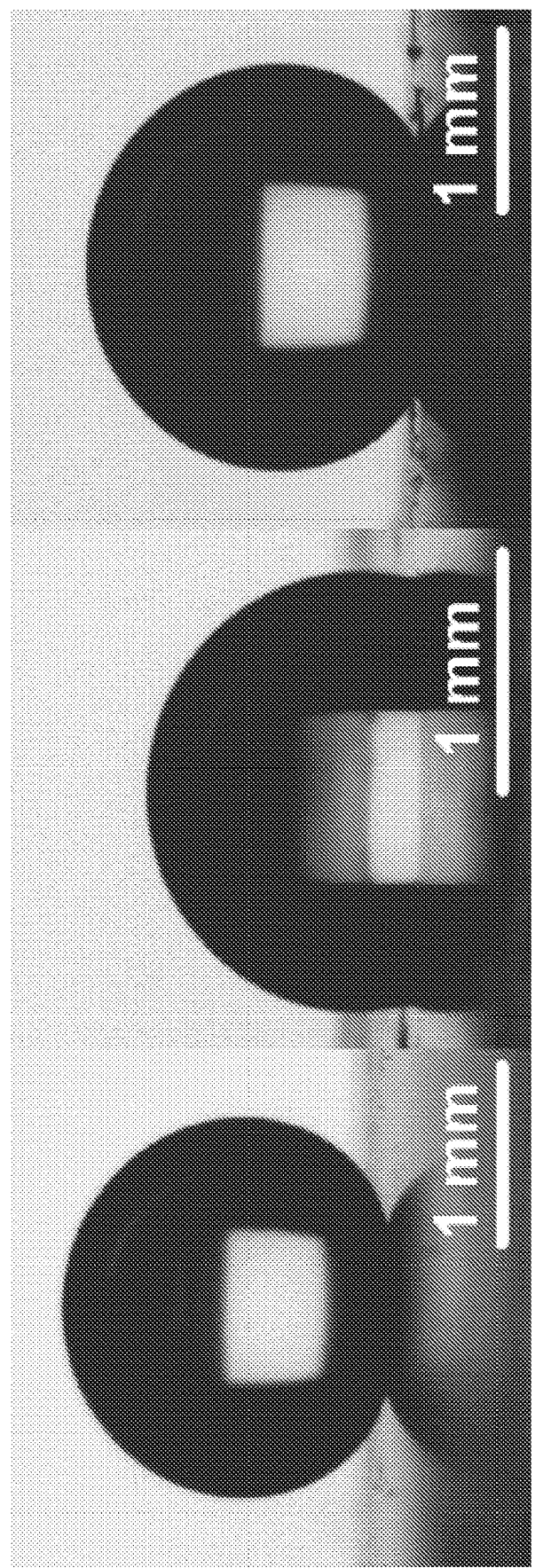
Fig. 5.1A  Fig. 5.1B  Fig. 5.1C

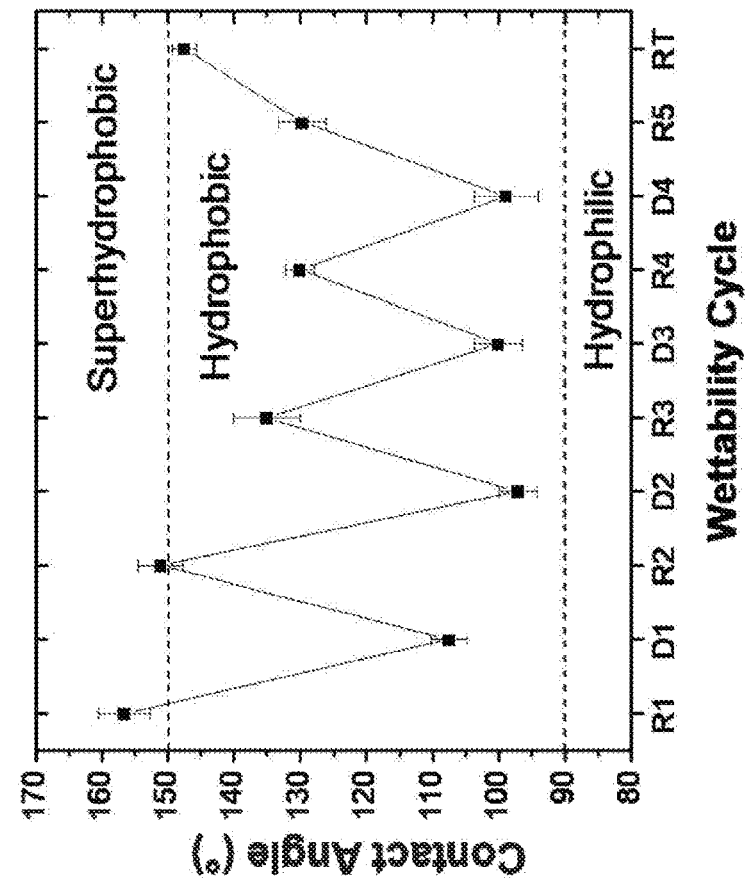
Fig. 5.2B
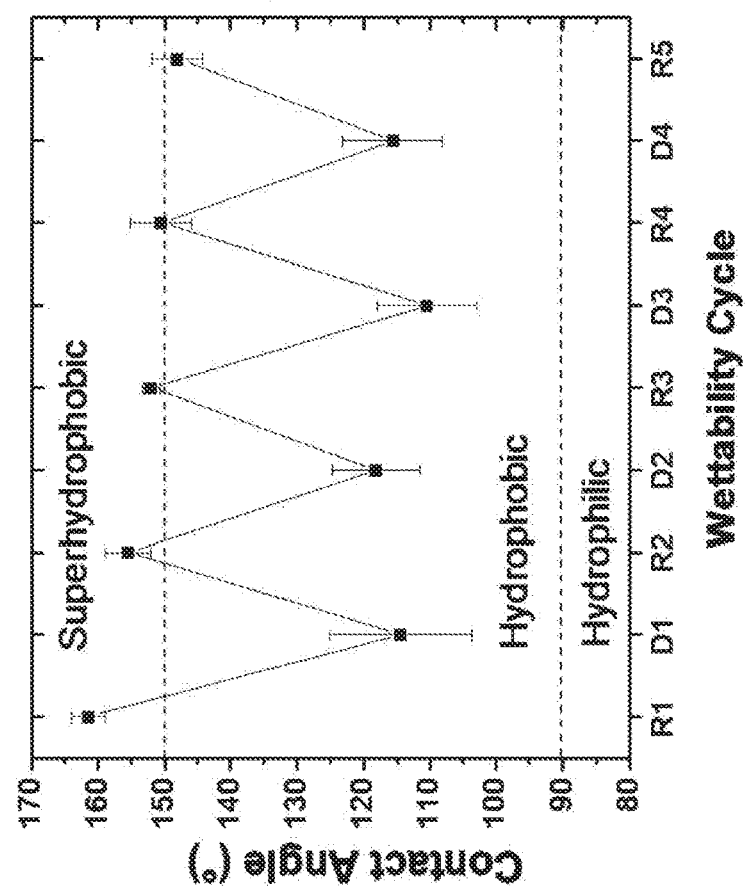
Fig. 5.2A

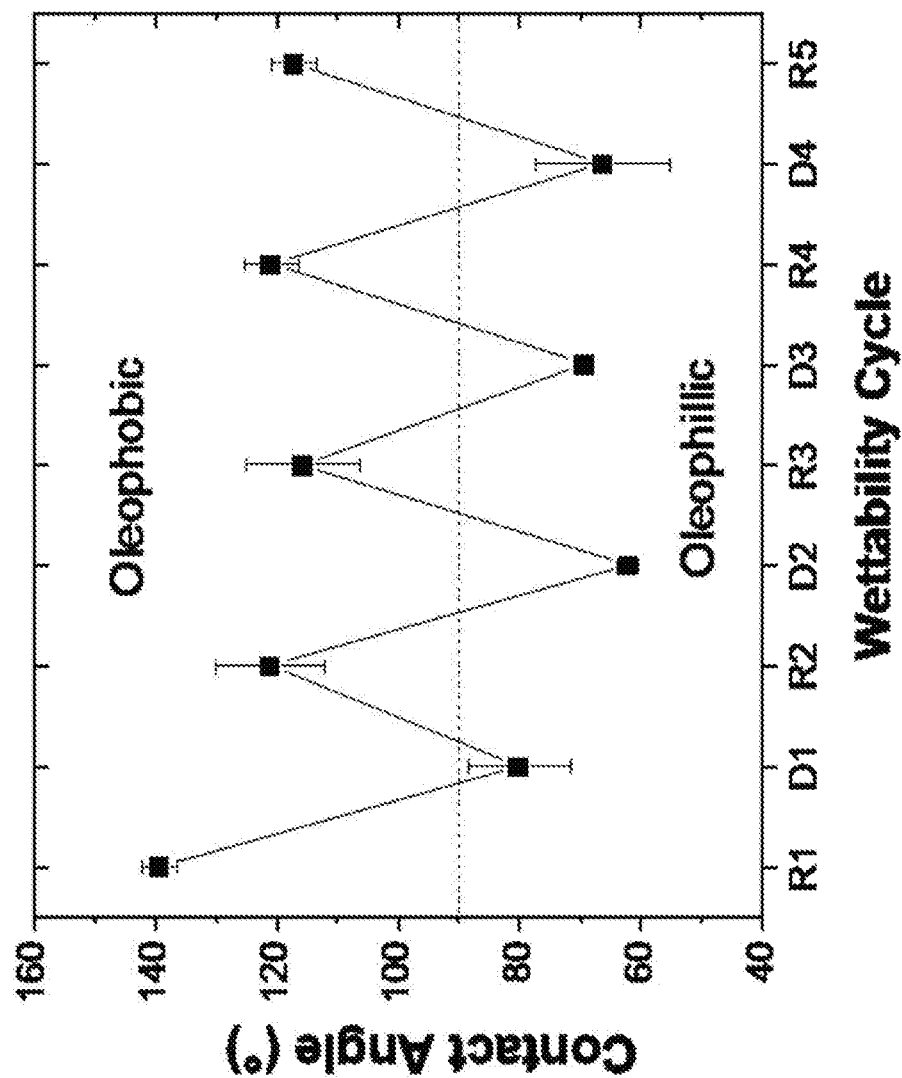
Fig. 5.3

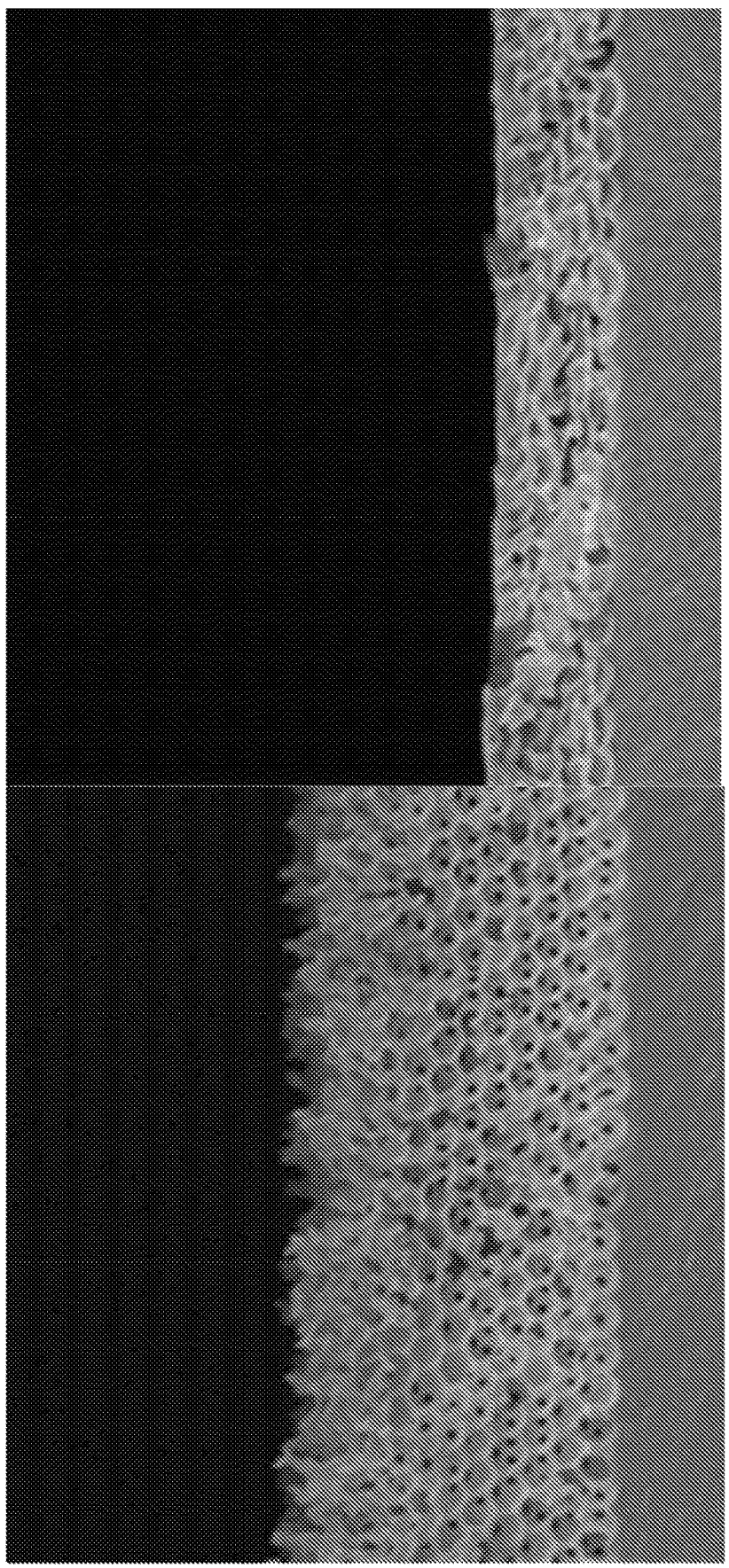
Fig. 5.4B
Fig. 5.4A

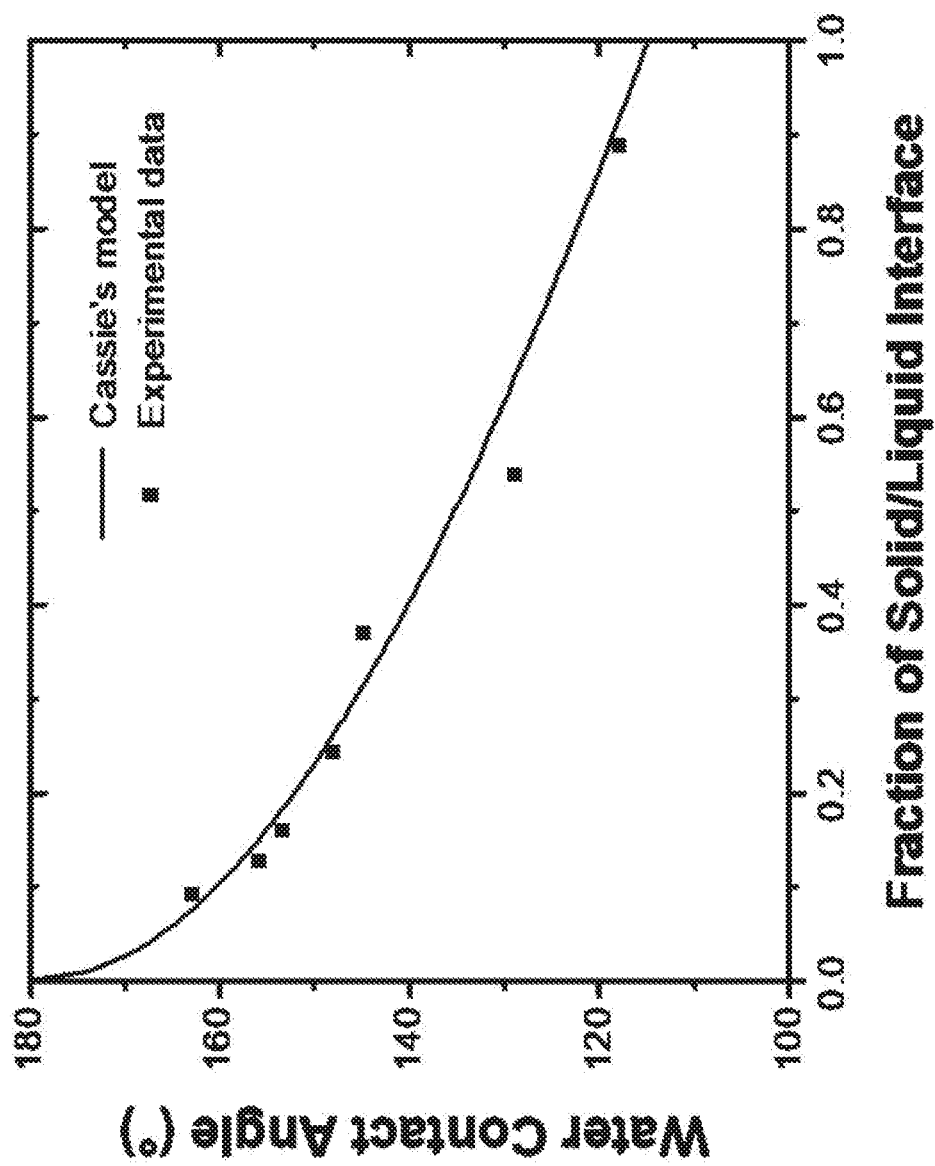
Fig. 5.5

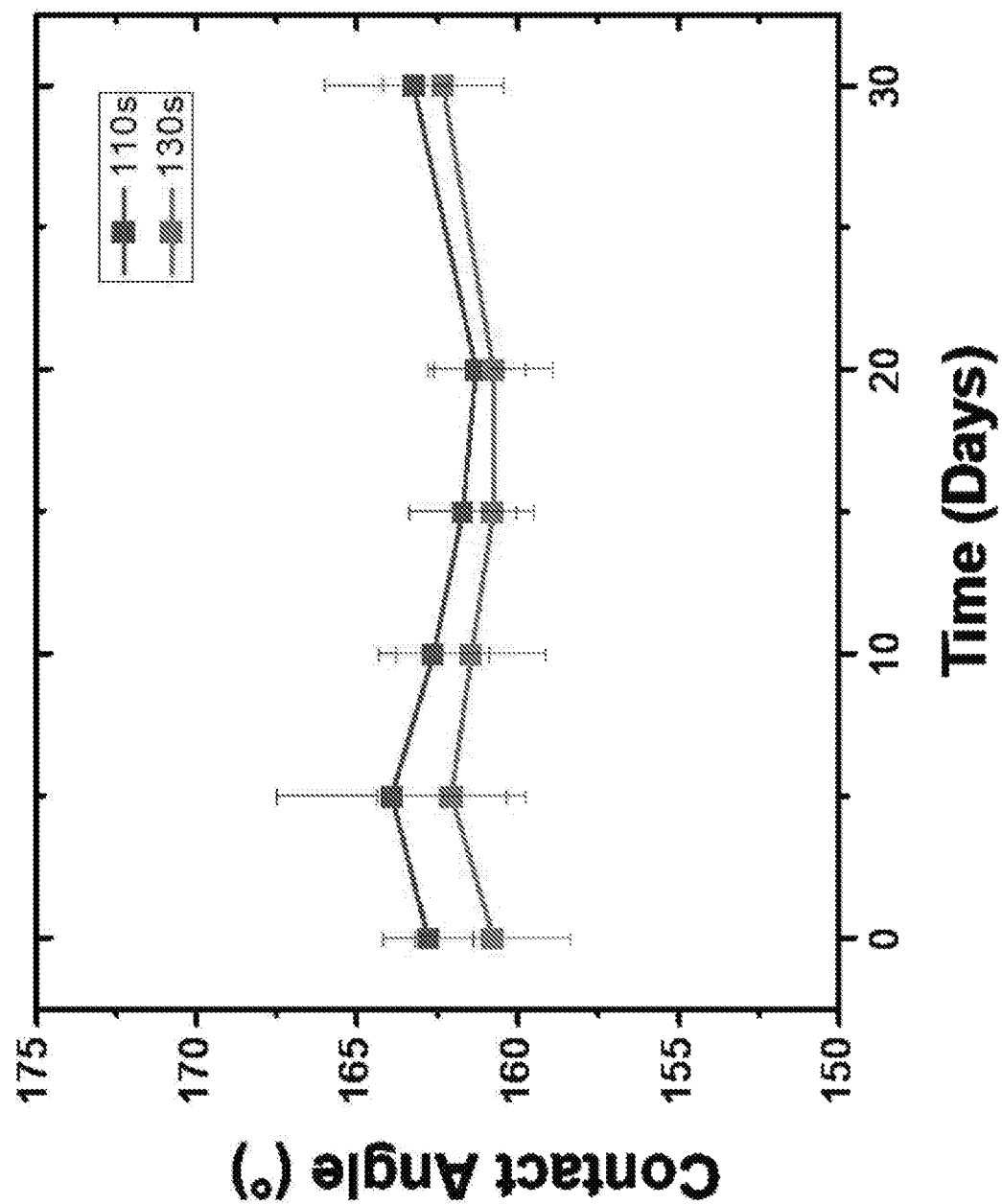
Fig. 5.6

CHROMOGENIC MATERIALS, METHODS OF MAKING CHROMOGENIC MATERIALS, AND METHODS OF USE

CLAIM OF PRIORITY TO RELATED APPLICATION

This application is the 35 U.S.C. § 371 national stage of PCT application having serial number PCT/US2019/017862, filed on Feb. 13, 2019. This application also claims the benefit of and priority to U.S. Provisional Application Ser. No. 62/629,739, having the title "ANTI-REFLECTION MATERIALS AND METHOD OF MAKING ANTI-REFLECTION MATERIALS", filed on Feb. 13, 2018, and U.S. Provisional Application Ser. No. 62/775,493, having the title "ANTI-COUNTERFEITING MATERIALS, METHODS OF MAKING, AND METHODS OF USE", filed on Dec. 5, 2018, the disclosure of which is incorporated herein by reference in its entirety.

FEDERAL SPONSORSHIP

This invention was made with government support under CMMI1562861 awarded by the National Science Foundation and under HDTRA1-15-1-0022 awarded by Department of Defense/Defense Threat Reduction Agency. The government has certain rights in the invention.

BACKGROUND

Sensors have a wide variety of applications, including aviation, drug detection, and ballistic sensing. However, current sensors suffer from limitations. Traditional sensors are based on microelectronics and they typically suffer from high cost, requiring special accommodations (e.g., external electrical power), high energy consumption, and heavy weight and/or large footprint. Sensors are also currently unable to detect solid-solid interfaces.

SUMMARY

The present disclosure provides for porous polymer materials that include an ordered array of voids. The distance between pairs of adjacent voids can be substantially the same, and a polymer framework can separate the voids. The porous polymer material can have a recovery state where the voids are in an uncollapsed state and a characteristic of having an iridescent color. The porous polymer material can have a deformed state having voids in a collapsed state and the porous polymer material has the characteristic of being either non-iridescent or substantially transparent. In various embodiments, the porous polymer material has a first region and a second region, wherein the porous polymer material can include additive particles in the polymer framework and/or a filler polymer in voids of the second region. The filler polymer causes the voids of the second region to irreversibly remain in the uncollapsed state.

The present disclosure also provides for methods for fabricating a polymer material as above. The method includes providing particles in a volume between a first surface of a first substrate and at least one opposing second surface of a second substrate. A composite composition including a shape memory polymerizable material and graphene particles can be added into the volume between the opposing first and second surfaces and the particles. The shape memory polymerizable material can be polymerized to form a polymer composite material that includes a shape memory polymer.

Also provided for in the present disclosure is a polymer composite material that includes an ordered array of particles in which the distance between at least two pairs of adjacent particles is substantially the same, and a polymer composite material surrounds the particles to form a polymer framework. Said polymer composite material includes additive particles.

In embodiments, a method for fabricating a porous material is described, which includes providing a plurality of particles, including an ordered array of nanoparticles, in a volume between a first surface of a first substrate and at least one opposing second surface of a second substrate. A shape memory polymerizable material can be added into the volume between the opposing first and second surfaces to surround the particles, then polymerizing the shape memory polymerizable material to form a polymer framework around the particles. The particles can be removed to form an ordered array of voids in the polymer framework. The porous material can have a first region and a second region. When the voids are in a collapsed state, the porous polymer composite material can substantially clear, and when the voids are in an uncollapsed state the porous polymer composite material can have an iridescent color. A filler polymer can be added to the second region, which causes the voids of the second region to irreversibly remain in the uncollapsed state.

Embodiments of the present disclosure includes chromogenic sensors that can have a hidden anti-counterfeiting pattern. The sensors can include a porous polymer material having an ordered array of voids separated by a polymer framework. The porous polymer material can have a first region and a second region. The first region can have a deformed state, where the voids are in a collapsed state and the porous polymer material has the characteristic of being substantially transparent. The second region can have the recovery state, where the voids are in an uncollapsed state and the porous polymer material has the characteristic of having an iridescent color. The hidden anti-counterfeiting pattern can be present in the second region, wherein the second region includes a filler polymer material in the voids of the second region. The filler polymer causes the voids of the second region to irreversibly remain in an uncollapsed state with the characteristic of having an iridescent color. The hidden anti-counterfeiting pattern is not visible when the first region is in a recovery state since the first and second regions have the characteristic of having an iridescent color. If exposed to a solvent when the porous polymer material is in a recovery state, the first region of the porous polymer material can return to a deformed state (the voids are in a collapsed state and the material transparent) and the hidden anti-counterfeiting pattern appears an iridescent color.

The present disclosure also provides for chromogenic materials including a porous polymer material that can include a polymer framework surrounding an ordered array of voids, and the porous polymer material can have a deformed state and a recovered state. The deformed state can occur when the voids are in a collapsed state, and the chromogenic material appears transparent. The recovered state can occur when the voids are in an uncollapsed state, and the chromogenic material appears iridescent. The porous polymer material in the deformed state can have a static water contact angle greater than about 150°, and a static water contact angle of about 90° to 150° in the recovered state.

The present disclosure also provides for methods of making chromogenic materials, including providing a plurality of particles in a volume between a first surface of a first substrate and at least one opposing second surface of a second substrate. The particles can include an ordered array of particles. The method can further include adding a shape memory polymerizable material into the volume between the opposing first and second surfaces and surrounding the particles, then polymerizing the shape memory polymerizable material to form a polymer framework around the ordered array of particles. The particles can then be removed to form an ordered array of voids in the polymer framework, forming a porous polymer material. When the voids are in a collapsed state the porous polymer material is substantially clear, and when the voids are in an uncollapsed state the porous polymer material has an iridescent color. The porous polymer material can be treated with a silane. The porous polymer material in the deformed state has a static water contact angle greater than about 150°, and a static water contact angle of about 90° to 150° in the recovered state.

The present disclosure also provides for methods of detecting an impact including contacting a first region of chromogenic sensor with an impact. The chromogenic sensor can include a porous polymer material having an ordered array of voids separated by a polymer framework. Contacting occurs when the porous polymer material is in a deformed state, such that the voids are in a collapsed state, and the porous polymer composite material has the characteristic of being substantially transparent. The impact causes the first region of the porous polymer material to return to a recovery state, such that the voids are in an uncollapsed state and the porous polymer composite material changes to an iridescent color.

The present disclosure also provides for methods of detecting target compounds, including contacting a first region of chromogenic sensor with a target compound. The chromogenic sensor can include a porous polymer material having an ordered array of voids separated by a polymer framework. Contacting occurs when the porous polymer material is in a deformed state such that the voids are in a collapsed state and the porous polymer material has the characteristic of being substantially transparent. The target compound causes the first region of the porous polymer composite material to return to a recovery state in which the voids are in an uncollapsed state and the porous polymer material changes to an iridescent color.

The present disclosure also provides for methods of detecting light energy. A first region of chromogenic sensor can be contacted with light energy. The chromogenic sensor can include a porous polymer-graphene material having an ordered array of voids separated by a polymer framework. Contacting occurs when the porous polymer composite material is in a deformed state such that the voids are in a collapsed state and the porous polymer-graphene material has the characteristic of appearing black. The light energy causes the first region of the porous polymer-graphene material to return to a recovery state in which the voids are in an uncollapsed state and the porous polymer-graphene material changes to an iridescent color.

The present disclosure also provides for methods for revealing a hidden anti-counterfeiting pattern in which a chromogenic sensor can be contacted with water and dried, causing the chromogenic sensor to reveal the hidden anti-counterfeiting pattern. The chromogenic sensor can include a porous polymer material, having an ordered array of voids separated by a polymer framework. The porous polymer composite material can have a first region and a second region. When the first region of the porous polymer material has a deformed state, the voids are in a collapsed state and the porous polymer material has the characteristic of being substantially transparent. When the first region of the porous polymer material has a recovery state, the voids are in an uncollapsed state and the porous polymer material has the characteristic of having an iridescent color. The hidden anti-counterfeiting pattern is present in the second region. The second region can include a filler polymer material in the voids of the second region, such that the filler polymer causes the voids of the second region to irreversibly remain in an uncollapsed state and has the characteristic of having an iridescent color. The hidden anti-counterfeiting pattern is not visible when the first region is in a recovery state since the first and second regions have the characteristic of having an iridescent color. The contacting occurs when the porous polymer material is in a recovery state, and contacting can cause the first region of the porous polymer material to return to a deformed state, so that the voids are in a collapsed state and the material is transparent, and the hidden anti-counterfeiting pattern has an iridescent color.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1.1A-1.1B are images of graphene oxide-shape memory polymer composite macroporous membranes as laser detectors.

FIGS. 1.2A-1.2B are images of the as-synthesized graphene oxide aqueous solution.

FIG. 1.3 shows normal-incidence reflection spectra obtained from the graphene oxide-polymer macroporous membrane (original, cold-programmed and laser recovered).

FIGS. 1.4 shows reflection amplitudes at $\lambda=520$ nm obtained from the graphene oxide-polymer macroporous membrane, which was cyclically deformed (D1, D2, D3, D4, D5) and then recovered by laser beam (R1, R2, R3, R4, R5, R6). O indicates the original membrane with 3D ordered macropores.

FIGS. 1.5A-1.5C are typical SEM images of: (1.5A) Cross-section view of a greenish area from macroporous polymer film; (1.5B) Cross-section view of a deformed area; (1.5C) Cross-sectional view of recovered area.

FIG. 1.6 shows time-lapse images of a laser recovery of the composite macroporous membrane for the first 3.5 s.

FIG. 1.7 shows normal-incidence reflection spectra obtained from the graphene oxide-polymer film with different macropores as well as recovery method.

FIGS. 2.1A-2.1D are photographs showing easily perceived changes in structural colors from a macroporous SMP photonic crystal membrane during anti-counterfeiting operations. FIG. 2.1A is an example of a "cold"-programmed film with deformed macropores and a transparent appearance. FIG. 2.1B shows a greenish UF Gator logo created by pressing a PDMS stamp on the transparent SMP membrane. FIG. 2.1C shows the concealing of the UF Gator logo by exposing the sample in FIG. 2.1B to liquid hexane. FIG. 2.1D shows the revealing of the greenish UF Gator logo by immersing the iridescent sample in water, followed by water drying.

FIGS. 2.2A-2.2F are photographs showing good reusability of a macroporous SMP photonic crystal membrane consisting of 300 nm macropores during repeated concealing/revealing processes. FIG. 2.2A shows an initial concealed square pattern after acetone vapor exposure. FIG. 2.2B shows an initial revealed pattern after water immersion. FIG. 2.2C shows a concealed pattern after 15 concealing/revealing cycles. FIG. 2.2D shows a revealed pattern after 15 concealing/revealing cycles. FIG. 2.2E shows a concealed pattern after 25 concealing/revealing cycles. FIG. 2.2F shows a revealed pattern after 25 concealing/revealing cycles.

FIGS. 2.3A-2.3D are examples of typical cross-sectional SEM images showing microstructural transitions of a macroporous SMP photonic crystal membrane consisting of 300 nm macropores during anti-counterfeiting operations. FIG. 2.3A is an example of a "cold"-programmed film with collapsed macropores. FIG. 2.3B shows recovered SMP macropores induced by the infusion of PDMS oligomers. FIG. 2.3C shows recovered SMP macropores triggered by acetone vapor exposure. FIG. 2.3D shows maintenance of the ordered photonic crystal microstructure from a PDMS-recovered region after 10 cycles of concealing/revealing operations.

FIGS. 2.4A-2.4D are examples of typical AFM images showing surface morphology transitions of a macroporous SMP photonic crystal membrane during anti-counterfeiting operations. FIG. 2.4A is an example of a "cold"-programmed film with collapsed macropores. FIG. 2.4B shows recovered SMP macropores induced by the infusion of PDMS oligomers. FIG. 2.4C shows recovered SMP macropores triggered by acetone vapor exposure. FIG. 2.4D shows a PDMS-recovered region after 10 cycles of concealing/revealing operations.

FIG. 2.5 shows experimental and SWA modeled optical reflection spectra of a macroporous SMP photonic crystal membrane consisting of 300 nm macropores after "cold" programming and recovered by acetone, PDMS oligomer infusion, and hexane.

FIG. 2.6A is an example of XPS spectra of a macroporous SMP photonic crystal membrane (black curve), and the same sample after PDMS oligomer infusion, followed by a thorough hexane wash 1 hour (red curve) and 3 days (blue curve) later. FIG. 2.6B shows quantitative XPS elemental composition of the above 3 samples (atom %).

FIG. 2.7A is an example of a water drop profile on a macroporous SMP photonic crystal membrane consisting of 300 nm macropores. FIG. 2.7B is an example of a water drop profile on the same sample immediately after PDMS oligomer infusion. FIG. 2.7C provides a comparison of the apparent water contact angles of the above SMP sample prior to and after PDMS oligomer infusion for different durations.

FIG. 2.8 is an example of normal-incidence optical reflection spectra obtained from a macroporous SMP photonic crystal membrane after multiple concealing/revealing cycles (from 1 to 25 cycles).

FIGS. 2.9A-2.9F are example photographs showing macroporous SMP photonic crystal membranes stamped with a rectangular PDMS block and then washed with hexane after waiting for different durations: FIG. 2.9A, 1 hour; FIG. 2.9B, 12 hours; FIG. 2.9C, 16 hours; FIG. 2.9D, 24 hours; FIG. 2.9E, 48 hours; FIG. 2.9F, 72 hours. FIG. 2.9G provides a graph of average optical reflectivity and standard deviation at 550 nm wavelength for the above samples (FIGS. 2.9A-2.9F).

FIG. 2.10A-2.10B FIG. 2.10A is an example photograph of a macroporous SMP photonic crystal membrane consisting of 300 nm macropores printed with a UF Gator logo after extensive hexane wash (90 min) and water rinse. FIG. 2.10B is a photograph of the same sample in FIG. 2.10A after 30 min hydrofluoric acid etch, followed by 30 min hexane wash and then water rinse.

FIGS. 3.1A-3.1E are images of macroporous shape memory membranes for sensor detecting across solid-solid interfaces. FIG. 3.1A shows an as-synthesized membrane; FIG. 3.1B shows ethanol recovery; FIGS. 3.1C-3.1D show PDMS samples trials; and FIG. 3.1E shows an example of the chronology of PDMS recovery. FIG. 3.1F is an illustration of a possible embodiment of the macroporous shape memory polymer as a small molecule sensor at solid-solid interface.

FIG. 3.2 shows a normal-incidence reflection optical spectra obtained from the macroporous polymer film detecting unreacted-PDMS monomer.

FIGS. 3.3A-3.3C show normal-incidence reflection dynamic spectra obtained from the three different PDMS samples in 3D and 2D plots, respectively. FIG. 3.1A shows cleaned PDMS. FIG. 3.1B shows 10:1. FIG. 3.1C shows 20:1. Ratios indicate volumetric ratios between PDMS monomers to curing agent.

FIG. 3.4 shows the relationship between unreacted PDMS oligomer and macroporous sensor response time.

FIGS. 3.5A-3.5C show typical SEM images of (FIG. 3.5A) the cross-section view of a greenish area from macroporous polymer film; (FIG. 3.5B) cross-section view of a deformed area; (FIG. 3.5C) cross-sectional view of recovered area. Scale bar: 1 μm.

FIGS. 3.6A and 3.6B are pictures of macroporous sensors with pattern recognizing ability. Scale bar: 0.5 cm FIG. 3.7A is a profile characterization of the macroporous sensor with micropatterns using soft-lithography. FIG. 3.7B shows the surface topology of the same sensor.

FIG. 3.8 provides energy dispersive spectroscopic (EDS) characterization of the original (blue), PDMS recovered (red), and hexane washed (green) portions of a sensor.

FIG. 3.9 illustrates good reusability of the solid-solid sensors. P1-P10 show the normal-incidence reflectance of a sensor at 520 nm wavelength; while D1-D10 show the reflectance of the same sensor after drying out of water (i.e., in deformed state).

FIGS. 3.10A-3.10B show normal-incidence optical reflection spectra obtained from the macroporous polymer film detecting uncured PDMS oligomers (FIG. 3.10A) and Vitamin E (FIG. 3.10B).

FIGS. 4.1A-4.1F illustrate the different shape memory effects exhibited by traditional (FIGS. 4.1A-4.1C) and the new mechano-responsive (FIGS. 4.1D-4.1F) SMPs.

FIGS. 4.2A-4.2E are examples of recovered patterns revealed by dropping a stainless steel ball on a deformed SMP membrane at different heights: (FIG. 4.2A) 5 cm.; (FIG. 4.2B) 10 cm.; (FIG. 4.2C) 25 cm.; (FIG. 4.2D) 40 cm.; (FIG. 4.2E) 80 cm.

FIG. 4.3 shows normal-incidence reflection optical spectra of the recovered regions of the samples in FIGS. 4.2A-4.2E.

FIG. 4.4 shows surface profiles indicating the recovered heights of the chromogenic impact sensors impacted with different speeds.

FIGS. 4.5A-4.5C are AFM images of the SMP samples recovered with different impact speeds: FIG. 4.5A, V=0.99 m/s; FIG. 4.5B, V=2.21 m/s; FIG. 4.5C, V=3.43 m/s.

FIG. 4.6 is an example of a typical force-depth indentation curve used to measure mechanical properties of SMPs.

FIG. 4.7 shows experimental and modeled contact radii of the impact craters using the JKR and the Hertz impact models.

FIGS. 5.1A-5.1C demonstrate a static water droplet profile on superhydrophobic macroporous shape memory polymer membrane (5.1A) as fabricated, (5.1B) after heat press, and (5.1C) recovered after 5 heat press cycles.

FIGS. 5.2A-5.2B show multiple cycles between recovered (R1, R2, R3, R4, R5) and deformed (D1, D2, D3, D4) nanostructures. FIG. 5.2A shows re-treating of the surface with fluorosilane each cycle and FIG. 5.2B shows without re-treating the surface with fluorosilane until after 4 cycles (RT).

FIG. 5.3 graphs the apparent hexadecane contact angle for various cycles of recovery (R1, R2, R3, R4, R5) and deformation (D1, D2, D3, D4) of the nanostructure without retreatment.

FIGS. 5.4A-5.4B are SEM cross-section images showing membrane (FIG. 5.4A) as fabricated (FIG. 5.4B) after heat press.

FIG. 5.5 illustrates dependence of the apparent contact angle on the solid/liquid fraction of the SMP membrane acquired from analyzing the top down SEM images. The solid line is calculated using Cassie's equation.

FIG. 5.6 is a graph of fluctuations in the apparent contact angle over one month for two etching conditions.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for substrates, porous substrates, methods of making each, and the like, where the substrates or porous substrates can function as sensors for various stimuli (e.g., laser energy, impact, chemical). In an aspect, substrates of the present disclosure can reversibly change coloration based upon interaction with stimuli.

Shape memory polymers are a class of "smart" materials that can memorize and recover their permanent shapes in response to an external stimulus, such as heat, light, solvent, electricity, and magnetic fields. Compared with their alloy counterparts (e.g., nitinol alloy), SMPs have gained increased attention due to their dramatically larger strain storage and recovery (up to 800% vs. less than 8%), low cost, light weight, ease of synthesis, and biocompatibility. Shape memory (SM) is typically achieved in a three-step process that includes programming, storage, and recovery. Programming involves deforming a sample from its permanent shape to a temporary shape. This is usually done above the polymer glass transition temperature ($T_g$) to take advantage of the compliant nature of SMPs at high temperature. Once the sample has been deformed, it is cooled below $T_g$ to "freeze" in the temporary shape, which is due to restricted polymer chain mobility. Recovery occurs when the sample is heated to the vicinity of $T_g$, which increases chain mobility and allows the polymer to return to its permanent shape via entropy elasticity.[6-9]

"Hot" programming (i.e., heating SMP above a transition temperature such as $T_g$ and then deforming to a temporary configuration) is generally utilized by almost every class of SMPs. By contrast, SMPs that can be "cold" programmed (i.e., programming at or below ambient temperature), which could provide a wide degree of processability to accommodate broader application requirements (e.g., operating at ambient conditions), are rare.

In the present disclosure, the porous polymer material (e.g., also referred to as the SMP photonic crystal membrane) includes an array of voids that are in a collapsed state (e.g., the volume of the void is reduced close to 0) or a disordered state (e.g., the voids are not highly ordered in three-dimension), and when a stimuli (e.g., light energy, pressure, or chemical) is applied to an area of the porous polymer material, the collapsed or disordered voids recover in that area return to their uncollapsed or highly ordered state or fully formed state (e.g., having maximum void volume).

In addition, when the voids are in a collapsed state, the porous polymer material is substantially transparent (e.g., a pale white color) or transparent, or are non-iridescent (e.g. black or a dark color) while when the voids have recovered from the collapsed state, the porous polymer material has an iridescent color that can be tuned by altering the volume of the voids. In an aspect, the voids can be filled with a first polymer so that the voids stay in an uncollapsed state even after stimuli is applied. In this way, regions of the porous polymer material can be differentiated when some regions are in the collapsed state while another region remains in the uncollapsed state. In an aspect, the porous polymer material can include an additive such as graphene. In an aspect, the voids can be filled with a first polymer and the porous polymer material can include the additive.

In an embodiment, the porous polymer material has shape memory characteristics and tunable diffraction properties. An embodiment of the present disclosure provides for a SMP that enables unusual "cold" programming and instantaneous shape recovery triggered by applying an external stimuli (e.g., light energy, pressure or chemical) at ambient conditions.

An advantage of an embodiment of the present disclosure is that the process for making the porous polymer materials is simple, scalable, and inexpensive. In addition, embodiments of the present disclosure can be used in applications such as anti-counterfeiting, light energy detection, chemical detection, and the like.

In an embodiment, the porous polymer material can include an ordered three dimensional array of voids, where a polymer framework separates the voids. As mentioned above, the porous polymer material is substantially transparent or semi-transparent or non-iridescent when the voids are in a collapsed or a disordered state. And the porous polymer material has an iridescent color that can be changed by altering the volume of the voids when the voids have recovered from the collapsed state. In an embodiment, the void can be collapsed by drying the voids after formation or exposing the voids to water and then evaporating the water from the porous polymer material. The voids collapse due to capillary forces when the water evaporates. However, if the void is filled with the first polymer as noted above and herein, the void cannot be collapsed and remains in the uncollapsed state.

In an embodiment, the collapsed voids can be renewed by applying a stimuli such as pressure to an area of the porous polymer material. In an embodiment, one area of the porous polymer material has pressure applied to it, while another area does not have pressure applied to it. The voids are renewed in the area having the applied pressure, while the voids are not renewed in areas where no pressure was applied. In addition, the areas that had pressure applied to it have an iridescent color, while the other areas do not.

In an embodiment, the collapsed voids can be renewed by exposing an area of the porous polymer material to a chemical stimuli such as an organic compound (e.g., a polymer (e.g., PDMS)) or solvent (e.g., ethanol, ethanol, isopropanol, acetone, butanol, and a combination there). In an embodiment, one area of the porous polymer material is exposed to a chemical, while another area is not exposed to the chemical. The voids are renewed in the area exposed to the chemical, while the voids are not renewed in areas not exposed to the chemical. In addition, the areas exposed to the chemical have an iridescent color, while the other areas are substantially transparent.

In an embodiment, the collapsed voids can be renewed by applying a stimuli such as laser energy to an area of the porous polymer material that includes the additive. In an embodiment, one area of the porous polymer material has laser energy directed to it, while another area does not. The voids are renewed in the area having the applied laser energy, while the voids are not renewed in areas where no laser was directed. In addition, the areas that had laser energy applied to it have an iridescent color, while the other areas do not.

The thickness of the porous polymer material varies depending on the state of the voids and the number of voids along a plane perpendicular to the length of the porous polymer material. In an embodiment the porous polymer material can have a thickness of about 1 micrometer to 300 micrometers.

In an embodiment, the polymer framework can include a co-polymer of a pair of acrylate monomers that have low glass transition temperatures ($T_g$<room temperature). In an embodiment, the polymer framework is a co-polymer of ethoxylated trimethylolpropane triacrylate (ETPTA) and polyethylene glycol diacrylate (PEGDA), the structures of which are shown in Example 1. Both ETPTA and PEGDA are flexible at room temperature. The mechanical properties (e.g., rigidity and strength) of the resulting co-polymers can be tuned by controlling the ratio of these two monomers. A higher ratio of PEGDA leads to a softer polymer. In an embodiment, the ratio of ETPTA and PEGDA can be about 1:2 to 1:6. In an embodiment, the porous polymer material can include an ordered array of voids. In an embodiment, the voids can be stacked directly on top of one another or the stacking can be offset. In an embodiment, the thickness of the porous polymer material can include about 1 to 100 monolayers of voids.

In an embodiment, the distance between at least two pairs of adjacent voids is substantially the same (e.g., about 100 nm to 1000 nm). In an embodiment, the number of unique pairs in a 1 cm×1 cm×10 μm sample can be about 10, 100, 1000, 10,000, 100,000, 1,000,000, 100,000,000, 100,000,000, to about 10, 100, 1000, 10,000, 100,000, 1,000,000, 100,000,000, 100,000,000, $1\times10^{10}$, $1\times10^{12}$, $1\times10^{15}$, $1\times10^{17}$, or $1\times10^{20}$ and any set of ranges (e.g., about 10,000 to 100,000, about 100 to $1\times10^{10}$, etc.) within these numbers or subranges (e.g., about 15 to 200,000, 2,500,000 to $3\times10^{12}$, etc.) within these numbers.

In an embodiment, the distance between each pair of adjacent voids is substantially the same. In an embodiment, the distance between a portion of the pairs of adjacent voids is substantially the same. In an embodiment, the "portion" can be about 50% or more, about 60% or more, about 70% or more, about 80% or more, about 90% or more, about 99% or more, or about 100%, over a defined area of the porous polymer layer. In an embodiment, the defined area can include about 50% or more, about 60% or more, about 70% or more, about 80% or more, about 90% or more, about 95% or more, about 99% or more, or about 100%, of the area of the porous polymer layer. The term "substantially" in these contexts can mean about 50% or more, about 60% or more, about 70% or more, about 80% or more, about 90% or more, about 99% or more, or about 100%. The term "adjacent" refers to two voids next to one another without a void separating them in the same porous polymer material.

In an embodiment, a polymer framework separates the voids. In an embodiment, the diameter (or longest distance across the void) of substantially all of the voids can be substantially equivalent. In an embodiment, the diameter is about 0.03 micrometers to 10 micrometers. The term "substantially" in this context can mean about 50% or more, about 60% or more, about 70% or more, about 80% or more, about 90% or more, about 99% or more, or about 100%.

In an embodiment, the porous polymer material is formed by disposing particles (e.g., nanoparticles) onto a surface to form an array of particles. In an embodiment, a monomer mixture can be disposed on a surface using capillary forces (See Examples) or using a process such as a doctor blade coating process, tape casting, or applying a simple shear force by two plates with a controlled gap in between. The particles can be aligned in a three dimensional ordered colloidal crystal array, e.g., the particles can be located in crystalline lattices of, for example, a face-centered cubic (f.c.c.), hexagonal-centered cubic (h.c.p.) crystals, or the like. After the monomer mixture is disposed on the particle array, the monomer mixture can be polymerized to form a co-polymer membrane having particles disposed in the polymer membrane. In an embodiment, the polymerization can be photopolymerization, thermopolymerization, or a combination thereof.

Subsequently, a portion (e.g., about 50%, 60%, 60%, 80%, 90%, 95%, 99% or more, or about 100%) or all of the particles can be removed to form the porous polymer material. In an embodiment, the particles can be removed by a process that does not alter the polymer. The type of process used to remove the particles depends, at least in part, upon the type of nanoparticle and the polymer. In an embodiment, the porous polymer material is formed by dissolving the particles using an acid solution such as, but not limited to, hydrofluoric acid (e.g., for silica nanoparticles). The porous polymer material including an array of voids is formed once the particles are removed.

As mentioned above, the voids are made from the removal of one or more particles. In an embodiment, the particles are disposed on top of one another in the polymer membrane, and when the particles are removed, a void is formed in the place of each particle. In an embodiment, the voids are distinct from one another and in another embodiment the voids are interconnected to form interconnected volumes that can form channels within and/or through the porous polymer material.

In an embodiment the monomer mixture can include two or more acrylate monomers such as those described herein, where each monomer can be about 5 to 95 weight percent of the monomer mixture. In an embodiment the prepolymer mixture can include an ethoxylated trimethylolpropane triacrylate (ETPTA) and a polyethylene glycol diacrylate (PEGDA). In an embodiment, the volumetric ratio of ETPTA to PEGDA can be about 1:1 to 1:10 or about 1:2 to 1:6. In addition, the monomer mixture can include a polymer initiating agent such as a photoinitiator (e.g., 2-hydroxy-2-methyl-1-phenyl-1-propanone, azobisisobutyronitrile, or and 2,2-dimethoxy-2-phenylacetophenone). The amount of initiator used depends upon the polymerization process, the monomers, and the like.

Once the monomer is polymerized, a polymer framework is formed around the particles. After the particles are removed, the polymer framework supports the porous polymer material. The mechanical characteristics of the polymer framework can be controlled by selection of the monomers, the ratio of the monomer, and the like. The dimensions of the polymer framework can be controlled by the process of disposing the monomer/particle mixture on the substrate. In an embodiment, the thickness of the polymer framework between adjacent particles can be about 100 nm to 1000 nm.

In an embodiment, the particles can be of the same or different type and/or same or different size, depending on the use or purpose of the porous polymer material. The selection of the type particle can depend upon the process for removing the particle, the type of polymer, and/or polymer framework. In an aspect, the particles are nanoparticles. The selection of the size can depend upon the process for removing the nanoparticles, the type of polymer, the polymer framework, the diameter of the desired voids and channel, and the like. In an embodiment, two or more different types and/or sizes of nanoparticles can be selected. In an embodiment, two or more processes can be used to remove nanoparticles (e.g., when two or more types of nanoparticles are used in the monomer/nanoparticle mixture). The type of nanoparticle can include silica nanoparticles, polymer latex nanoparticles, titania nanoparticles, CdSe nanoparticles, and other nanoparticles where the type selected has a uniform diameter. In an embodiment, the nanoparticles can have a diameter of about 100 to 1000 nm or about 200 to 500 nm.

Now having described various aspects of the present disclosure in general, other aspects will be described. In an aspect, the porous polymer material includes an ordered array of voids, where the distance between at least two pairs of adjacent voids is substantially the same and where the polymer framework separates the voids. The porous polymer material has a recovery state, where the voids are in an uncollapsed state and the porous polymer material has the characteristic of having an iridescent color. The porous polymer material has a deformed state, where the voids are in a collapsed state and the porous polymer material has the characteristic of being substantially transparent. The porous polymer material comprises a first region and a second region. The deformed state occurs when a solvent is evaporated from the porous polymer material causing the voids to collapse. The recovery state occurs when the porous polymer material in the deformed state is exposed to an external stimulus causing the collapsed voids renew their uncollapsed state.

In particular aspects, the porous polymer material can optionally include one or both of: additive particles in the polymer framework or a filler polymer in voids of the second region, where the filler polymer causes the voids of the second region to irreversibly remain in the uncollapsed state. Porous polymer materials including additive particles may have a color other than transparent in the deformed state (e.g. black), but will appear iridescent in the recovered state.

In one aspect, the present disclosure provides for a chromogenic sensor having a hidden anti-counterfeiting pattern. The porous polymer material can be an ordered array of voids separated by a polymer framework, where the porous polymer composite material has a first region and a second region. The first region of the porous polymer material has the deformed state, the voids are in a collapsed state and the porous polymer material has the characteristic of being substantially transparent. The first region of the porous polymer material has the recovery state, the voids are in an uncollapsed state and the porous polymer material has the characteristic of having an iridescent color.

The hidden anti-counterfeiting pattern is present in the second region, where the second region includes a filler polymer material in the void of the second region. The filler polymer causes the voids of the second region to irreversibly remain in an uncollapsed state and has the characteristic of having an iridescent color. The hidden anti-counterfeiting pattern is not visible when the first region is in a recovery state since the first and second regions have the characteristic of having an iridescent color.

When the structure is exposed to a solvent, the porous polymer material is in a recovery state, and the exposing causes the first region of the porous polymer material to return to a deformed state, the voids are in a collapsed state and the material transparent. However, the hidden anti-counterfeiting pattern has the characteristic of having an iridescent color.

The method of making the chromogenic sensor having a hidden anti-counterfeiting pattern is similar to that provided above. The method includes providing a plurality of particles in a volume between a first surface of a first substrate and at least one opposing second surface of a second substrate. The plurality of particles includes an ordered array of nanoparticles. A shape memory polymerizable material can be added into the volume between the opposing first and second surfaces to surround the particles. The shape memory polymerizable material can be polymerized to form a polymer framework around the particles. The particles can be removed to form the polymer framework. The porous polymer composite material has a first region and a second region. When the voids are in a collapsed state the porous polymer composite material is substantially clear, wherein when the voids are in an uncollapsed state the porous polymer composite material has an iridescent color. The filler polymer can be added to the second region, where the filler polymer causes the voids of the second region to irreversibly remain in the uncollapsed state.

In regard to filling the voids of the second region, the filler material can be autonomously infused into the voids of the second region. The filler material swells the collapsed pores. In an aspect, the filler polymer comprises uncured oligomers and plasticizers. In an embodiment, the filler polymer can be a polymer such as polydimethylsiloxane, polybutadiene rubber, styrene butadiene rubber, nitrile rubber, chloroprene, neoprene, polyacrylates, polystyrene, polyurethanes, epoxies, and a combination thereof. In an aspect, the filler polymer can be cured or uncured. In an aspect, the filler polymer fills about 20-100% of the void in a region (a second region), about 40-100% of the void in a region, about 50-100% of the void in a region, about 60-100% of the void in a region, about 80-100% of the void in a region, about 90-100% of the void in a region, about 100% of the void in a region.

In an aspect, the present disclosure provides for methods to reveal a hidden anti-counterfeiting pattern. In an aspect, the method includes contacting a chromogenic sensor with water and drying, causing the chromogenic sensor to reveal the hidden anti-counterfeiting pattern. The chromogenic sensor includes the first region of the porous polymer material has the deformed state, the voids are in a collapsed state and the porous polymer material has the characteristic of being substantially transparent, where the first region of the porous polymer material has the recovery state, the voids are in an uncollapsed state and the porous polymer material has the characteristic of having an iridescent color. The chromogenic sensor includes the hidden anti-counterfeiting pattern in the second region. The second region includes a filler polymer material in the void of the second region, where the filler polymer causes the voids of the second region to irreversibly remain in an uncollapsed state and has the characteristic of having an iridescent color. The hidden anti-counterfeiting pattern is not visible when the first region is in a recovery state since the first and second regions have the characteristic of having an iridescent color.

The exposing occurs when the porous polymer material is in a recovery state, and contacting causes the first region of the porous polymer material to return to a deformed state, where the voids are in a collapsed state and the material transparent, and where the hidden anti-counterfeiting pattern has the characteristic of having an iridescent color. The method also includes returning the material to the recovery state by exposing the material to a solvent, thereby concealing the pattern. The chromogenic sensor is attached to an article or article packaging.

In an aspect, a detector/reflector porous polymer material (e.g., shape memory polymer porous polymer material or shape memory polymer composite porous polymer material) that includes an additive such as graphene, graphite, graphene oxide, carbon black, or other light absorbing particles. Embodiments of the detector/reflector porous polymer material can be attractive for practical military applications especially as a laser-weapon detector and laser beam reflector. Additionally, the shape memory properties would enable the material to remember the laser beam trajectory as well as generate patterns. The material in the deformed state can appear black, and where the material in the recovered state appears iridescent green. Embodiments of the present disclosure are also reusable.

In an aspect, the porous composite structure has a deformed state and a recovered state. A transformation from the deformed state to the recovered state can be accomplished by exposure of the porous composite structure to a laser energy (e.g., about 405 nm-532 nm). In an aspect, when in the recovered state the porous composite structure has a reflectance of the laser energy of about 80% or more (e.g., about 85% or more, about 90% or more, about 95% or more) after exposure to the laser energy. Similarly, a transformation from the recovered state to the deformed state can be accomplished by exposure of the porous composite substrate to a solvent (e.g., water, alcohol (e.g., ethanol), etc.) and then dried. The solvent can alter the antireflection characteristics by changing the shape of the nanopores in the porous composite substrate through a mechanism such as capillary action. The state of the porous composite structure can be cycled numerous times (e.g., the state is reversible). In addition, the optical reflection of the porous composite structure described herein can be fine-tuned by simple structural manipulation (e.g., selection of the dimensions of the silica particles which dictates the dimensions of the pores). In this regard, a porous composite structure as described herein can be considered tunable. Additional details are provided in the Example.

In an aspect, the polymerizable material includes graphene or other carbon based material. In an embodiment, graphene or other carbon based material such as graphite, carbon felt, carbon cloth, carbon fiber, foam glass carbon, carbon foam, and carbon nanotubes, can be used. In an aspect, the graphene has a diameter of about 1 μm. In an aspect, the polymerizable material includes about 0.1-5 weight % of graphene.

The present disclosure includes methods of detecting light energy (e.g., laser energy). The method can includes contacting a first region of chromogenic sensor with light energy. The contacting occurs when the porous polymer composite material is in a deformed state wherein the voids are in a collapsed state and the porous polymer-graphene material has the characteristic of appearing black. The light energy causes the first region of the porous polymer-graphene material to return to a recovery state wherein the voids are in an uncollapsed state and the porous polymer-graphene material changes to an iridescent color.

In one aspect, the present disclosure provides for a chromogenic material that can be deformed and recovered as above, and is switchable (e.g. reversible) from superhydrophobic to hydrophobic. The material displays iridescent structural color in the superhydrophobic state, however becomes transparent in the hydrophobic state. The switchable wettability coatings are enabled by thermoresponsive shape memory polymer macroporous membranes. This material has potential applications, including by not limited to, rewritable liquid patterns, liquid-liquid separations, guided liquid flow, or as a controlled-release device.

In various aspects, the material includes a porous polymer material having a polymer framework surrounding an ordered array of voids as described above. The material can have a deformed state and a recovered state. The deformed state occurs when the voids are in a collapsed state, wherein the chromogenic material appears transparent in the deformed state. When in the deformed state, the material has a static water contact angle greater than about 150°, and the porous polymer material in the recovered state has a static water contact angle of about 90° to 150°. In an aspect, the polymer framework comprises urethane, for example a viscous urethane oligomer blend (e.g., aliphatic polyester based urethane diacrylate oligomer blended with 20% ethoxylated trimethylol propane triacrylate).

In an aspect, the porous polymer membrane transitions to the deformed state by heating to above the glass transition temperature (e.g., above about −40° C., or about 120° C.) and applying a vertical force (e.g., a pressing force of about 200 $lb_f$. The porous polymer membrane transitions to the recovered state by reheating to above the glass transition temperature. With a reapplication of a silane (e.g., heptadecafluoro-1,1,2,2-tetrahydrodecyl trichlorosilane, or other fluorinated silanes) at each cycle, the membrane can switch between superhydrophobicity (e.g., deformed state) and hydrophobicity (e.g., recovery state) about 4 times before the contact angle is reduced in the deformed state. Without reapplication of the silane, the membrane can cycle between superhydrophobic and hydrophobic once, then proceeds to cycle between the high end and low end of hydrophobicity.

Advantageously, the membrane also exhibits switchable oleophobicity. In the recovered state, the membrane displays oleophobic behavior (150°>CA>90°); however, after deformation via heat press, the membrane shows oleophilic behavior (CA<90°). This phenomenon is repeatable for at least 4 cycles without retreatment with silane.

A chromogenic material having hydrophobic to superhydrophobic properties can be made according to methods similar to those described above. The method includes providing a plurality of particles in a volume between a first surface of a first substrate and at least one opposing second surface of a second substrate. The particles are in an ordered array. A shape memory polymerizable material can be added into the volume between the opposing first and second surfaces and surrounding the particles, followed by polymerizing the shape memory polymerizable material to form a polymer framework around the ordered array of particles. The particles can be removed to form an ordered array of voids in the polymer framework, forming a porous polymer material so that when the voids are in a collapsed state the porous polymer material is substantially clear, and when the voids are in an uncollapsed state the porous polymer material has an iridescent color. The porous polymer material can be treated with a silane. The porous polymer material in the deformed state has a static water contact angle greater than about 150°, and a static water contact angle of about 90° to 150° in the recovered state. The porous polymer membrane can be treated with a silane after each cycle to allow for the material to become superhydrophobic in the deformed state for more than one cycle, more than three cycles, or about four cycles.

Methods of the present disclosure provide for detecting an impact. A chromogenic sensor according to the descriptions above can receive an impact, causing a chromogenic change. The chromogenic sensor can include a porous polymer material having an ordered array of voids separated by a polymer framework. When the porous polymer material is in a deformed state the voids are in a collapsed state, and the porous polymer composite material has the characteristic of being substantially transparent. When the sensor receives an impact, the impacted region of the porous polymer material returns to a recovery state (the voids are in an uncollapsed state and the porous polymer composite material changes to an iridescent color). In various aspects, the impact can be static pressure, dynamic shear stress, or ballistic impact such as from a projectile. The chromogenic sensor can be formed from one or more layers of the porous polymer material. Each layer can be about 1 micrometer to 300 micrometers thick. The material can be returned to the deformed state by rinsing with water and drying.

Also described herein are methods of detecting target compounds. The method includes contacting a first region of chromogenic sensor with a target compound. The chromogenic sensor can include a porous polymer material comprising an ordered array of voids separated by a polymer framework as described above. Contact by the target compound causes the first region of the porous polymer composite material to return to a recovery state wherein the voids are in an uncollapsed state and the porous polymer material changes to an iridescent color. In various embodiments, the target compound can include uncured oligomers such as PDMS, a drug, Vitamin E, lidocaine, phathalates, alcohols, acetone, benzene, toluene, xylene, and many other organic molecules.

In accordance with the purpose(s) of the present disclosure, as embodied and broadly described herein, embodiments of the present disclosure, in one aspect, relate to porous polymer materials that can be used in anti-counterfeiting, structures including porous polymer materials, devices including porous polymer materials, methods of using porous polymer materials, methods of making porous polymer materials, and the like. In an aspect, one region (e.g., a first region) of the membrane can reversible change states from iridescent to transparent while another region (e.g., a second region) remains in the iridescent state. In this regard, the second region can include a symbol (e.g., a trademark) or other indicia that cannot be seen or is difficult to see when both the first and second regions are iridescent but upon a state change the second region can be seen. In this way, the structure including the material can be used as an anti-counterfeit measure or in other ways.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

A new class of detector/reflector macroporous material is provided that uses graphene oxide-shape memory polymer composite macroporous membrane. Aspects of the present disclosure are attractive for practical military application especially as a laser-weapon detector and laser beam reflector. Additionally, the shape memory properties would enable the material to remember the laser beam trajectory as well as generate patterns, and also, allowed the material to be reusable.

Described herein is a macroporous membrane, which is black in color, which will change its color when triggered by a laser beam. The detection can be done simply by shining a laser beam on the membrane, and a distinct color change can be observed. Furthermore, the recovered structure that yields a color change can act as a laser deflector. This type of membrane could use as a defensive, protective layer for the military against laser weapons. FIG. 1.1A shows 4 samples recovered by using a green laser on a graphene-SMP membrane consisting of 300 nm macropores. FIG. 1.1B shows a "UF" pattern generated on a graphene-SMP sample with 350 nm macropores using the same green laser.

The graphene oxide is synthesized in an ice bath by adding 1 g of graphite into 46 ml of concentrated sulfuric acid. Then, 2 g of potassium permanganate was slowly added into the solution while stirring. The mixture was allowed to react for 16 hours. Next, 150 ml of water and hydrogen peroxide was added for quenching and as an oxidizing agent to obtain a GO precursor. The GO precursor was dried at 100° C. and bubbled in a $H_2O:H_2O_2:NH_4OH=5:1:1$ solution for 4 hours. The obtained GO was finally washed with DI water and stored for use. GO or graphite can also be purchased from commercial suppliers (such as ACS Material). FIG. 1.2A shows a photograph of a stable GO aqueous dispersion with 2 wt. % GO contained in a glass vial. FIG. 1.2B shows the Tyndall effect exhibited by the same GO aqueous dispersion when a green laser is illuminated through the container.

Self-assembled silica particles colloidal crystal were attached on a glass microslide by convective self-assembly. The particle volume fraction strongly affects the resulting thickness of colloidal crystals and can be tuned from 10 to 50 layers easily. A ~1 mm double-sided tape was used as a spacer that placed between a microslide and the silica colloidal crystal. Then, a viscous oligomer mixture, consisting of shape memory polymer including ethoxylated trimethylolpropane triacrylate (SR415, Sartomer) and polyethylene glycol diacrylate (SR610, Sartomer) or a commercial oligomer mixture (CN945A70, Sartomer) comprising an aliphatic polyester/polyether-based trifunctional urethane acrylate oligomer (75 wt %) blended with tripropylene glycol diacrylate (25 wt %), graphene oxide and photoinitiator (Darocur 1173, 2-hydroxy-2-methyl-1-phenyl-1-propanone, 1.0 wt. %, BASF) was injected into the space inside the sandwich structure. The concentration of graphene oxide in the final oligomer mixture can range from about 0.6 wt. % to 1.2 wt. %. The oligomer mixture was infiltrated into the interstitial areas the of silica microspheres with the help of capillary force. Infiltration was evident as the oligomer mixture and silica particle index matched and the sample cell looks black. Subsequently, the sample went through free radical polymerization by treating with pulsed UV curing system (RC 742, Xenon) for 4 s. Lastly, the polymerized sample was detached from the microslide and soaked in a 1 vol % hydrofluoric acid aqueous solution. The final sample was rinsed with deionized water and ethanol. The final product is in greenish diffractive color when observed at large viewing angles (>45°).

The as-synthesized graphene oxide-shape memory polymer composite macroporous membrane can be deformed by either drying out of water or adding dropwise organic solvent and slowly drying out, depending on the polymer material used. For example, for an ETPTA-PEGDA copolymer, water drying is sufficient in deforming the ordered macropores into disordered arrays; while for harder polyurethane-based SMPs, the drying of acetonitrile can lead to the deformation of the ordered macropores. The original diffractive colors were changed when it is deformed (FIG. 1.3 light blue line) and can be recovered by shining laser beam to a greenish color. (FIG. 1.3 red and green peak).

The sample, which is deformed by slow-dried out of organic solvents, then recovered by laser beam can be reuse for several times. The cycle has been repeated up to more than 10 times and the film showed no sign of degradation. The optical spectra (FIG. 1.4) below showed the experiment that indicates the polymer still has the same sensitivity even after several trails.

The shiny color of the areas is caused by the Bragg diffraction of visible light (see FIG. 1.1B). FIG. 1.5A shows the top-view SEM image of the greenish original area from the macroporous polymer film. FIG. 1.5B is the cross-sectional SEM image of a black deformed area of the macroporous polymer film. The recovered of the macroporous 3-D order is shown by the cross-sectional SEM image in FIG. 1.5C.

Still images taken from a time-lapsed video are presented in FIG. 6. The green-dot increases in intensity and brightness from 0 s to 3.5 s. This analysis shows that the recovery process will take around 3.5 seconds and the recovery can be stepwise. Again, the sample could be dried out of water and the film will show completely black in color again, and ready for another triggering/recovery process. Even if re-wetted, but not exposed to a laser (for instance in wet weather conditions), the film will stay black when not triggered.

Lastly, the graphene oxide-shape memory polymer composite macroporous membrane showed different recovery intensity when triggered by ethanol compare or laser beam. FIG. 7 shows two samples with a different pore size. The blue color peak is a 300 nm macroporous film, and the green color has 350 nm pores. The black line represents the deformed state. The ethanol recovery apparently has a weaker peak than laser beam recovery. This phenomenon is valid for two different sizes of composite macroporous film.

It appears that the incoming laser beam is absorbed by the black graphene in the SMP composites. This laser absorption leads to a heating effect which triggers the shape memory recovery of the deformed SMP macropores into the memorized permanent configuration (i.e., 3D highly ordered structure). This leads to the appearance of the iridescent patterns on the recovered samples.

Example 2

Here we report a new type of reconfigurable anti-counterfeiting coatings enabled by the interdisciplinary integration of scientific principles drawn from two disparate fields—the photonic crystal and shape memory polymer (SMP) technologies. The autonomous infusion of uncured oligomers in a polydimethylsiloxane (PDMS) stamp into a templated macroporous SMP photonic crystal coating, which is confirmed by quantitative X-ray photoelectron spectroscopy analysis, can program an iridescent pattern on the transparent SMP membrane with deformed macropores. By manipulating the unconventional all-room-temperature shape memory effects exhibited by the shape memory copolymer comprising polyethylene glycol diacrylate and ethoxylated trimethylolpropane triacrylate, the iridescent pattern can be easily and instantaneously concealed and revealed by immersing in common household liquids (e.g., ethanol and water). Systematic experiments and theoretical simulations using scanning electron microscope, atomic force microscopy, optical spectroscopy, scalar wave approximation modeling, and contact angle measurements reveal the major mechanism underlying the anti-counterfeiting concealing and revealing processes—the compressive deformation of periodic macropores induced by capillary pressure created by solvent evaporation. Apparent water contact angle measurements show that the infusion of hydrophobic PDMS oligomers into hydrophilic macroporous SMP coatings leads to a large increase in water contact angle from 35° to ~70°, which significantly changes the capillary pressure and the final configuration of the SMP photonic crystals. In addition to rendering a facile anti-counterfeiting mechanism, the novel oligomer-infusion-induced chromogenic effects and modification of surface wettability might lead to important applications in developing new chromogenic sensors for noninvasively monitoring molecular diffusion at solid-solid interfaces and durable superhydrophobic and/or superomniphobic coatings.

2.1 Introduction

Counterfeiting is the second largest source of transnational crime, making up 39% of all international crime income.[1] Not only is counterfeiting a huge economic burden, but it also poses a significant risk to human health and safety. The world health organization estimates that more than 10% of drugs sold in developing countries are counterfeit.[2] Even counterfeit electronics pose a huge risk to safety, especially for the military and space industries, as products in these areas typically have a long duration of use between inspections.[2] Because of these issues, the development of new anti-counterfeiting labels is of paramount importance. Current anti-counterfeiting methods include such strategies as watermarks, holograms, and electronic tracking with radio frequency identification.[4] Nevertheless, novel approaches must be constantly developed and incorporated into new products as to stay at least one step ahead of the counterfeiters. Recently, functional devices with unique optical or fluorescent properties have gathered interest in making security labels with easy visual inspection. Strategies for developing these optics-based anti-counterfeiting tags range from exploiting the photobleaching effect of dyes[5-6] to the hard-to-mimic optical effects of structural colors.[7]

Vivid colors can be the result of either pigments or unique micro-/nano-structures. While pigments are widely used in many applications, such as paints, cosmetics and food, structural color is usually the source of the iridescent colors seen on many insects, such as the striking bluish wings of the morpho butterflies.[8-10] This arises from the intrinsic micro- and/or nano-scale features interacting with visible light. One such artificial structure that exhibits this iridescent color is a photonic crystal, which is a periodic dielectric structure with a forbidden photonic band gap (PBG).[11] Electromagnetic radiation with wavelengths falling within this PBG cannot propagate through the crystal, resulting in effective reflection of the incident light.[12-16] Having the ability to manipulate light, especially in miniature volume, photonic crystals enable many important applications ranging from all-optical integrated circuits[17-18] to ultralow-threshold lasers.[16,19] Additionally, photonic crystals possess many beneficial properties that can be exploited for anti-counterfeiting applications. For instance, photonic crystals exhibit specific iridescent colors that cannot be easily mimicked by cheap dyes or pigments, are highly durable, are unaffected by photobleaching, and do not need external power.[20-21] Previous studies have demonstrated anti-counterfeiting devices using passive photonics crystals by leveraging their unique optical spectra[22-24] and/or incident-angle-dependent colors.[25-32] However, the functionality of these devices is somewhat limited due to their fixed PBGs. By contrast, reconfigurable/tunable photonic crystals allow for tuning the microstructures and PBGs, resulting in increased versatility.[12,31,33-35] Photonic crystals that use water infiltration,[36-38] magnetic fields,[20,39] solvent-induced swelling,[29-31] and mechanical stretching[40-42] to selectively change their PBGs can result in the display of a hidden pattern. A drawback of these devices is that the hidden pattern is only visible when the tunable photonic crystal is being activated by the driving force (e.g., mechanical stretching) and it returns to its original state upon removal of such force.

Shape memory polymers, which can switch between a temporary and permanent configuration, allow for the creation of reconfigurable micro- and nano-scale features that have fixed intermediate structures, even when the driving force is removed.[43-49] This might enable the development of smart anti-counterfeiting coatings that allow for the decoding of a hidden pattern and the viewing of this pattern to occur sequentially, rather than needing to occur concurrently as in previous work.[29-31] This unique sequential approach might also render much larger optical contrast for easy visual readout and broaden potential anti-counterfeiting applications.[50-51] By combining the unique aspects of self-assembled photonic crystals and SMPs, we have recently developed a variety of smart, multi-stimuli-responsive, reconfigurable photonic crystals for various applications ranging from chromogenic chemical sensors to rewritable nanooptical devices.[52-55]

Herein, we report a new anti-counterfeiting mechanism enabled by the interdisciplinary integration of scientific principles drawn from the disparate photonic crystal and SMP technologies. This facile approach can program an iridescent pattern into a reconfigurable SMP photonic crystal using a novel polymer infusion technique, which can effectively increase water contact angle and change the shape memory effects of the SMP photonic crystal. The iridescent pattern can be easily and instantaneously hidden and revealed at room temperature by using common household liquids (e.g., ethanol and water). Furthermore, it utilizes the distinctive ability of SMPs to memorize the temporary structure even after the external stimulus is removed, allowing the user to complete the decoding and viewing phases sequentially rather than simultaneously.

2.2 Experimental Section 2.2.1. Fabrication of Self-Standing Macroporous SMP Photonic Crystal Membranes.

Monodispersed silica microspheres with 300 nm and 350 nm diameters and less than 5% diameter standard deviation synthesized by the standard Stöber method[56] were purchased from Particle Solutions, LLC (Alachua, Fla.). The as-purchased particles were purified by centrifugation in 50 mL centrifuge tubes, removal of the supernatant liquid, replacement with 200-proof ethanol (Decon Labs), and redispersion by sonication. The volume fraction of the purified silica microspheres in colloidal suspension was adjusted to 0.6%. Silica particles were assembled into 3-D highly ordered colloidal crystals on glass substrates using the convective self-assembly method.[57] The typical crystal thickness is ~2.5 μm or ~11 colloidal monolayers. A sandwich cell was constructed by placing the glass substrate with the assembled colloidal crystals on its surfaces between two bare glass slides, separated by a double-sided adhesive tape spacer (~1 mm thick). A 3:1 (volume ratio) oligomer mixture of polyethylene glycol (600) diacrylate (PEGDA, SR610, Sartomer, molecular weight 742, viscosity 90 cps at 25° C., refractive index 1.468) and ethoxylated (20) trimethylolpropane triacrylate (ETPTA, SR415, Sartomer, molecular weight 1,176, viscosity 225 cps at 25° C., refractive index 1.470) combined with 1.0 wt. % photoinitiator, Darocur 1173 (2-hydroxy-2-methyl-1-phenyl-1-propanone, BASF), was injected into the aforementioned sandwich cell. The final sample became transparent due to rapid infiltration of the refractive-index-matching oligomer mixture into the interstitials between the self-assembled silica microspheres. A pulsed UV curing system (RC 742, Xenon) was used to photocure the oligomer mixture for 4 s. The crosslinked polymer membrane was then immersed in a 2.0 vol. % hydrofluoric acid aqueous solution for 10 minutes to selectively remove the templating silica microspheres. The resulting macroporous SMP membrane was rinsed extensively with deionized water to remove residual hydrofluoric acid, and was finally dried using compressed air.

2.2.2. Anti-Counterfeiting Operations Using Templated Macroporous SMP Photonic Crystal Membranes.

The free-standing macroporous SMP photonic crystal membrane was submerged in water and dried using Kimwipes. The membrane immediately lost its iridescent color upon entering water due to refractive index matching, and became nearly transparent after drying. Two-part polydimethylsiloxane precursors (Sylgard 184) were obtained from Dow Corning. PDMS stamps with different patterns (e.g., a UF Gator logo) were created by pouring mixed and degassed PDMS precursors (10:1 ratio of base to curing agent) into a mold and cured at room temperature for 48 hours. The PDMS stamp was peeled from the mold and stored in a refrigerator to preserve the remaining uncured oligomers until being used. Strikingly iridescent patterns were printed onto transparent SMP membranes by placing a PDMS stamp on top of the films, pressing gently to ensure conformal contact, and peeling the stamp off after ~15 s. The printed iridescent patterns were concealed by exposing the macroporous SMP membranes to various liquid solvents (e.g., acetone, hexane, and ethanol) contained in 50 mL centrifuge tubes or their equilibrium vapors. To reveal the hidden patterns, the SMP sample was re-immersed in water for 5 s and then dried using Kimwipes.

2.2.3. Sample Characterization.

A FEI Nova NanoSEM 430 unit was used for SEM imaging. Prior to imaging, a thin layer of gold (~5 nm thick) was sputtered onto the samples. Amplitude-modulation atomic force microscopy (AM-AFM) was performed using a MFP-3D AFM (Asylum Research, Inc.) with a Nanosensor PPP-NCHR probe (tip radius<10 nm). Normal-incidence optical reflection spectra were obtained using an Ocean Optics HR4000 high-resolution vis-NIR spectrometer with a reflection probe (R600-7) and a tungsten halogen light source (LS-1). Absolute reflectivity was obtained as the ratio of the sample spectrum and a reference spectrum, which was the optical density obtained from an aluminum-sputtered silicon wafer. X-ray photoelectron spectroscopy (XPS) was carried out on a ULVAC-PHI VersaProbe II XPS. Prior to XPS analysis, samples were heated at 80° C. for 72 hours and stored in a glove box to minimize degassing. Apparent water contact angle measurements were taken with a KRUSS DSA100 Drop Shape Analyzer. A micropipette tip was lowered to approximately 1 mm above the center of the macroporous SMP surface and de-ionized water was dispensed. The pipette tip was then elevated, and a picture of the water drop was taken. This process was repeated 8 times on different regions for each sample to get the average contact angle and the standard deviation.

2.2.4. Scalar Wave Approximation Optical Modeling.

The scalar wave theory developed for modeling optical properties of periodic dielectric structures' was used in modeling normal-incidence optical reflection spectra from macroporous SMP photonic crystal membranes. In the SWA theory, Maxwell's equations are solved for a periodic dielectric medium by neglecting diffraction from all but one set of crystalline planes. In our case, we only calculated light diffraction from (111) planes of a face-centered cubic (FCC) lattice comprising periodic air cavities in a polymer matrix. All adjustable parameters used in the SWA modeling, including the size of the templated macropores, the thickness of the photonic crystal layer, and the refractive index of the polymer, were either experimentally determined by SEM imaging or provided by the vendor of the SMPs.

2.3. Results and Discussion 2.3.1. Preparation and Anti-Counterfeiting Operations of Macroporous SMP Photonic Crystals.

The well-established colloidal crystal-based templating nanofabrication approach was utilized in preparing self-standing macroporous SMP photonic crystal membranes.[59] The shape memory polymer used in the current work is a homogeneous copolymer of polyethylene glycol (600) diacrylate and ethoxylated (20) trimethylolpropane triacrylate (PEGDA-co-ETPTA) with a volume ratio of 3:1. As shown in our previous work,[52-53] this copolymer possesses low glass transition temperature (~-42° C.) and Young's modulus (~18 MPa). When dried out of water, which has a high surface tension (72.75 mN/m at 20° C.), the large capillary pressure created by water evaporation can suppress the elastic resistance of the soft shape memory copolymer, and compresses the templated periodic macropores (permanent configuration) into a disordered array (temporary configuration) at room temperature. Associated with this microstructural order-disorder transition, the macroporous SMP photonic crystal membranes change diffractive colors from shining iridescence to near transparency (see FIG. 2.1A). The shape memory recovery of the "cold"-programmed, deformed macropores into the permanent, 3-D ordered microstructure can be triggered by gently pressing a PDMS stamp with a specific pattern (e.g., the UF Gator logo in FIG. 2.1B) on the deformed SMP membrane. After peeling the stamp off, a shining greenish Gator logo pattern with high fidelity is left on the transparent SMP sample (FIG. 2.1B). According to Bragg diffraction conditions, the colors of the printed features are determined by the sizes of the templated macropores. For instance, macroporous photonic crystals templated from 300 nm silica microspheres show greenish colors; while samples consisting of 350 nm macropores exhibit orange/red colors. In our previous work,[52] we attribute the above pressure-responsive shape memory recovery to an adhesive pull-off force caused by the attractive van der Waals interactions between the PDMS stamp and the SMP membrane. Our new evidences presented in this work show that a new mechanism—the infusion of uncured PDMS oligomers contained in the stamp into the deformed SMP film—might also play an important role in assisting the recovery of the collapsed macropores back to the "memorized" permanent periodic structure.

This new oligomer infusion concept leads to an innovative anti-counterfeiting mechanism using the templated macroporous SMP photonic crystal membranes. The shining UF Gator logo in FIG. 2.1B can be easily concealed by exposing the membrane to a variety of common organic solvents (e.g., hexane, acetone, ethanol, and toluene) or their vapors, which are able to swell the PEGDA-co-ETPTA copolymer. As shown by FIG. 2.1C, the entire SMP membranes rapidly (in a few seconds) becomes iridescent green after exposing to hexane (either in liquid or vapor phase), completely hiding the PDMS-printed patterns in a background with the same structural color. The concealed features can be readily revealed by immersing the shining SMP membranes in water, followed by drying (e.g. by using Kimwipes® (see FIG. 2.1D). In this revealing process, water first penetrates into the ordered macropores of the film, making it transparent due to refractive index matching. After water evaporation, the PDMS-infused region maintains its iridescent color; while the other areas without infused PDMS change back to the transparent appearance. This large color contrast makes the printed colorful patterns stand out again. Importantly, the revealed patterns are as vivid as the original ones.

Interestingly, we notice small differences between the concealed patterns when different solvents are used in triggering the shape memory recovery of the entire samples. FIG. 2.2A shows a macroporous SMP photonic crystal membrane consisting of 300 nm macropores with a concealed square pattern after exposing the PDMS-printed film to acetone. Although the recovered sample exhibits shining greenish color, the printed square pattern is not perfectly concealed in this background color. The hidden feature is still distinguishable especially when it is viewed at appropriate angles. This is in sharp contrast to the concealed patterns using hexane, which are invisible from nearly all viewing angles. The same imperfect concealing occurs when ethanol and toluene are used in triggering shape memory recovery. FIG. 2.2B illustrates that the partially hidden square pattern can be accurately revealed by drying the membrane out of water. In addition to simple concealing and revealing operations (liquid or vapor exposure and water immersion), another unique aspect of the novel SMP-enabled anti-counterfeiting materials is that they can be reused many times by repeating the concealing/revealing cycles. FIGS. 2.2C and 2.2D show the concealed and revealed square patterns after 15 cycles; while FIGS. 2e and 2f present the same sample after 25 repeated concealing and revealing operations. It is clear that the all-room-temperature shape memory effect exhibited by the macroporous SMP photonic crystal membrane has been well maintained during these cyclic anti-counterfeiting operations. Temperatures well above room temperature may affect the shape memory effects.

2.3.2. Microstructural and Optical Characterization of Macroporous SMP Photonic Crystals during Anti-Counterfeiting Operations.

The microstructural transitions during the above anti-counterfeiting operations are characterized by cross-sectional SEM and AFM. FIG. 2.3A shows a typical SEM image of the transparent SMP membrane presented in FIG. 2.1A. Apparently, the permanent periodic photonic crystal microstructure is completely lost during the "cold" programming process induced by water evaporation from the templated macropores. In sharp contrast, the SEM image in FIG. 2.3B demonstrates that the macropores in the PDMS-printed region, which corresponds to the greenish square pattern in FIG. 2.2A, are recovered back to 3-D highly ordered photonic crystal structure. Similarly, the acetone-vapor-recovered area outside the printed square region also shows periodic microstructure (FIG. 2.3C), which leads to the shining background color used in concealing the printed feature. During repeated concealing/revealing processes, the macropores outside the PDMS-printed region undergo cyclic microstructural transitions between the permanent ordered state and the temporary collapsed configuration; while the macropores in the PDMS-recovered region retain their periodic microstructure throughout these processes. This is confirmed by the SEM image in FIG. 2.3D, which corresponds to the printed square pattern after 10 concealing/revealing cycles.

The surface morphology and roughness of the macroporous SMP photonic crystal membranes during anti-counterfeiting operations are characterized by AFM. As shown in FIG. 2.4A, the "cold"-programmed sample with collapsed macropores possesses a rough surface with an average root-mean-square (RMS) areal roughness ($S_q$) of 33.2±6.6 nm. By contrast, the surface of the PDMS-printed region (FIG. 2.4B) is much smoother and the surface roughness significantly reduces to 2.6±0.2 nm. Similarly, the acetone-vapor-recovered area outside the printed region (FIG. 2.4C) shows a smooth surface ($S_q$~4.1±0.8 nm) with ordered macropores. The AFM image in FIG. 2.4D illustrates that the surface of the PDMS-printed region after 10 repeated concealing/revealing operations maintains the periodic microstructure, and the surface roughness slightly increases to 3.3±0.5 nm. It is worthy to mention that the surface morphology of the PDMS-recovered macropores (FIGS. 2.4B and 2.4D) is significantly different from that of the acetone vapor-recovered ones (FIG. 2.4C). The surface openings of the latter are clearly larger than those of the former. The infusion of PDMS oligomers into the printed regions, which will be extensively discussed in Section 2.3.3, is attributed to this apparent morphological difference.

Complementing standard SEM and AFM imaging, the striking structural colors enabled by the macroporous SMP photonic crystals provide another simple and noninvasive optical methodology for characterizing the shape memory microstructural transitions during the above anti-counterfeiting operations. FIG. 2.5 compares the normal-incidence optical reflection spectra obtained from a macroporous SMP membrane consisting of 300 nm macropores after "cold" programming (black curve), acetone recovery (red curve), PDMS recovery (blue curve), and hexane recovery (green curve). Complying with its nearly transparent appearance (FIG. 2.1A), the "cold"-programmed membrane with collapsed macropores exhibits no diffractive peaks in the reflection spectrum. By contrast, distinctive Bragg diffractive peaks with well-defined Fabry-Perot fringes at shorter and longer wavelengths are clearly present in the spectra of all recovered samples, agreeing well with their shining iridescent colors. The spectra of the membranes recovered by PDMS infusion and hexane nearly overlap and the first-order diffraction peaks are both located around 543 nm. A slight blue shift of the diffraction peak to ~534 nm occurs for the sample recovered by acetone or ethanol. The noninvasive optical characterization technique has also been used in evaluating the reusability/reproducibility of the macroporous SMP photonic crystal membranes during cyclic concealing/revealing operations. FIG. 2.8 compiles the normal-incidence optical reflection spectra obtained from the PDMS-printed square patterns shown in FIGS. 2.2A-2.2F during 25 consecutive anti-counterfeiting cycles. It is clear that the spectra match well with each other, indicating negligible degradation of the optical properties of the PDMS-infused regions after multiple solvent/water exposure.

Optical simulations using a scalar wave approximation (SWA) model[58] are performed to gain better insights into the microstructural transitions during the anti-counterfeiting operations. The dotted blue curve in FIG. 2.5 presents the modeled reflection spectrum of a macroporous photonic crystal membrane with 11 monolayers of fully opened 300 nm macropores. It matches well with the spectra of the samples recovered by PDMS infusion and hexane. When the photonic crystal layer thickness is slightly reduced by 1.75%, which is determined by analyzing multiple (at least 5) cross-sectional SEM images using an ImageJ program (e.g., the average thickness of the films shown in FIGS. 2.3B and 2.3C is 2.459±0.157 μm and 2.416±0.219 μm, respectively), the simulated spectrum (dotted red curve) overlaps with the experimental spectrum of the acetone-recovered sample. The good match between the above experimental and theoretical results indicates that the shape memory recovery of the deformed macropores induced by hexane and PDMS infusion is complete; while the macroporous photonic crystal layer is still slightly deformed when triggered by acetone or ethanol. We believe the small diffractive and thickness mismatches between the PDMS-infused and the acetone or ethanol-recovered regions account for the observed imperfect concealing shown in FIGS. 2.2A-2.2F. By contrast, the printed features can be perfectly concealed by using hexane (see FIG. 2.1C) as the PDMS-recovered spectrum matches well with the hexane-recovered one.

2.3.3. Basic Shape Memory Mechanisms of Macroporous SMP Membranes Involved in Anti-Counterfeiting Operations.

We attribute the all-room-temperature shape memory effects exhibited by the templated macroporous SMP membranes during the anti-counterfeiting operations to two major mechanisms—the autonomous infusion of uncured PDMS oligomers into the printed regions of the SMP films and the capillary pressure-induced deformation of macropores. It is well-known that up to 10 wt. % of uncured PDMS monomers/oligomers are present in thermally cured PDMS blocks prepared using two-part precursors (e.g., Sylgard 184 kit)[60-61] As PDMS is widely used in biomedical and microfluidic devices, the autonomous diffusion/infusion of uncured PDMS oligomers, which usually causes unwanted contamination of the contacting fluids and/or substrates, has been extensively investigated by various techniques, such as mass spectrometry and Fourier transform infrared spectroscopy (FTIR).[62-64] Previous studies have shown that uncured PDMS oligomers can be easily squeezed out of cured PDMS blocks by applying a small pressure during common soft lithography processes.[60] In our anti-counterfeiting operations, when a PDMS mold is gently pressed on a "cold"-programmed SMP membrane, the uncured PDMS oligomers can be readily infused into the top macroporous layers with micrometer-scale thickness. One clear evidence of this infusion process is given by the X-ray photoelectron spectroscopy results shown in FIGS. 2.6A-2.6B. Three samples including an intact macroporous PEGDA-co-ETPTA copolymer control membrane, and the same sample after PDMS infusion, followed by a thorough hexane wash 1 hour and 3 days later, are analyzed by XPS.

The black XPS spectrum in FIG. 2.6A and the corresponding composition analysis in FIG. 2.6B show that only elemental oxygen (13.4 atom %) and carbon (86.6 atom %) with specific binding energy (BE) of 531.2 eV and 283.2 eV corresponding to O 1s and C 1s orbitals are present on the surface of the control sample. The hydrogen atoms in the PEGDA-co-ETPTA copolymer are not shown in the XPS spectrum because hydrogen has ~5000-fold smaller photoionization cross section than C is orbital.[65] By contrast, specific Si 2s and Si 2p peaks with BE of 152.8 eV and 101.6 eV are present in the PDMS-printed samples (see the red and blue curves in FIG. 2.6A).[66] This indicates that the uncured oligomers in the PDMS molds, which are the source of the elemental silicon, are transferred to the macroporous SMP membranes during the printing process. The quantitative elemental analysis in FIG. 2.6B shows that the sample washed by hexane 1 hour after PDMS printing possesses 3.0 atom % surface silicon; while the same sample washed by hexane 3 days after printing has a higher surface silicon content (7.8 atom %). We believe this apparent change is caused by the in-situ polymerization of the infused PDMS oligomers in the SMP membranes. It is well-known that it takes ~24 hours to mostly cure 2-part PDMS precursors under ambient conditions. Therefore, the transferred oligomers only partially cure after 1-hour aging, and the subsequent hexane wash removes the remaining uncured precursors, resulting in the lower surface silicon content. In contrast, the oligomers are fully cured after 3-day aging at room temperature and the cross-linked PDMS cannot be removed in the later hexane wash.

To verify this hypothesis, we evaluate the anti-counterfeiting performance of a macroporous SMP sample stamped with a rectangular PDMS block and then washed by hexane after different aging durations. The photographs in FIG. 2.9A-2.9F show the water-revealed samples after 1, 12, 16, 24, 48, and 72 hours aging at room temperature prior to hexane wash. It is clear that the hexane wash can nearly eliminate the anti-counterfeiting effects when the aging duration is short (<24 hours). The macropores of the PDMS-printed regions are mostly deformed after water evaporation, leading to the translucent or pale bluish appearance in FIG. 2.9A-2.9C and the low peak reflectivity (<15%) shown in FIG. 2.9G. The sample with 24-hour aging prior to hexane wash (FIG. 2.9D) shows large variations in diffractive colors and peak reflectivity from different areas of the membrane. Longer aging durations result in consistent diffractive colors (see FIG. 2.9E-2.9F) and high peak reflectivity (>70%), indicating the cured PDMS is barely removed by hexane. This is further confirmed by the higher surface silicon content of the 3-day-aged sample shown by the aforementioned quantitative XPS analysis. Another evidence that supports the in-situ polymerization of the infused PDMS oligomers is present in FIG. 2.10A-2.10B. The photograph in FIG. 2.10A shows a Gator-printed SMP membrane after 3-day aging, followed by 90-min hexane wash and then dried out of water. No apparent change of the Gator logo is noticed after this long hexane exposure, indicating the infused PDMS oligomers are fully polymerized. When the same sample is soaked in a 2 vol. % hydrofluoric acid aqueous solution for 30 min, followed by 30 min hexane wash and then dried out of water, the Gator logo is completely removed and the entire membrane becomes nearly transparent (FIG. 2.10B). The siloxane bonds (Si—O—Si) that made up the backbone of the cured PDMS are attached/etched by hydrofluoric acid, leaving behind a recycled macroporous SMP membrane that can be reused in the aforementioned anti-counterfeiting operations.

One significant consequence of the infusion of uncured PDMS oligomers into the macroporous SMP membrane, which is crucial for achieving the anti-counterfeiting operations presented in this work, is the large increase in apparent water contact angle of the printed regions. FIGS. 2.7A and 2.7B compare water drop profiles on an intact macroporous PEGDA-co-ETPTA membrane with 300 nm macropores and the same sample immediately after printing a square pattern using a PDMS block. As shown in FIG. 2.7C, the average apparent water contact angle increases from 35.1±0.5° to 69.6±1.3°. The hydrophobicity of PDMS oligomers contributes to this large change in water contact angle. Our extensive contact angle measurements in the following 12 days show that the hydrophobicity of the PDMS-printed sample does not change with time (see FIG. 2.7C), even though the infused oligomers continue to polymerize.

The large increase in water contact angle induced by PDMS infusion greatly affects the "cold" programming process triggered by water evaporation from macropores, and ultimately renders the new anti-counterfeiting properties to the macroporous SMP photonic crystal membranes. According to the Young-Laplace equation,[67] the capillary pressure ($P_c$) created by solvent evaporation is proportional to the liquid/vapor surface tension ($\gamma$) and the contact angle of the solvent on the macropore surface ($\theta$), and is inversely proportional to the radius of the macropores (r) as: $P_c=2\gamma \cos\theta/r$. When a macroporous SMP membrane with a fixed macropore radius is dried out of water ($\gamma\sim72.75$ mN/m at 20° C.), the capillary pressure, which competes with the Young's modulus of the film to determine the final configuration of the macropores (i.e., deformed vs. open), is solely determined by the water contact angle. The capillary pressure exerted on an intact macroporous film ($\theta\sim35°$) is ~2.4-fold higher than that applied on a PDMS-infused pattern ($\theta\sim70°$). Therefore, in the anti-counterfeiting revealing process, the large capillary pressure created by water evaporation can readily deform the intact areas of the SMP membrane; while the significantly reduced $P_c$ is not sufficient to compress the macropores in the infused regions, leading to the revealing of the iridescent pattern from the nearly transparent background. The small discrepancy in concealing the printed features using different solvents (e.g., hexane vs. acetone, see FIGS. 2.1C and 2.2A) can also be explained by this evaporation-induced "cold"-programming mechanism. Hexane has a lower surface tension ($\gamma\sim18.43$ mN/m at 20° C.) than that of acetone ($\gamma\sim25.20$ mN/m at 20° C.); while both solvents can completely wet the PEGDA-co-ETPTA copolymer (i.e., $\theta\sim0°$). The capillary pressure created by acetone evaporation is thus ~37% higher than that induced by hexane. This leads to the slight reduction in the photonic crystal layer thickness and the blue-shift of the diffractive peaks in FIG. 2.5 caused by acetone drying. By contrast, no difference exists between the intact and the PDMS-printed region after hexane evaporation, and therefore the printed patterns can be perfectly concealed (see FIG. 2.1C).

2.4. Conclusions

In conclusion, we have developed a new anti-counterfeiting mechanism by using templated macroporous SMP photonic crystal membranes possessing unconventional all-room-temperature shape memory cycles. The infusion of uncured PDMS oligomers significantly changes the wettability of the macroporous layers, and subsequently affects the shape memory effects of the SMP membranes. The capillary pressure-induced deformation of periodic macropores is found to be the major mechanism underlying the anti-counterfeiting cycle. In addition to simple concealing/revealing operations and straightforward visual readout, these SMP-enabled anti-counterfeiting materials can also be reused and regenerated. Importantly, the striking chromogenic effects exhibited by the macroporous SMP photonic crystals have also rendered a brand new methodology for monitoring molecular diffusion in-situ at solid-solid interfaces (see Example 3). Moreover, the oligomer infusion-induced modification of surface wettability has led to important applications in developing durable superhydrophobic and/or superomniphobic coatings (see Example 5).[68-69]

Example 2 References

1. Schneider, F., The Financial Flows of Transnational Crime and Tax Fraud in Oecd Countries: What Do We (Not) Know? *Public Financ. Rev.* 2013, 41, 677-707.
2. World Health Organization, Pharmaceuticals. *Pharm. Newsl.* 2008, 5, 2-4.
3. Stradley, J.; Karraker, D., The Electronic Part Supply Chain and Risks of Counterfeit Parts in Defense Applications. *IEEE Trans. Components Packag. Technol.* 2006, 29, 703-705.
4. Yoon, B.; Lee, J.; Park, I. S.; Jeon, S.; Lee, J.; Kim, J. M., Recent Functional Material Based Approaches to Prevent and Detect Counterfeiting. *J. Mater. Chem. C* 2013, 1, 2388-2403.
5. Gourevich, I.; Pham, H.; Jonkman, J. E. N.; Kumacheva, E., Multidye Nanostructured Material for Optical Data Storage and Security Labeling. *Chem. Mater.* 2004, 16, 1471-1479.
6. Pham, H. H.; Gourevich, I.; Oh, J. K.; Jonkman, J. E. N.; Kumacheva, E., A Multidye Nanostructured Material for Optical Data Storage and Security Data Encryption. *Adv. Mater.* 2004, 16, 516-520.
7. Zhao, Y.; Xie, Z.; Gu, H.; Zhu, C.; Gu, Z., Bio-Inspired Variable Structural Color Materials. *Chem. Soc. Rev.* 2012, 41, 3297-3317.
8. Potyrailo, R. A.; Ghiradella, H.; Vertiatchikh, A.; Dovidenko, K.; Cournoyer, J. R.; Olson, E., Morpho Butterfly Wing Scales Demonstrate Highly Selective Vapour Response. *Nat. Photonics* 2007, 1, 123-128.
9. Burgess, I. B.; Loncar, M.; Aizenberg, J., Structural Colour in Colourimetric Sensors and Indicators. *J. Mater. Chem. C* 2013, 1, 6075-6086.
10. Fu, Q. Q.; Zhu, B. T.; Ge, J. P., Hierarchically Structured Photonic Crystals for Integrated Chemical Separation and Colorimetric Detection. *Nanoscale* 2017, 9, 2457-2463.
11. Joannopoulos, J. D.; Meade, R. D.; Winn, J. N., *Photonic Crystals: Molding the Flow of Light.* Princeton University Press: Princeton, 1995.
12. Aguirre, C. I.; Reguera, E.; Stein, A., Tunable Colors in Opals and Inverse Opal Photonic Crystals. *Adv. Funct. Mater.* 2010, 20, 2565-2578.
13. Boyle, B. M.; French, T. A.; Pearson, R. M.; McCarthy, B. G.; Miyake, G. M., Structural Color for Additive Manufacturing: 3d-Printed Photonic Crystals from Block Copolymers. *ACS Nano* 2017, 11, 3052-3058.
14. Velev, O. D.; Gupta, S., Materials Fabricated by Micro- and Nanoparticle Assembly—the Challenging Path from Science to Engineering. *Adv. Mater.* 2009, 21, 1897-1905.
15. Cai, Z. Y.; Kwak, D. H.; Punihaole, D.; Hong, Z. M.; Velankar, S. S.; Liu, X. Y.; Asher, S. A., A Photonic Crystal Protein Hydrogel Sensor for *Candida Albicans*. *Angew. Chem. Int. Ed.* 2015, 54, 13036-13040.
16. Kuznetsov, A. I.; Miroshnichenko, A. E.; Brongersma, M. L.; Kivshar, Y. S.; Luk'yanchuk, B., Optically Resonant Dielectric Nanostructures. *Science* 2016, 354, 2472.

17. Vlasov, Y. A.; Bo, X. Z.; Sturm, J. C.; Norris, D. J., On-Chip Natural Assembly of Silicon Photonic Bandgap Crystals. *Nature* 2001, 414, 289-293.
18. Mao, D.; Qiao, X.; Dong, L., Design of Nano-Opto-Mechanical Reconfigurable Photonic Integrated Circuit. *J. Lightwave Technol.* 2013, 31, 1660-1669.
19. Park, H. G.; Kim, S. H.; Kwon, S. H.; Ju, Y. G.; Yang, J. K.; Baek, J. H.; Kim, S. B.; Lee, Y. H., Electrically Driven Single-Cell Photonic Crystal Laser. *Science* 2004, 305, 1444-1447.
20. Hu, H.; Chen, Q.-W.; Tang, J.; Hu, X. Y.; Zhou, X.-H., Photonic Anti-Counterfeiting Using Structural Colors Derived from Magnetic-Responsive Photonic Crystals with Double Photonic Bandgap Heterostructures. *J. Mater. Chem.* 2012, 22, 11048-11053.
21. Cho, Y.; Lee, S. Y.; Ellerthorpe, L.; Feng, G.; Lin, G. J.; Wu, G. X.; Yin, J.; Yang, S., Elastoplastic Inverse Opals as Power-Free Mechanochromic Sensors for Force Recording. *Adv. Funct. Mater.* 2015, 25, 6041-6049.
22. Heo, Y.; Lee, S. Y.; Kim, J. W.; Jeon, T. Y.; Kim, S. H., Controlled Insertion of Planar Defect in Inverse Opals for Anticounterfeiting Applications. *ACS Appl. Mater. Interfaces* 2017, 9, 43098-43104.
23. Hou, J.; Zhang, H.; Su, B.; Li, M.; Yang, Q.; Jiang, L.; Song, Y., Four-Dimensional Screening Anti-Counterfeiting Pattern by Inkjet Printed Photonic Crystals. *Chem.—An Asian J.* 2016, 11, 2680-2685.
24. Yang, D. P.; Qin, Y. H.; Ye, S. Y.; Ge, J. P., Polymerization-Induced Colloidal Assembly and Photonic Crystal Multilayer for Coding and Decoding. *Adv. Funct. Mater.* 2014, 24, 817-825.
25. Lee, H. S.; Shim, T. S.; Hwang, H.; Yang, S. M.; Kim, S. H., Colloidal Photonic Crystals toward Structural Color Palettes for Security Materials. *Chem. Mater.* 2013, 25, 2684-2690.
26. Shang, S. L.; Zhang, Q. H.; Wang, H. Z.; Li, Y. G., Fabrication of Magnetic Field Induced Structural Colored Films with Tunable Colors and Its Application on Security Materials. *J Colloid Interface Sci.* 2017, 485, 18-24.
27. Peng, C. Y.; Hsu, C. W.; Li, C. W.; Wang, P. L.; Jeng, C. C.; Chang, C. C.; Wang, G. J., Flexible Photonic Crystal Material for Multiple Anticounterfeiting Applications. *ACS Appl. Mater. Interfaces* 2018, 10, 9858-9864.
28. Keller, K.; Yakovlev, A. V.; Grachova, E. V.; Vinogradov, A. V., Inkjet Printing of Multicolor Daylight Visible Opal Holography. *Adv. Funct. Mater.* 2018, 28, 1706903.
29. Wu, S. L.; Liu, B. Q.; Su, X.; Zhang, S. F., Structural Color Patterns on Paper Fabricated by Inkjet Printer and Their Application in Anticounterfeiting. *J Phys. Chem. Lett.* 2017, 8, 2835-2841.
30. Meng, Y.; Liu, F. F.; Umair, M. M.; Ju, B. Z.; Zhang, S. F.; Tang, B. T., Patterned and Iridescent Plastics with 3d Inverse Opal Structure for Anticounterfeiting of the Banknotes. *Adv. Opt. Mater.* 2018, 6, 1701351.
31. Lee, E.; Yang, S., Bio-Inspired Responsive Polymer Pillar Arrays. *MRS Commun.* 2015, 5, 97-114.
32. Meng, Z. P.; Wu, S. L.; Tang, B. T.; Ma, W.; Zhang, S. F., Structurally Colored Polymer Films with Narrow Stop Band, High Angle-Dependence and Good Mechanical Robustness for Trademark Anti-Counterfeiting. *Nanoscale* 2018, 10, 14755-14762.
33. Wang, M. S.; Yin, Y. D., Magnetically Responsive Nanostructures with Tunable Optical Properties. *J. Am. Chem. Soc.* 2016, 138, 6315-6323.
34. Han, M. G.; Shin, C. G.; Jeon, S.-J.; Shim, H.; Heo, C.-J.; Jin, H.; Kim, J. W.; Lee, S., Full Color Tunable Photonic Crystal from Crystalline Colloidal Arrays with an Engineered Photonic Stop-Band. *Adv. Mater.* 2012, 24, 6438-6444.
35. Ge, J. P.; Yin, Y. D., Responsive Photonic Crystals. *Angew. Chem. Int. Ed.* 2011, 50, 1492-1522.
36. Heo, Y.; Kang, H.; Lee, J. S.; Oh, Y. K.; Kim, S. H., Lithographically Encrypted Inverse Opals for Anti-Counterfeiting Applications. *Small* 2016, 12, 3819-3826.
37. Zhong, K.; Li, J. Q.; Liu, L. W.; Van Cleuvenbergen, S.; Song, K.; Clays, K., Instantaneous, Simple, and Reversible Revealing of Invisible Patterns Encrypted in Robust Hollow Sphere Colloidal Photonic Crystals. *Adv. Mater.* 2018, 30, 1707246.
38. Burgess, I. B.; Mishchenko, L.; Hatton, B. D.; Kolle, M.; Loncar, M.; Aizenberg, J., Encoding Complex Wettability Patterns in Chemically Functionalized 3d Photonic Crystals. *J. Am. Chem. Soc.* 2011, 133, 12430-12432.
39. Hu, H. B.; Zhong, H.; Chen, C. L.; Chen, Q. W., Magnetically Responsive Photonic Watermarks on Banknotes. *J. Mater. Chem. C* 2014, 2, 3695-3702.
40. Ding, T.; Cao, G. S.; Schaefer, C. G.; Zhao, Q. B.; Gallei, M.; Smoukov, S. K.; Baumberg, J. J., Revealing Invisible Photonic Inscriptions: Images from Strain. *ACS Appl. Mater. Interfaces* 2015, 7, 13497-13502.
41. Ye, S. Y.; Fu, Q. Q.; Ge, J. P., Invisible Photonic Prints Shown by Deformation. *Adv. Funct. Mater.* 2014, 24, 6430-6438.
42. Nam, H.; Song, K.; Ha, D.; Kim, T., Inkjet Printing Based Mono-Layered Photonic Crystal Patterning for Anti-Counterfeiting Structural Colors. *Sci. Rep.* 2016, 6, 30885.
43. Lendlein, A.; Kelch, S., Shape-Memory Polymers. *Angew. Chem. Int. Ed.* 2002, 41, 2034-2057.
44. Zhao, Q.; Zou, W. K.; Luo, Y. W.; Xie, T., Shape Memory Polymer Network with Thermally Distinct Elasticity and Plasticity. *Sci. Adv.* 2016, 2, e1501297.
45. Zhao, Q.; Qi, H. J.; Xie, T., Recent Progress in Shape Memory Polymer: New Behavior, Enabling Materials, and Mechanistic Understanding. *Prog. Polym. Sci.* 2015, 49-50, 79-120.
46. Zhang, G. G.; Zhao, Q.; Zou, W. K.; Luo, Y. W.; Xie, T., Unusual Aspects of Supramolecular Networks: Plasticity to Elasticity, Ultrasoft Shape Memory, and Dynamic Mechanical Properties. *Adv. Funct. Mater.* 2016, 26, 931-937.
47. Mather, P. T.; Luo, X.; Rousseau, I. A., Shape Memory Polymer Research. *Annu. Rev. Mater. Res.* 2009, 39, 445-471.
48. Schauer, S.; Meier, T.; Reinhard, M.; Rohrig, M.; Schneider, M.; Heilig, M.; Kolew, A.; Worgull, M.; Holscher, H., Tunable Diffractive Optical Elements Based on Shape-Memory Polymers Fabricated Via Hot Embossing. *ACS Appl. Mater. Interfaces* 2016, 8, 9423-9430.
49. Li, P.; Han, Y.; Wang, W. X.; Liu, Y. J.; Jin, P.; Leng, J. S., Novel Programmable Shape Memory Polystyrene Film: A Thermally Induced Beam-Power Splitter. *Sci. Rep.* 2017, 7, 44333.
50. Moirangthem, M.; Engels, T. A. P.; Murphy, J.; Bastiaansen, C. W. M.; Schenning, A., Photonic Shape Memory Polymer with Stable Multiple Colors. *ACS Appl. Mater. Interface* 2017, 9, 32161-32167.
51. Moirangthem, M.; Arts, R.; Merkx, M.; Schenning, A., An Optical Sensor Based on a Photonic Polymer Film to Detect Calcium in Serum. *Adv. Funct. Mater.* 2016, 26, 1154-1160.

52. Fang, Y.; Ni, Y. L.; Leo, S. Y.; Taylor, C.; Basile, V.; Jiang, P., Reconfigurable Photonic Crystals Enabled by Pressure-Responsive Shape-Memory Polymers. *Nat. Commun.* 2015, 6, 7416.
53. Fang, Y.; Ni, Y. L.; Choi, B.; Leo, S. Y.; Gao, J.; Ge, B.; Taylor, C.; Basile, V.; Jiang, P., Chromogenic Photonic Crystals Enabled by Novel Vapor-Responsive Shape Memory Polymers. *Adv. Mater.* 2015, 27, 3696-3704.
54. Fang, Y.; Leo, S. Y.; Ni, Y. L.; Wang, J. Y.; Wang, B. C.; Yu, L.; Dong, Z.; Dai, Y. Q.; Basile, V.; Taylor, C.; Jiang, P., Reconfigurable Photonic Crystals Enabled by Multi-stimuli-Responsive Shape Memory Polymers Possessing Room Temperature Shape Processability. *ACS Appl. Mater. Interfaces* 2017, 9, 5457-5467.
55. Leo, S. Y.; Zhang, W.; Zhang, Y. F.; Ni, Y. L.; Jiang, H.; Jones, C.; Jiang, P.; Basile, V.; Taylor, C., Chromogenic Photonic Crystal Sensors Enabled by Multistimuli-Responsive Shape Memory Polymers. *Small* 2018, 14, 1703515.
56. Stober, W.; Fink, A.; Bohn, E., Controlled Growth of Monodisperse Silica Spheres in Micron Size Range. *J. Colloid Interface Sci.* 1968, 26, 62-69.
57. Jiang, P.; Bertone, J. F.; Hwang, K. S.; Colvin, V. L., Single-Crystal Colloidal Multilayers of Controlled Thickness. *Chem. Mater.* 1999, 11, 2132-2140.
58. Mittleman, D. M.; Bertone, J. F.; Jiang, P.; Hwang, K. S.; Colvin, V. L., Optical Properties of Planar Colloidal Crystals: Dynamical Diffraction and the Scalar Wave Approximation. *J. Chem. Phys.* 1999, 111, 345-354.
59. Velev, O. D.; Jede, T. A.; Lobo, R. F.; Lenhoff, A. M., Porous Silica Via Colloidal Crystallization. *Nature* 1997, 389, 447-448.
60. Yunus, S.; de Looringhe, C. D.; Poleunis, C.; Delcorte, A., Diffusion of Oligomers from Polydimethylsiloxane Stamps in Microcontact Printing: Surface Analysis and Possible Application. *Surf Interface Anal.* 2007, 39, 922-925.
61. McDonald, J. C.; Whitesides, G. M., Poly(Dimethylsiloxane) as a Material for Fabricating Microfluidic Devices. *Acc. Chem. Res.* 2002, 35, 491-499.
62. Dangla, R.; Gallaire, F.; Baroud, C. N., Microchannel Deformations Due to Solvent-Induced Pdms Swelling. *Lab Chip* 2010, 10, 2972-2978.
63. Lee, J. N.; Park, C.; Whitesides, G. M., Solvent Compatibility of Poly(Dimethylsiloxane)-Based Microfluidic Devices. *Anal. Chem.* 2003, 75, 6544-6554.
64. Mata, A.; Fleischman, A. J.; Roy, S., Characterization of Polydimethylsiloxane (Pdms) Properties for Biomedical Micro/Nanosystems. *Biomed. Microdevices* 2005, 7, 281-293.
65. Stojilovic, N., Why Can't We See Hydrogen in X-Ray Photoelectron Spectroscopy? *J. Chem. Edu.* 2012, 89, 1331-1332.
66. Louette, P.; Bodino, F.; Pireaux, J. J., Poly(Dimethyl Siloxane) (Pdms) Xps Reference Core Level and Energy Loss Spectra *Surf Sci. Spectra* 2006, 12, 38-43.
67. Gregg, S. J.; Sing, K. S. W., *Adsorption, Surface Area and Porosity*. 2nd ed.; Academic Press Inc.: London, 1982.
68. Li, H. L.; Wang, J. X.; Yang, L. M.; Song, Y. L., Superoleophilic and Superhydrophobic Inverse Opals for Oil Sensors. *Adv. Funct. Mater.* 2008, 18, 3258-3264.
69. Lu, T.; Cheng, Z.; Zhang, D.; Zhang, E.; Zhao, Q.; Liu, Y.; Jiang, L., Superhydrophobic Surface with Shape Memory Micro/Nanostructure and Its Application in Rewritable Chip for Droplet Storage. *ACS Nano* 2016, 10, 9379-9386.

Example 3

Described in the present example is a truly all-solid-state small molecule sensor using the macroporous photonic crystal shape memory polymer (both the sensor and the detection "target" are solid, FIG. 3.1F). It's been a vexing problem in sensing methodology to detect small molecules at the solid-solid interface. This unique recognition of small molecules by the sensor could be useful for detection in many settings, including but not limited to: trace amounts of small unreacted monomer/oligomer in polymers, trace amounts of organic solvent molecules in polymers, drug release from contact lenses, transdermal patches, and drug loading uniformity in patches.

The colloidal crystal of silica particles can be formed by synthesis of silica particles. Monodispersed silica microspheres, with diameter of about 100 to 10,000 nm, were synthesized by the standard Stober method or other appropriate method. Silica particle were self-assembled on a substrate such as a glass microslide, which is placed in a clean scintillation vial including about 15 ml of ethanol with 1% of silica particles, by the convective self-assembly technology to form colloidal crystals. A convective self-assembly method can enable the formation of ordered colloidal silica crystals on the substrate. Silica particles with a diameter of about 100 to 10,000 nm, which can be dispersed in an alcohol such as ethanol, can be assembled on the glass slides. The substrate can be varied in size depending on the desired applications.

After the silica layer or multilayer is applied, a polymer casting apparatus can be assembled. To assemble a polymer casting apparatus, two or more substrates can be positioned in a container configured to hold a solvent in a sandwich-type configuration so that at least a surface of a first substrate coated with silica opposes a surface of a second substrate, which can be uncoated or coated with silica. Other configurations can be realized with more than two coated substrates. The coated substrates of the polymer casting apparatus are silica-coated glass. After assembly of the polymer casting apparatus, monomers or a monomer composition with photoinitiator (e.g. Darocur 1173, 2-hydroxy-2-methyl-1-phenyl-1-propanone, BASF) can be put in a space between two or more opposing silica coated surfaces of the two or more silica coated substrates. Monomers or a monomer composition that can form a polymer, a desired polymer, or a pre-determined polymer are described in more detail below (and in Example 2, above.

After monomers are placed in the space, they can be polymerized by a polymerization method to form a tunable polymer membrane. The polymerization method can be photopolymerization, wherein the monomers are polymerized by the application of light. The light can be UV light and can be applied for a period of time [[(e.g. from about 4 seconds to about 120 mins)]]. The final photonic crystal sample shows a shining greenish color when observed at large viewing angles (>45°). The silica layers can be removed from the membrane and the membrane optionally washed. The silica layers are removed by a solvent, such as by 2% hydrofluoric acid (HF) aqueous solution and rinsed with water and ethanol multiple times. The tunable polymer membrane can be configured to be modified such that the color of the reflected light can vary in response to the size of the templated voids. For instance, a macroporous membrane consisting of 350 nm macropores shows a shining orange color; while a sample with 300 nm macropores exhibits an iridescent green color.

PDMS (Polydimethylsiloxane) is polymerized using a traditional thermo-initiator (curing agent). The volumetric ratio of monomer to curing agent could vary from 1% to 15%. After mixing the monomer and curing agent, the mixture is stirred for 5 minutes to ensure good mixing between the two compounds. Next, the mixture is exposed to vacuum to degas the PDMS for 2 hours. The vacuum causes the PDMS to expand and pop out of the mixture. Finally, the mixture is placed in an oven to cure.

FIG. 3.1A shows the as-synthesized macroporous membrane as a sensor, which is a greenish-iridescent color. The macroporous membrane can be deformed by drying out of water (FIG. 3.1B). After drying out of water, the polymer film shows transparent in color and ready for detection. FIGS. 3.1C and 3.1D are an exemplary system to detect unreacted PDMS monomer in the PDMS-solid medium. A two-PDMS sample was attached to a deformed macroporous sensor, where one PDMS sample is clean PDMS (reflux in hexane for 48 hrs) and the other is a just polymerized sample. The sample on the left in FIG. 3.1C is the clean-PDMS, whereas the sample on the right is the PDMS that is just polymerized. The picture was taken after 30 s of putting the PDMS blocks on the samples. FIG. 3.1D shows the macroporous sensor removed from PDMS samples after 300 s. In addition, the PDMS recovery is a dynamic process, where the macroporous sensor slowly recovers from transparent to fully green color, rather than an instantaneous jump directly to shiny green.

The sensing experiments on the free-standing macroporous polymer film were performed where two kinds of PDMS were attached to the macroporous sensor. The transparent macroporous sensor turned into greenish color (FIG. 3.2, red spectrum) after contact with regular PDMS for 15 s. On the other hand, there are no diffractive colors for the macroporous sensor in contact with pre-cleaned PDMS (FIG. 3.2, light blue spectrum).

Again, the as-synthesized macroporous polymer is deformed by simultaneously being dried of water and contacted with PDMS. We use the dynamic spectra to measure the response of the macroporous sensor to PDMS every 0.5 s. When in contact with cleaned PDMS, the macroporous polymer (FIG. 3.3C) shows no change in peak in the dynamic spectra, even after a long time. This suggests that the macroporous polymer could not respond to clean PDMS that does not contain small molecules (in this case, unreacted PDMS monomer). Then, we use a PDMS that has a 5% unreacted PDMS oligomer. Its dynamic optical spectra in FIG. 3.3B shows that after 300 s the macroporous polymer shows 30% reflectance. In a sample that contains 15% unreacted oligomer, the dynamic spectra shows up to 80% reflectance, which suggests that the macropore is fully recovered.

The dynamic relation between unreacted oligomer to response time is shown in FIG. 3.4. The plots show that increasing unreacted oligomer will result in faster response time. We propose that this is because of a higher concentration gradient; more oligomer will diffuse into the macroporous sensor per area per time.

The green-iridescent color of the original film is caused by the Bragg diffraction of visible light from the deformed macroporous film (see FIG. 3.1A). FIG. 3.5A shows the cross sectional-view SEM image of the greenish film from the macroporous polymer film. FIG. 3.5B is the cross-sectional SEM image of a transparent deformed area of the macroporous polymer film (both FIGS. 3.1B and 3.1C left).

The recovery of the macroporous 3-D order is shown by the cross-sectional SEM image in FIG. 3.5C after being in contact with regular PDMS.

Besides detecting trace amount of small molecules, the macroporous sensors described herein could "memorize" the area that is contacted by the sample. FIGS. 3.6A and 3.6B show a macroporous sensor in contact with two specific patterns. One is triggered by lidocaine in a commercially available pain relieving patch (Salonpas®) (FIG. 3.6A), and the other one is a templated "Gator" pattern (FIG. 3.6B) triggered by unreacted polymer (e.g. uncured PDMS oligomers in the Gator block. This technology could function as a contamination and pattern recognition sensor. Moreover, the established technology could be potentially useful for generating macroporous micro/nanochannels (FIG. 3.7). FIG. 3.7A shows the surface topology of recovery using patterned PDMS. The results clearly indicate the greenish lines have higher surface topology than the transparent area and a small channel is formed in between the patterned and transparent areas.

We further investigated the energy dispersive spectroscopic (EDS) mapping/imaging of the macroporous sensor (FIG. 3.8). Elemental mapping confirmed that there was approximately 8% of Si after PDMS recovery, indicating that the surface of the printed sample contains 8% silicon atoms. This result further supports the claimed that PDMS oligomers were instrumental in regard to macroporous sensor color change by diffusing from PDMS into the macroporous polymer and swelling the polymer from deformed state to original state.

The development of a reusable sensor with high tunability is crucial for real world applications. We performed cyclical PDMS recovery and hexane washing on our macroporous sensor. The macroporous sensor shows no sign of degradation after the 10th repeating cycle (FIG. 3.9). Its performance in reflectivity shows negligible difference between the first and the tenth cycle.

A proof of concept of a possible target analyte in solid-solid system was performed. In addition to a PDMS oligomer (FIG. 3.10A), the sensor could be triggered by vitamin E (FIG. 3.10B). Vitamin E was diffused into a PDMS block, and then the Vitamin E-loaded PDMS block was placed on the sensors. The diffusion of small organic molecules that can trigger the shape memory recovery of the deformed SMP macropores can lead to the observed chromogenic effects. For example, vitamin E and PDMS oligomers can diffuse into the deformed SMP membrane and increase the mobility of the stressed macromolecular chains. The relaxation of the polymer chains back to the memorized configurations induces the recovery of the original 3D ordered photonic crystal structure and the iridescent color. If an oligomer is in stable state under ambient conditions, the macroporous sensor could likely easily detect it. This technology will be of significant interest for transdermal drug delivery and detecting loading efficiency, as well as uniformity of drug loading in transdermal patches.

Example 4

Nondestructive Evaluation (NDE) sensors including ballistic impact sensors are critical components in enhancing nondestructive evaluation and structural health monitoring of various constructions, such as buildings, bridges, and space shuttles. Traditional impact sensors are based on microelectronics and they typically suffer from high cost, requiring special accommodations (e.g., external electrical power), high energy consumption, and heavy weight and/or large footprint. This disclosure reports a new type of smart impact sensor that exhibits easily perceived color changes when impacted by an external object. This chromogenic sensor technology differs greatly from currently available ones as it enables unprecedented impact sensors that are ultra-lightweight, consuming no power, inexpensive, easily applicable to covering large areas, reusable, and durable. It integrates scientific principles drawn from two disparate fields—shape memory polymer (SMP) and photonic crystal. Although traditional thermoresponsive SMPs have been extensively exploited for various sensor and actuator applications, impact-responsive SMPs are rarely studied.

The chromogenic impact sensors described herein are enabled by a new series of SMPs recently discovered that exhibit unconventional all-room-temperature shape memory efforts and are instantaneously responsive to a large variety of external stimuli, such as various mechanical stresses (e.g., static pressure, lateral shear stress, and ballistic impact), a large variety of chemicals in vapor, liquid, and solid states, and light illumination. The SMP-based impact sensors can show distinctive color changes (from transparent to shining iridescent) in localized regions where external mechanical stresses (e.g., under ballistic impact) are above critical threshold values. In addition, different structural colors result when stresses with different amplitudes are applied. Thus, these sensors can provide reliable assessments of the location and extent of external impact. Moreover, the easy readout of the color changes can greatly reduce the complexity of operations for maintenance staff who need to make important assessments quickly.

Shape memory polymers are a class of "smart" materials that can transform between a memorized permanent shape and one or multiple structurally fixed temporary configurations in response to an external stimulus, such as heat, light, electrical or magnetic field, and solvent. They have been widely explored in smart biomedical devices (e.g., surgical sutures and stents), reconfigurable aerospace morphing structures, sensors and actuators, tunable nanooptics, and smart textiles, among many others. Unfortunately, traditional SMPs suffer from several major drawbacks that greatly limit their promising applications. First, most of the state-of-the-art SMPs are thermoresponsive, and the heat-demanding shape memory (SM) programming and recovery operations used in reversibly transforming SMPs between their permanent and temporary configurations (see FIGS. 4.1A-4.1C) can significantly limit and complicate the design and broad applicability of SMP-based devices. Second, traditional SMP applications (e.g., actuators) usually leverage macroscopic SM effects exhibited by bulky samples, which limit the ultimate SM response speed as large numbers of macromolecules need to be activated during the SM operations. Third, although temperature and pressure are the two most important process variables, mechano-responsive SMPs, whose SM recovery can be stimulated by various mechanical stresses (e.g., static pressure, dynamic shear stress, and ballistic impact) are far less exploited than their thermoresponsive counterparts.

By creatively combining the concepts of SMPs with photonic crystals, which are periodic dielectric structures with forbidden photonic band gaps (PBGs) for light, a new series of multi-stimuli-responsive SMPs have recently been discovered that are highly promising for developing revolutionary chromogenic NDE sensors including impact sensors. These novel SMPs exhibit nanoscopic, all-room-temperature SM effects activated by an unusual "cold" programming mechanism and multiple unconventional stimuli (e.g., static pressure, shear stress, and ballistic impact). The major differences in SM effects between traditional and the new SMPs are schematically illustrated in FIGS. 4.1A-4.1F. First, the active components of the new SMPs are thin macroporous photonic crystal layers (only a few μm thick, FIG. 4.1D) which are fabricated by using self-assembled, 3-D highly ordered colloidal crystals as structural templates. This microscopic thin-film configuration with high internal porosity (~74%) renders significant dry mass reduction impacts and orders of magnitude faster response speed than bulky SMP samples. Second, the instantaneous transition between the temporary disordered macroporous array (translucent appearance) and the permanent 3-D ordered photonic crystal structure (shining iridescence) leads to an easily perceived color change.

The colloidal crystal of silica particles can be formed by first synthesizing of silica nanoparticles with diameter of about 100 to 1,000 nm by the well-established Stober method. Silica nanoparticles are then self-assembled on a substrate such as a glass microslide, which is placed in a clean scintillation vial containing about 15 ml of ethanol with 1 vol. % of silica nanoparticles, by the convective self-assembly technology to form multilayer silica colloidal crystals. The convective self-assembly method can enable the formation of ordered colloidal crystals with a typical crystal thickness of about 3 μm on the substrate.

After the silica colloidal crystal is grown, a polymer casting apparatus can be assembled. In one embodiment of a polymer casting apparatus, two or more coated substrates can be positioned in a container configured to hold a solvent in a sandwich-type configuration so that at least a surface of a first substrate coated with silica opposes a surface of a second substrate, uncoated or coated with silica. Other configurations can be realized with more than two coated substrates. The coated substrates of the polymer casting apparatus are silica colloidal crystal-coated glass. After assembly of the polymer casting apparatus, mixtures of various monomers with photoinitiator (e.g. Darocur 1173, 2-hydroxy-2-methyl-1-phenyl-1-propanone, BASF) can be put in the space between two or more opposing silica coated surfaces of the two or more silica coated substrates. "Monomers" includes monomers or a monomer composition that can form a polymer, a desired polymer, or a pre-determined polymer can be polyacrylates, polyurethanes, epoxy, and polystyrene.

After monomers are placed in the space, they can be polymerized by a polymerization method to form a tunable polymer membrane. The polymerization method can be photopolymerization, wherein the monomers are polymerized by the application of light. The light can be UV light and can be applied for a period of time. The templating silica colloidal crystals can be removed from the membrane and the membrane optionally washed. The silica is removed by 2% hydrofluoric acid (HF) aqueous solution and rinsed with water and ethanol for multiple times. The tunable polymer membrane can be configured to be modified such that the colors of the sensors can vary in response to different extents of ballistic impacts. For example, the size of the templating silica particles can be changed to change the final colors of the macroporous membranes. 350 nm silica particles will lead to orange-colored membranes; while 300 nm particles result in green-colored samples. In addition, we can tune the macroporous layer thickness to change the reflection amplitude of the final sensors. A thicker film (e.g., 30 colloidal layers) will lead to a much iridescent sample than a film made of 10 colloidal layers.

The newly discovered mechano-responsive SMPs are copolymers of a variety of commercial monomers (e.g., acrylates and urethanes) with different properties, such as molecular weight, glass transition temperature (Tg), and functionality. Their mechanical and thermomechanical properties, such as Young's modulus (ranging from ~10 MPa to over 3.5 GPa) and Tg (from ° C. to ~>100° C.), can be tuned by changing the formula of the SMP copolymers (e.g. changing the ratio of the SMP monomers (ETPTA:PEGDA) from 1:1 to 6:1 to change the modulus of the final SMPs from ~10 MPa to over 30 MPa). Interestingly, an autonomous "cold" programming process occurs when the templated macroporous SMP photonic crystal membrane is dried out of a good solvent (e.g., water for hydrophilic polyacrylate SMPs or acetone for hydrophobic polyurethane SMPs). The permanent 3-D ordered macropores deform into disordered arrays (temporary shape), resulting in a translucent appearance of the dried membrane. The SM recovery of the permanent shape (3-D ordered macropores) and the corresponding iridescent color can be instantaneously triggered when a ballistic impact is applied (e.g., through a falling stainless steel ball on the film surface). The shining color of the sample is caused by Bragg diffraction of visible light from the recovered 3-D periodic macroporous arrays. This easily perceived chromogenic effect provides a new transduction mechanism in developing novel chromogenic impact sensors for precisely and reliably monitoring the extent and location of the applied ballistic impact.

Experiments have been conducted to demonstrate the capability in sensing ballistic impacts using the chromogenic SMP sensors. In the experimental setup, a stainless steel ball with a diameter of 19.0 mm was vertically dropped from different heights (from 5 to 80 cm) above a transparent SMP membrane with deformed macropores. The SMP sample was mounted on a steel plate using an adhesive tape. The photographs in FIGS. 4.2A-4.2E show that the ballistic impact of the stainless steel ball with the SMP membrane can indeed induce easily distinguishable changes of the recovered patterns. Usually the recovered area includes three regions, the central unrecovered region, the recovered iridescent ring, and the outer unrecovered contact region. The area of each region is determined by the impact velocity of the stainless ball which is proportional to its drop-off height. Other polymers and/or varying numbers of layers with higher moduli can be used for sensing higher impact forces (such as helmets, flak jackets, aircraft bodies, crash testing, and the like).

The optical reflection spectra in FIG. 4.3 show a stepwise recovery of the permanent photonic crystal microstructure and the corresponding structural color caused by different ball drop-off heights (i.e., different impact speeds). The peak positions of the photonic band gaps gradually red-shift with increasing drop-off height, indicating the gradual recovery of the deformed macropores. The spectrum of the sample with 80 cm drop-off height (3.96 m/s impact speed) nearly matches with that of the fully recovered sample.

The gradual recovery of the impacted regions is confirmed by the surface profiler results shown in FIG. 4.4 and the atomic force microscope (AFM) images in FIGS. 4.5A-4.5C. The higher impact speed (3.96 m/s) of the stainless steel ball apparently leads to a larger recovered height and a smoother surface than those of the lower impact speed (2.21 m/s and 0.99 m/s).

The contact radii of the impact craters left on the recovered SMP membranes have been using two traditional impact models—the Hertz model and the JKR model. In the Hertz model, the surface energy of the system is not taken into consideration. The input kinetic energy converts to strain energy stored in SMPs and dissipation energy. By contrast, the JKR model considers the surface energy which can be characterized by nanoindentation tests (see FIG. 4.6). FIG. 4.7 shows that the experimental radii are typically larger than those predicted by the JKR and the Hertz impact models.

Example 5

A material with switchable wettability and structural color capable of transitioning between superhydrophobic and hydrophobic interactions with water is described. This material displays iridescent structural color in the superhydrophobic state, however becomes transparent in the hydrophobic state. The switchable wettability coatings are enabled by thermoresponsive shape memory polymer macroporous membranes. This material has potential applications for rewritable liquid patterns, liquid-liquid separations, guided liquid flow, or as a controlled-release device.

This technology exhibits the two criteria required to achieve superhydrophobicity: low solid surface energy and high surface roughness. The wettability of this surface can be increased from superhydrophobic to hydrophobic by heating the macroporous membrane above its glass transition temperature and applying a vertical force. This force collapses the macropores and the nanostructure, reducing the roughness. This results in the disappearance of visible structural color and an increase in wettability. The nanoscale roughness can be recovered by heating the macroporous membrane above its glass transition temperature once again.

Self-assembled silica particle colloidal crystals were attached onto a glass microslide by the convective self-assembly process. Colloidal crystals with various thicknesses from 10 to 50 layers can easily be achieved by varying the volume faction of the silica colloidal suspension. A ~1 mm thick piece of double-sided tape was used as a spacer, placed between a microslide and the silica colloidal crystal. Then, a viscous urethane oligomer blend (CN963E80, Aliphatic polyester based urethane diacrylate oligomer blended with 20% ethoxylated trimethylol propane triacrylate, Arkema) was mixed with photoinitiator (Darocur 1173, 2-hydroxy-2-methyl-1-phenyl-1-propanone, BASF) and injected into the space inside the sandwich structure. The oligomer mixture infiltrated into the interstitial of silica microspheres with the help of capillary force. This was evident as the oligomer mixture and silica particle index matched and the sample cell appeared transparent. Subsequently, the sample underwent free radical polymerization in a UV lamp curing cycle (Benchtop 3UV Transilluminator) for 4 hours. The polymerized sample was detached from the microslide and soaked in 2 vol % hydrofluoric acid for 5 days. Any remaining hydrofluoric acid was removed by extensive rinsing with deionized water. Oxygen plasma reactive-ion etching (20 mTorr, He 10 sccm, Ar 5 sccm, $O_2$ 15 sccm, 50 W) was performed to increase the surface roughness and decrease the solid fraction of the surface. The polymer membrane was place in a 110° C. oven with ~1 mL of heptadecafluoro-1,1,2,2-tetrahydrodecyl trichlorosilane (Gelest, Inc.) for 1 hour, bestowing low surface energy on the polymer membrane surface. The membrane displayed greenish structural color.

The as-synthesized shape memory polymer macroporous membrane displayed superhydrophobicity, shown by a static water contact angle greater than 150° (FIG. 5.1A). The membrane was deformed in a heat press at a temperature of 95° C. and force of 200 lbs, increasing its wettability to hydrophobic, with a contact angle between 90° and 150° (FIG. 5.1B). The membrane was heated in an oven at 100°

C. to recover its superhydrophobicity. With reapplication of the low surface energy silane, the membrane can switch between superhydrophobicity and hydrophobicity 4 times (FIG. 5.2A) showing a contact angle of approximately 150° after the 4$^{th}$ cycle (FIG. 5.1C). After four cycles, the membrane switches between highly hydrophobic and moderately hydrophobic. Without reapplication of the silane, the membrane can cycle between superhydrophobic and hydrophobic once, then proceeds to cycle between the high end and low end of hydrophobicity (FIG. 5.2B). The membranes show a large contact angle change between the recovered and deformed state, typically greater than 40°.

The membrane also exhibits switchable oleophobicity. In the recovered state, the membrane displays oleophobic behavior (150°>CA>90°); however, after deformation via heat press, the membrane shows oleophilic behavior (CA<90°). This phenomenon is repeatable for at least 4 cycles without retreatment with silane. The material is both superhydrophobic and oleophobic in the recovered state.

FIG. 5.3 graphs the apparent hexadecane contact angle for various cycles of recovery (R1, R2, R3, R4, R5) and deformation (D1, D2, D3, D4) of the nanostructure without retreatment.

The membrane achieves superhydrophobicity by having a low solid surface energy and a high roughness and/or low solid fraction. Low surface energy is achieved through silanization with heptadecafluoro-1,1,2,2-tetrahydrodecyl trichlorosilane. The membrane achieves switchable wettability by altering its surface geometry. After fabrication, the surface structure supports water droplets on a low solid fraction due to protruding nanoscale features (FIG. 5.4A). After the sample is put in the heat press, a new temporary geometry with a flattened surface is memorized (FIG. 5.4B). Nevertheless, the membrane can return to the original structure via heating without an applied force.

The solid fraction of the exposed surface of the membrane was estimated using top-down SEM images and processing in Matlab. The apparent contact angle measurements match the values expected using the estimated solid fraction with the Cassie-Baxter wettability model (FIG. 5.5).

Contact angle measurements for two fabrication conditions (110 and 130 seconds of plasma etching) were repeated periodically for one month. No decrease in hydrophobicity was observed, as both samples maintained a contact angle above 160° for the duration of the month (FIG. 5.6).

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A porous polymer material comprising an ordered array of voids, wherein a distance between at least two pairs of adjacent voids is substantially the same, wherein a polymer framework separates the voids;
   wherein the porous polymer material has a recovery state, wherein the voids are in an uncollapsed state and the porous polymer material has the characteristic of having an iridescent color;
   wherein the porous polymer material has a deformed state, wherein the voids are in a collapsed state and the porous polymer material has the characteristic of being either non-iridescent or substantially transparent; $_{and}$
   wherein the deformed state occurs when a solvent is evaporated from the porous polymer material causing the voids to collapse, and wherein when the recovery state occurs when the porous polymer material in the deformed state is exposed to an external stimulus causing the collapsed voids renew their uncollapsed state, wherein the external stimulus is selected from: a target compound or a laser illumination;
   wherein the external stimulus is a target compound; and
   wherein the target compound is selected from the group consisting of: uncured PDMS oligomer, a drug, Vitamin E, and lidocaine.

2. The porous polymer material of claim 1, wherein the porous polymer material comprises a first region and a second region, wherein the porous polymer material further comprises additive particles in the polymer framework.

3. The porous polymer material of claim 1, wherein the polymer framework comprises: a co-polymer of ethoxylated trimethylolpropane triacrylate (ETPTA) and polyethylene glycol diacrylate (PEGDA), a blend of an aliphatic polyester/polyether-based trifunctional urethane acrylate oligomer and blended with tripropylene glycol diacrylate (25 wt %) with ratio of about 5% to 50%, or a combination thereof.

4. The porous polymer material of claim 1, wherein the porous polymer material has a thickness of about 1 micrometer to 300 micrometers.

5. The porous polymer material of claim 1, wherein the porous polymer material comprises a first region and a second region, wherein the porous polymer material further consists of a filler polymer in voids of the second region, wherein the filler polymer causes the voids of the second region to irreversibly remain in the uncollapsed state.

6. The porous polymer material of claim 5, wherein the filler polymer comprises uncured oligomers and plasticizers, wherein the filler polymer swells the collapsed voids, leading to a chromogenic response of the porous polymer composite material.

7. The porous polymer material of claim 2, wherein when the additive particles are present and the external stimulus is laser energy, the porous polymer material transforms from the deformed state to the recovered state, wherein in the recovered state the porous polymer material has a reflectance of the laser energy of about 80% or more after exposure to the laser energy.

8. The porous polymer material of claim 1, wherein the material is capable of being returned to the deformed or recovered state about 10 or more times.

9. The porous polymer material of claim 1, wherein the distance between 50% or more of the pairs of adjacent voids is substantially the same and each void has a volume that is about the same.

10. The porous polymer material of any of claim 1, wherein about 10 to $1 \times 10^{12}$ unique pairs of adjacent voids are present is in a 1 cm×1 cm×10 µm sample.

11. The porous polymer material of claim 1, wherein the diameter of each of the voids is about 100 nm to 1000 nm.

12. The porous polymer material of claim 2, wherein the additive particles are selected from graphene, graphite, graphene oxide, graphite oxide, carbon black, or combinations thereof.

13. The porous polymer material of claim 12, wherein the additive particles are graphene particles having a diameter of about 1 nm to 1000 µm.

14. The porous polymer material of claim 2, wherein the weight percent of the additive particles is about 0.1 wt % to 5 wt % of the porous polymer material.

15. The porous polymer material of claim 1, wherein a chromogenic sensor is formed from one or more layers of the porous polymer material, and wherein each layer is about 1 µm to 300 µm thick.

16. The porous polymer material of claim 1, wherein the porous polymer material in the recovered state has a static water contact angle greater than about 150°, and, wherein the porous polymer material in the deformed state has a static water contact angle of about 90° to 150°.

17. The porous polymer material of claim 7, wherein a chromogenic sensor is formed from one or more layers of the porous polymer material, and wherein each layer is about 1 µm to 300 µm thick;
    wherein the additive particles are graphene particles having a diameter of about 1 nm to 1000 nm;
    wherein the weight percent of the graphene particles is about 0.1 wt % to 5 wt % of the porous polymer material; and
    wherein when the porous polymer composite material is in a deformed state, the chromogenic sensor has the characteristic of appearing black.

18. The porous polymer material of claim 5, wherein the filler polymer is selected from the group consisting of: polydimethylsiloxane, polybutadiene rubber, styrene butadiene rubber, nitrile rubber, chloroprene, neoprene, polyacrylates, polystyrene, polyurethanes, epoxies, and a combination thereof.

19. A porous polymer material comprising an ordered array of voids, wherein a distance between at least two pairs of adjacent voids is substantially the same, wherein a polymer framework separates the voids;
    wherein the porous polymer material has a recovery state, wherein the voids are in an uncollapsed state and the porous polymer material has the characteristic of having an iridescent color;
    wherein the porous polymer material has a deformed state, wherein the voids are in a collapsed state and the porous polymer material has the characteristic of being either non- iridescent or substantially transparent;
    wherein the deformed state occurs when a solvent is evaporated from the porous polymer material causing the voids to collapse, and wherein when the recovery state occurs when the porous polymer material in the deformed state is exposed to an external stimulus causing the collapsed voids renew their uncollapsed state, wherein the external stimulus is selected from: a target compound or a laser illumination; and
    wherein the external stimulus is a target compound; and wherein the target compound is uncured PDMS oligomer.

20. The porous polymer material of claim 1, wherein the external stimulus is a target compound; and wherein the target compound is a drug.

21. The porous polymer material of claim 1, wherein the external stimulus is a target compound; and wherein the target compound is Vitamin E.

22. The porous polymer material of claim 1, wherein the external stimulus is a target compound; and wherein the target compound is lidocaine.

23. The porous polymer material of claim 5, wherein the filler polymer forms a hidden anti-counterfeiting pattern wherein the hidden anti-counterfeiting pattern is formed by the voids the second region being filled by a filler polymer, wherein the filler polymer causes the voids of the second region to irreversibly remain in an uncollapsed state with the characteristic of having an iridescent color, wherein the hidden anti-counterfeiting pattern is not visible when the first region is in a recovery state since both the first and second regions have the characteristic of having the same iridescent color; and
    wherein if exposed to a solvent when the porous polymer material is in a recovery state, the exposing causes the first region of the porous polymer material to return to a deformed state having a transparent appearance, and wherein the hidden anti-counterfeiting pattern has the characteristic of having an iridescent color.

24. The porous polymer material of claim 5, wherein the external stimulus is a target compound; and
    wherein the target compound is selected from the group consisting of: uncured PDMS oligomer, a drug, Vitamin E, and lidocaine.

* * * * *